(12) United States Patent
Robinson et al.

(10) Patent No.: US 10,228,505 B2
(45) Date of Patent: Mar. 12, 2019

(54) WIDE ANGLE IMAGING DIRECTIONAL BACKLIGHTS

(71) Applicant: RealD Inc., Beverly Hills, CA (US)

(72) Inventors: Michael G. Robinson, Boulder, CO (US); Robert A. Ramsey, Loveland, CO (US); Graham J. Woodgate, Henley-on-Thames (GB)

(73) Assignee: RealD Spark, LLC, Beverly Hills, CA (US)

(*) Notice: Subject to any disclaimer, the term of this patent is extended or adjusted under 35 U.S.C. 154(b) by 245 days.

(21) Appl. No.: 15/165,960

(22) Filed: May 26, 2016

(65) Prior Publication Data

US 2016/0349444 A1    Dec. 1, 2016

Related U.S. Application Data

(60) Provisional application No. 62/167,203, filed on May 27, 2015, provisional application No. 62/167,185, filed on May 27, 2015.

(51) Int. Cl.
*F21V 8/00* (2006.01)

(52) U.S. Cl.
CPC ......... *G02B 6/0055* (2013.01); *G02B 6/0016* (2013.01); *G02B 6/0048* (2013.01); *G02B 6/0068* (2013.01)

(58) Field of Classification Search
CPC .. G02B 6/0055; G02B 6/0016; G02B 6/0048; G02B 6/0068; G02B 6/0045;
(Continued)

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CN | 1142869 A | 2/1997 |
| CN | 1377453 A | 10/2002 |

(Continued)

OTHER PUBLICATIONS

PCT/US2016/034418 International search report and written opinion of the international searching authority dated Sep. 7, 2016.

(Continued)

*Primary Examiner* — Bao Q Truong
(74) *Attorney, Agent, or Firm* — Penny L. Lowry; Neil G. Mothew

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second deflected direction may be refracted, diffracted, or reflected by the features to provide discrete illumination beams exiting from the top surface of the waveguide. Viewing windows are formed through imaging individual light sources from the side of the waveguide and hence defines the relative positions of system elements and ray paths. A directional backlight with small footprint and low thickness may be provided.

36 Claims, 54 Drawing Sheets

(58) Field of Classification Search
CPC .. G02B 6/0046; G02B 6/0073; G02B 6/0035; G02B 6/0033; F21V 2200/00; F21V 2200/20; F21V 7/00; F21V 7/0008
See application file for complete search history.

(56) References Cited

U.S. PATENT DOCUMENTS

| | | | |
|---|---|---|---|
| 2,133,121 A | 10/1938 | Stearns | |
| 2,247,969 A | 7/1941 | Lemuel | |
| 2,480,178 A | 8/1949 | Zinberg | |
| 2,810,905 A | 10/1957 | Barlow | |
| 3,409,351 A | 11/1968 | Winnek | |
| 3,715,154 A | 2/1973 | Bestenreiner | |
| 4,057,323 A | 11/1977 | Ward | |
| 4,528,617 A | 7/1985 | Blackington | |
| 4,542,958 A | 9/1985 | Young | |
| 4,804,253 A | 2/1989 | Stewart | |
| 4,807,978 A | 2/1989 | Grinberg et al. | |
| 4,829,365 A | 5/1989 | Eichenlaub | |
| 4,914,553 A | 4/1990 | Hamada et al. | |
| 5,278,608 A | 1/1994 | Taylor et al. | |
| 5,347,644 A | 9/1994 | Sedlmayr | |
| 5,349,419 A | 9/1994 | Taguchi et al. | |
| 5,459,592 A | 10/1995 | Shibatani et al. | |
| 5,466,926 A | 11/1995 | Sasano et al. | |
| 5,510,831 A | 4/1996 | Mayhew | |
| 5,528,720 A | 6/1996 | Winston et al. | |
| 5,581,402 A | 12/1996 | Taylor | |
| 5,588,526 A | 12/1996 | Fantone et al. | |
| 5,697,006 A | 12/1997 | Taguchi et al. | |
| 5,703,667 A | 12/1997 | Ochiai | |
| 5,727,107 A | 3/1998 | Umemoto et al. | |
| 5,771,066 A | 6/1998 | Barnea | |
| 5,796,451 A | 8/1998 | Kim | |
| 5,808,792 A | 9/1998 | Woodgate et al. | |
| 5,850,580 A | 12/1998 | Taguchi et al. | |
| 5,875,055 A | 2/1999 | Morishima et al. | |
| 5,896,225 A | 4/1999 | Chikazawa | |
| 5,903,388 A | 5/1999 | Sedlmayr | |
| 5,933,276 A | 8/1999 | Magee | |
| 5,956,001 A | 9/1999 | Sumida et al. | |
| 5,959,664 A | 9/1999 | Woodgate | |
| 5,959,702 A | 9/1999 | Goodman | |
| 5,969,850 A | 10/1999 | Harrold et al. | |
| 5,971,559 A | 10/1999 | Ishikawa et al. | |
| 6,008,484 A | 12/1999 | Woodgate et al. | |
| 6,014,164 A | 1/2000 | Woodgate et al. | |
| 6,023,315 A | 2/2000 | Harrold et al. | |
| 6,044,196 A | 3/2000 | Winston et al. | |
| 6,055,013 A | 4/2000 | Woodgate et al. | |
| 6,061,179 A | 5/2000 | Inoguchi et al. | |
| 6,061,489 A | 5/2000 | Ezra et al. | |
| 6,064,424 A | 5/2000 | Berkel et al. | |
| 6,075,557 A | 6/2000 | Holliman et al. | |
| 6,094,216 A | 7/2000 | Taniguchi et al. | |
| 6,108,059 A | 8/2000 | Yang | |
| 6,118,584 A | 9/2000 | Berkel et al. | |
| 6,128,054 A | 10/2000 | Schwarzenberger | |
| 6,144,118 A | 11/2000 | Cahill et al. | |
| 6,172,723 B1 | 1/2001 | Inoue et al. | |
| 6,199,995 B1 | 3/2001 | Umemoto et al. | |
| 6,219,113 B1 | 4/2001 | Takahara | |
| 6,224,214 B1 | 5/2001 | Martin et al. | |
| 6,232,592 B1 | 5/2001 | Sugiyama | |
| 6,256,447 B1 | 7/2001 | Laine | |
| 6,262,786 B1 | 7/2001 | Perlo et al. | |
| 6,295,109 B1 | 9/2001 | Kubo et al. | |
| 6,302,541 B1 | 10/2001 | Grossmann | |
| 6,305,813 B1 | 10/2001 | Lekson et al. | |
| 6,335,999 B1 | 1/2002 | Winston et al. | |
| 6,373,637 B1 | 4/2002 | Gulick et al. | |
| 6,377,295 B1 | 4/2002 | Woodgate et al. | |
| 6,422,713 B1 | 7/2002 | Fohl et al. | |
| 6,456,340 B1 | 9/2002 | Margulis | |
| 6,464,365 B1 | 10/2002 | Gunn et al. | |
| 6,476,850 B1 | 11/2002 | Erbey | |
| 6,481,849 B2 | 11/2002 | Martin et al. | |
| 6,654,156 B1 | 11/2003 | Crossland et al. | |
| 6,663,254 B2 | 12/2003 | Ohsumi | |
| 6,724,452 B1 | 4/2004 | Takeda et al. | |
| 6,731,355 B2 | 5/2004 | Miyashita | |
| 6,736,512 B2 | 5/2004 | Balogh | |
| 6,801,243 B1 | 10/2004 | Berkel | |
| 6,816,158 B1 | 11/2004 | Lemelson et al. | |
| 6,825,985 B2 | 11/2004 | Brown et al. | |
| 6,847,354 B2 | 1/2005 | Vranish | |
| 6,847,488 B2 | 1/2005 | Travis | |
| 6,859,240 B1 | 2/2005 | Brown et al. | |
| 6,867,828 B2 | 3/2005 | Taira et al. | |
| 6,870,671 B2 | 3/2005 | Travis | |
| 6,879,354 B1* | 4/2005 | Sawayama | G02B 6/0025 349/62 |
| 6,883,919 B2 | 4/2005 | Travis | |
| 7,052,168 B2 | 5/2006 | Epstein et al. | |
| 7,058,252 B2 | 6/2006 | Woodgate et al. | |
| 7,073,933 B2 | 7/2006 | Gotoh et al. | |
| 7,091,931 B2 | 8/2006 | Yoon | |
| 7,101,048 B2 | 9/2006 | Travis | |
| 7,136,031 B2 | 11/2006 | Lee et al. | |
| 7,215,391 B2 | 5/2007 | Kuan et al. | |
| 7,215,415 B2 | 5/2007 | Maehara et al. | |
| 7,215,475 B2 | 5/2007 | Woodgate et al. | |
| 7,239,293 B2 | 7/2007 | Perlin et al. | |
| 7,365,908 B2 | 4/2008 | Dolgoff | |
| 7,375,886 B2 | 5/2008 | Lipton et al. | |
| 7,410,286 B2 | 8/2008 | Travis | |
| 7,430,358 B2 | 9/2008 | Qi et al. | |
| 7,492,346 B2 | 2/2009 | Manabe et al. | |
| 7,528,893 B2 | 5/2009 | Schultz | |
| 7,545,429 B2 | 6/2009 | Travis | |
| 7,587,117 B2 | 9/2009 | Winston et al. | |
| 7,614,777 B2 | 11/2009 | Koganezawa | |
| 7,660,047 B1 | 2/2010 | Travis et al. | |
| 7,750,981 B2 | 7/2010 | Shestak et al. | |
| 7,750,982 B2 | 7/2010 | Nelson et al. | |
| 7,771,102 B2 | 8/2010 | Iwasaki | |
| 7,944,428 B2 | 5/2011 | Travis | |
| 7,970,246 B2 | 6/2011 | Travis | |
| 7,976,208 B2 | 7/2011 | Travis | |
| 8,016,475 B2 | 9/2011 | Travis | |
| 8,216,405 B2 | 7/2012 | Emerton et al. | |
| 8,223,296 B2 | 7/2012 | Lee et al. | |
| 8,251,562 B2 | 8/2012 | Kuramitsu et al. | |
| 8,325,295 B2 | 12/2012 | Sugita et al. | |
| 8,354,806 B2 | 1/2013 | Travis et al. | |
| 8,477,261 B2 | 7/2013 | Travis et al. | |
| 8,502,253 B2 | 8/2013 | Min | |
| 8,534,901 B2 | 9/2013 | Panagotacos et al. | |
| 8,556,491 B2 | 10/2013 | Lee | |
| 8,651,725 B2 | 2/2014 | Ie et al. | |
| 8,714,804 B2 | 5/2014 | Kim et al. | |
| 8,752,995 B2 | 6/2014 | Park | |
| 8,760,762 B1 | 6/2014 | Kelly et al. | |
| 9,197,884 B2 | 11/2015 | Lee et al. | |
| 9,350,980 B2 | 5/2016 | Robinson et al. | |
| 2001/0001566 A1 | 5/2001 | Moseley et al. | |
| 2001/0050686 A1 | 12/2001 | Allen | |
| 2002/0018299 A1 | 2/2002 | Daniell | |
| 2002/0113246 A1 | 8/2002 | Nagai et al. | |
| 2002/0113866 A1 | 8/2002 | Taniguchi et al. | |
| 2003/0046839 A1 | 3/2003 | Oda et al. | |
| 2003/0117790 A1 | 6/2003 | Lee et al. | |
| 2003/0133191 A1 | 7/2003 | Morita et al. | |
| 2003/0137738 A1 | 7/2003 | Ozawa et al. | |
| 2003/0137821 A1 | 7/2003 | Gotoh et al. | |
| 2004/0008877 A1 | 1/2004 | Leppard et al. | |
| 2004/0021809 A1 | 2/2004 | Sumiyoshi et al. | |
| 2004/0042233 A1 | 3/2004 | Suzuki et al. | |
| 2004/0046709 A1 | 3/2004 | Yoshino | |
| 2004/0105264 A1 | 6/2004 | Spero | |
| 2004/0108971 A1 | 6/2004 | Waldern et al. | |
| 2004/0109303 A1 | 6/2004 | Olczak | |
| 2004/0135741 A1 | 7/2004 | Tomisawa et al. | |
| 2004/0170011 A1 | 9/2004 | Kim et al. | |

(56) References Cited

U.S. PATENT DOCUMENTS

| | | |
|---|---|---|
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0106193 A1 | 5/2012 | Kim et al. |
| 2012/0127573 A1* | 5/2012 | Robinson ............ G02B 6/0048 362/602 |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0294684 A1 | 11/2013 | Lipton et al. |
| 2013/0307831 A1 | 11/2013 | Robinson |
| 2013/0307946 A1 | 11/2013 | Robinson |
| 2013/0321599 A1 | 12/2013 | Harrold et al. |
| 2013/0328866 A1 | 12/2013 | Woodgate et al. |

(56) References Cited

U.S. PATENT DOCUMENTS

| | | |
|---|---|---|
| 2013/0335821 A1 | 12/2013 | Robinson |
| 2014/0009508 A1 | 1/2014 | Woodgate |
| 2014/0022619 A1 | 1/2014 | Woodgate et al. |
| 2014/0036361 A1 | 2/2014 | Woodgate et al. |
| 2014/0043323 A1 | 2/2014 | Sumi |
| 2014/0126238 A1 | 5/2014 | Kao et al. |
| 2014/0240828 A1 | 8/2014 | Robinson |
| 2014/0340728 A1 | 11/2014 | Taheri |
| 2014/0368602 A1 | 12/2014 | Woodgate et al. |
| 2015/0268479 A1 | 9/2015 | Robinson et al. |
| 2016/0299281 A1* | 10/2016 | Robinson ............ G02B 6/0048 |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| CN | 1910399 B | 5/2013 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | 2000048618 A | 2/2000 |
| JP | 2000200049 A | 7/2000 |
| JP | 2001093321 A | 4/2001 |
| JP | 2001281456 | 10/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005116266 | 4/2005 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | H3968742 | 8/2007 |
| JP | 2007273288 A | 10/2007 |
| JP | 2007286652 A | 11/2007 |
| JP | 2008204874 A | 9/2008 |
| JP | 2010160527 A | 7/2010 |
| JP | 20110216281 | 10/2011 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 A | 9/2005 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |
| WO | 2014130860 A1 | 8/2014 |

OTHER PUBLICATIONS

Travis, et al. "Backlight for view-sequential autostereo 3D", Microsoft E&DD Applied Sciences, (date unknown), 25 pages.

Travis, et al. "Collimated light from a waveguide for a display," Optics Express, vol. 17, No. 22, pp. 19714-19719 (2009).

Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.

Robinson et al., U.S. Appl. No. 15/165,960 entitled "Wide Angle Imaging Directional Backlights" filed May 26, 2016.

Robinson et al., U.S. Appl. No. 15/290,543 entitled "Wide angle imaging directional backlights" filed Oct. 11, 2016.

Robinson, U.S. Appl. No. 13/300,293 entitled "Directional flat illuminators" filed Nov. 18, 2011.

RU-2013122560 First office action dated Jan. 1, 2014.

RU-2013122560 Second office action dated Apr. 10, 2015.

Tabiryan et al., "The Promise of Diffractive Waveplates," Optics and Photonics News, vol. 21, Issue 3, pp. 40-45 (Mar. 2010).

EP-16150248.9 European Extended Search Report of European Patent Office dated Jun. 16, 2016.

Ian Sexton et al: "Stereoscopic and autostereoscopic display systems", —IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].

JP-2009538527 Reasons for rejection dated Jul. 17, 2012 with translation.

JP-200980150139.1 1st Office Action dated Feb. 11, 2014.

JP-200980150139.1 2d Office Action dated Apr. 5, 2015.

JP-2013540083 Notice of reasons for rejection dated Jun. 30, 2015.

JP-2013540083 Notice of reasons for rejection with translation dated Jun. 21, 2016.

Kalantar, et al. "Backlight Unit With Double Surface Light Emission," J. Soc. Inf. Display, vol. 12, Issue 4, pp. 379-387 (Dec. 2004).

KR-20117010839 1st Office action (translated) dated Aug. 28, 2015.

KR-20117010839 2d Office action (translated) dated Apr. 28, 2016.

KR-20137015775 Office action (translated) dated Oct. 18, 2016.

Languy et al., "Performance comparison of four kinds of flat nonimaging Fresnel lenses made of polycarbonates and polymethyl methacrylate for concentrated photovoltaics", Optics Letters, 36, pp. 2743-2745.

Lipton, "Stereographics: Developers' Handbook", Stereographic Developers Handbook, Jan. 1, 1997, XP002239311, p. 42-49.

Marjanovic, M.,"Interlace, Interleave, and Field Dominance," http://www.mir.com/DMG/interl.html, pp. 1-5 (2001).

(56) References Cited

OTHER PUBLICATIONS

PCT/US2016/027350 International search report and written opinion of the international searching authority dated Jul. 25, 2016.
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed Apr. 13, 2016.
Robinson et al., U.S. Appl. No. 15/098,084 entitled "Wide angle imaging directional backlights" filed Apr. 13, 2016.
Written opinion of the International Searching Authority in PCT/US2016/034418 dated Sep. 7, 2016.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
EP-13844510.1 European Extended Search Report of European Patent Office dated May 13, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
EP-13865893.5 European Extended Search Report of European Patent Office dated Oct. 6, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
EP-14754859.8 European Extended Search Report of European Patent Office dated Oct. 14, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.

(56) References Cited

OTHER PUBLICATIONS

EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.

\* cited by examiner

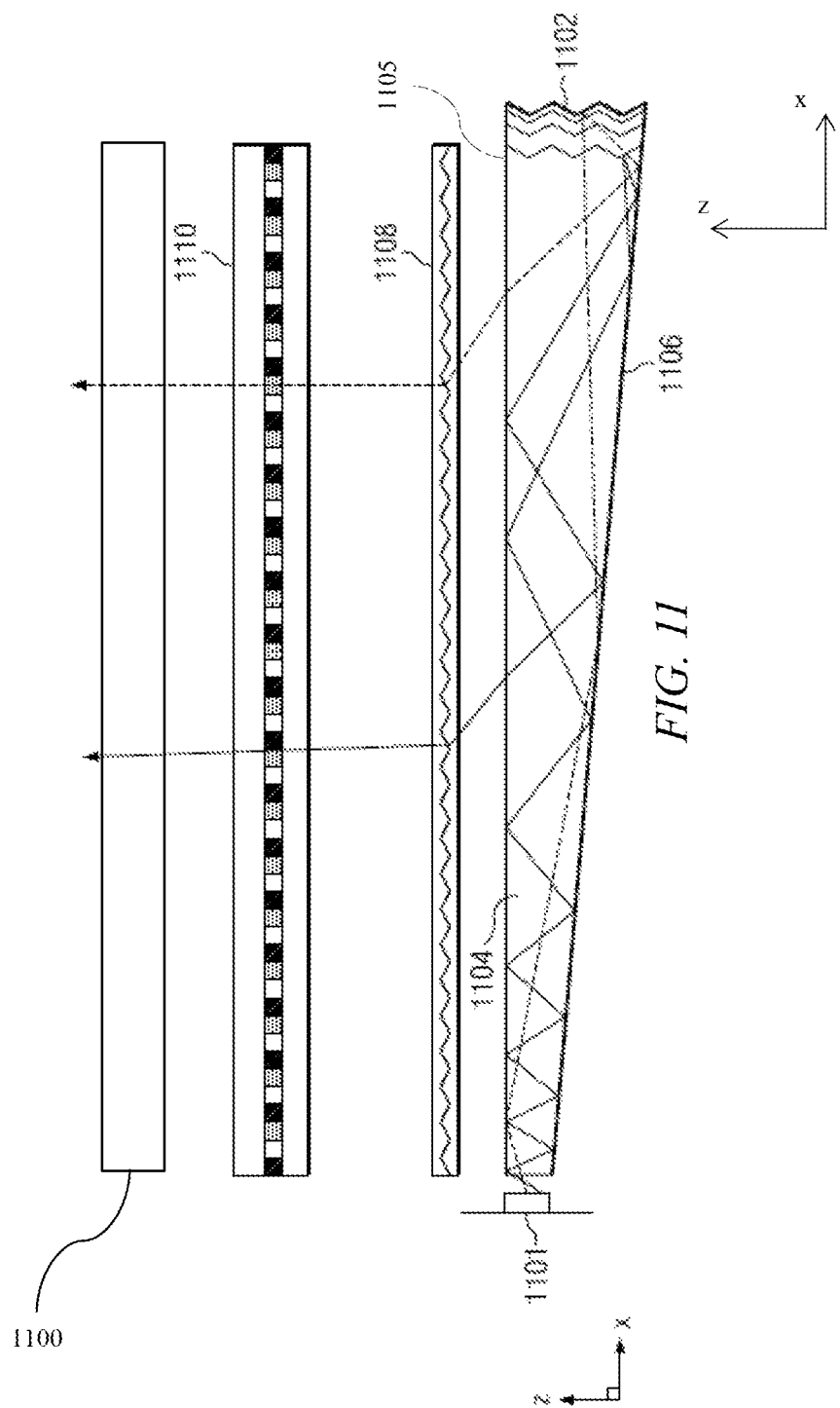

$$\frac{a}{A} = \frac{\cos(\theta i)}{\cos(\theta i - 2 \cdot \theta f)} \equiv \text{Efficiency}$$

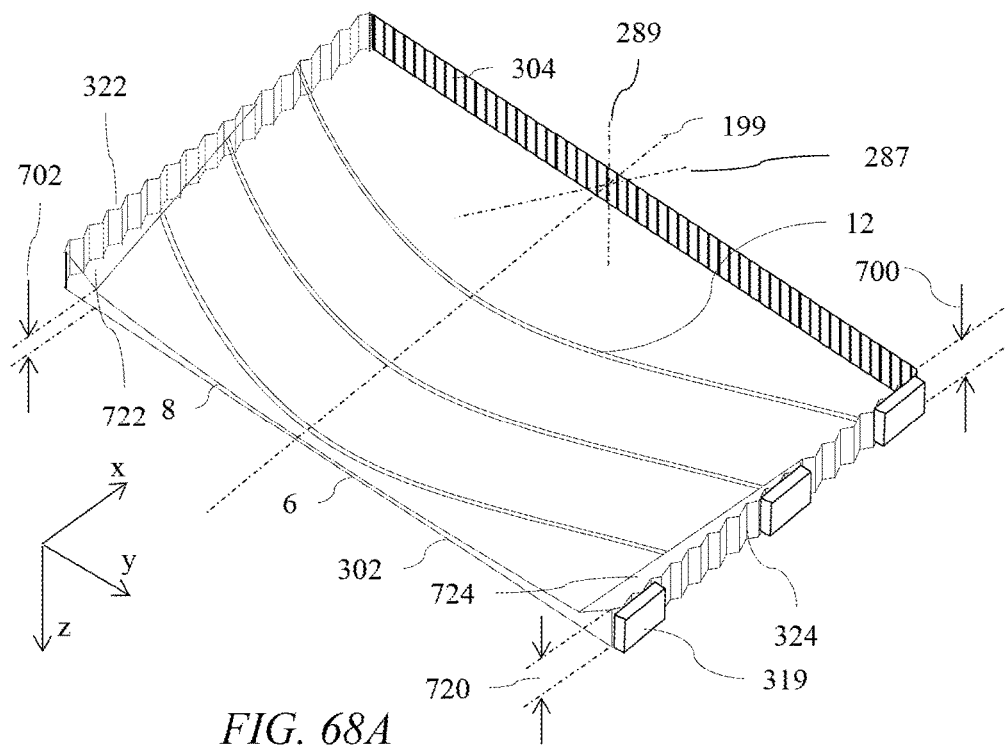
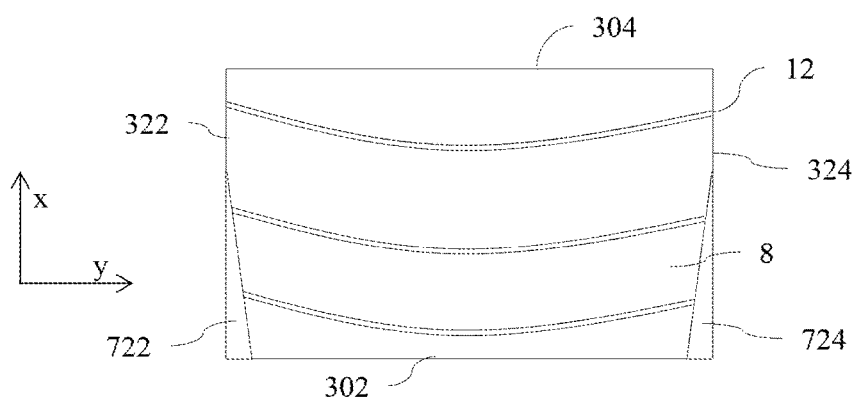
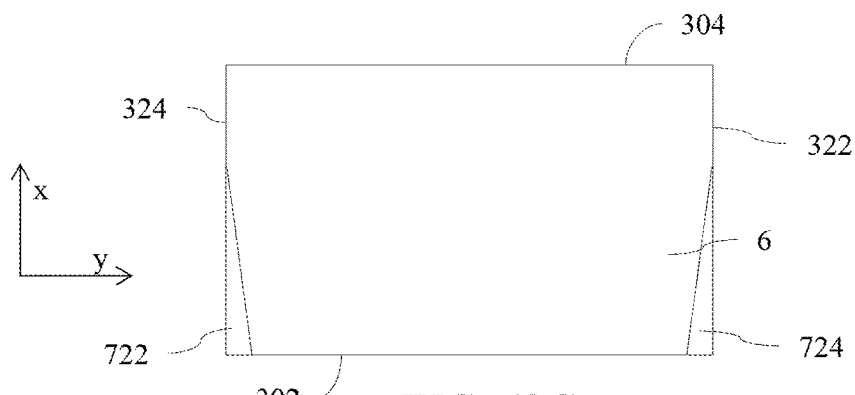

WIDE ANGLE IMAGING DIRECTIONAL BACKLIGHTS

CROSS-REFERENCE TO RELATED APPLICATIONS

This application claims priority to U.S. Provisional Patent Appl. No. 62/167,203 entitled "Wide angle imaging directional backlights" filed May 27, 2015 and U.S. Provisional Patent Appl. No. 62/167,185 entitled "Wide angle imaging directional backlights," filed May 27, 2015, both of which are herein incorporated by reference in their entireties.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293 (U.S. Patent Publ. No. 2012/0127573), which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. No light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure, there is provided a directional backlight comprising a directional waveguide and light sources, the directional waveguide comprising: a reflective end that is elongated in a lateral direction; first and second opposed guide surfaces extending from laterally extending edges of the reflective end for guiding input light along the waveguide towards the reflective end and for guiding light reflected by the reflected end away from the reflective end, the second guide surface being arranged to deflect light reflected from the reflective end through the first guide surface as output light; and side surfaces extending between the first and second guide surfaces, wherein the light sources include an array of light sources arranged along a side surface to provide said input light through that side surface, and the reflective end comprises first and second facets alternating with each other in the lateral direction, the first facets being reflective and forming reflective facets of a Fresnel reflector having positive optical power in the lateral direction, the second facets forming draft facets of the Fresnel reflector, the Fresnel reflector having an optical axis that is inclined towards the side surface in a direction in which the Fresnel reflector deflects input light from the array of light sources into the waveguide, the waveguide being arranged to direct the output light from the light sources into respective optical windows in output directions that are distributed laterally in dependence on the positions of the light sources.

Advantageously a directional backlight may be provided with low thickness that can provide controllable optical window arrays. Light sources may be arranged on a short side of rectangular waveguides, achieving small footprint, particularly for application to mobile display devices.

The light sources may include two arrays of light sources each arranged along one of the side surfaces, and the first facets and the second facets may be reflective, the first and second facets forming, respectively, reflective facets of first and second Fresnel reflectors each having positive optical power in the lateral direction, the second and first facets forming, respectively, draft facets of the first and second Fresnel reflectors, the first and second Fresnel reflectors having optical axes inclined towards respective side surfaces in directions in which the Fresnel reflectors deflect input light from the array of light sources arranged along the respective side surface into the waveguide. The first and second facets may have mirror symmetry about a plane of symmetry extending from the reflective end, the optical axes of the first and second Fresnel reflectors being inclined from the plane of symmetry towards the respective side surfaces. The light sources may be arranged with mirror symmetry about the plane of symmetry. Advantageously, angular uniformity, of optical windows, spatial uniformity across the area of the waveguide for a given viewing position and maximum display luminance may be improved in comparison to arrangements with a single array of light sources.

The first guide surface may be arranged to guide light by total internal reflection and the second guide surface may comprise a plurality of light extraction features oriented to direct light reflected by the reflected end in directions allowing exit through the first guide surface as the output light and intermediate regions between the light extraction features that are arranged to guide light along the waveguide. The light extraction features may have positive optical power in the lateral direction. The light extraction features have an optical axis to which the optical axis of the Fresnel reflector is inclined. The light extraction features and the intermediate regions alternate with one another in a stepped shape. Advantageously, curved light extraction features may be provided to achieve imaging of optical windows in a compact format, with high efficiency.

The directional backlight may further comprise a rear end facing the reflective end. Advantageously the rear end may be thinner than known directional stepped waveguides, so that device efficiency may be increased in comparison. The thickness of the rear end may be thinner than the emitting height of the light sources.

Input sources may be arranged along at least part of the rear end adjacent the side surface. At least part of the rear end may be reflective. At least part of the rear end may be non-reflective. Advantageously, device efficiency and uniformity may be increased.

The ratio between (a) height of the rear end between the first and second guide surfaces and (b) the height of the reflective end between the first and second guide surfaces may have a profile across the lateral direction that is greatest at the side on which the light source array is arranged and reduces in the lateral direction. The height of the rear end between the first and second guide surfaces may have a profile across the lateral direction that is greatest at the side on which the light source array is arranged and reduces in the lateral direction.

Advantageously a directional waveguide with small footprint in comparison to waveguides with two arrays of light sources may be provided with high uniformity.

A directional backlight with two arrays of light sources may be provided wherein the ratio between (a) height of the rear end between the first and second guide surfaces and (b) the height of the reflective end between the first and second guide surfaces has a profile across the lateral direction that is least at the optical axis of the light extraction features and increases towards each side of the optical axis. The height of the rear end between the first and second guide surfaces may have a profile across the lateral direction that is lowest at the optical axis of the light extraction features and reduces towards each side of the optical axis. The edge of the rear end at the first guide surface may be curved and the edge of the rear end at the second guide surface may be straight to provide said profile. Advantageously, spatial uniformity for on-axis viewing positions may be increased.

The waveguide may include a tapered region adjacent the side surface within which the height of the waveguide between the first and second guide surfaces increases along a direction from the remainder of the waveguide towards the side surface. The width of the tapered region in the lateral direction increases in the direction away from the reflective end.

Advantageously, LEDs of greater height than that of the thinnest part of the waveguide may be used to achieve greater luminance and efficiency in comparison to waveguides with no tapered regions. Waveguide thickness and thus display thickness may be reduced.

The optical axis of the Fresnel reflector may be inclined towards the side surface in a direction such that the output light from a light source of the array of light sources arranged along a side surface is directed into the central optical window of the distribution of optical windows. The side surface along which the array of sources is arranged may comprise recesses including input facets facing the reflective end, the light sources being arranged to provide said input light through the input facets. Advantageously, optical windows may be provided in on-axis viewing positions when illuminated by light sources that are arranged at the sides of the waveguide, reducing footprint of the backlight.

The side surface opposite the surface along which the array of sources is arranged may comprise side reflective facets wherein said side reflective facets provide a side Fresnel reflector with substantially the same positive optical power in the lateral direction and optical axis direction as the Fresnel reflector arranged at the reflective end. Advantageously a single array of light sources can be arranged with low footprint in comparison with arrangements with two arrays of light sources, while achieving desirable spatial uniformity for off-axis viewing positions.

The directional backlight may further comprise a rear reflector comprising a linear array of reflective facets arranged to reflect light from the light sources, that is transmitted through the plurality of facets of the waveguide, back through the waveguide to exit through the first guide surface into said optical windows. The facets of the waveguide and the reflective facets of the rear reflector may be inclined in the same sense in a common plane orthogonal to said lateral direction. The facets of the waveguide may be inclined at an angle $(\pi/2-\alpha)$ to the normal to the first guide surface and the reflective facets of the rear reflector are inclined at an angle $\beta$ to the normal to the first guide surface, and $2\beta > \pi/2 - \sin^{-1}(n \cdot \sin(\alpha - \theta_c))$, $\theta_c$ being the critical angle of the facets of the waveguide and n being the refractive index of the material of the waveguide. The rear reflector may be spaced from the waveguide such that the light from an individual facet of the waveguide is incident on plural reflective facets of the rear reflector, the rear reflector further comprising intermediate facets extending between the reflective facets of the rear reflector, the intermediate facets being inclined in an opposite sense from the reflective facets of the rear reflector at an angle such that said light from the light sources that is transmitted through the plurality of facets of the waveguide is not incident on the intermediate facets. Advantageously light that is transmitted by the light extraction features of the waveguide may be efficiently directed towards the optical windows.

The reflective facets of the rear reflector may have an irregular pitch that may be an irregular, randomized pitch. The reflective facets of the rear reflector may have an inclination that varies across the array of reflective facets. Advantageously, Moiré effects between the waveguide and rear reflector may be minimized.

The reflective facets of the rear reflector may be linear and may be curved. Advantageously, optical windows provided directly by the waveguide may overlap with optical windows provided by the rear reflector in cooperation with the waveguide.

According to a second aspect of the present disclosure, a directional display device may comprise: a directional backlight according to the first aspect; and a transmissive spatial light modulator arranged to receive the output light from the waveguide and to modulate it to display an image. Advantageously a directional display may be provided that can achieve wide angle illumination of similar performance to conventional non-directional backlights. Further such a display can achieve other modes of operation including but not limited to autostereoscopic 3D, privacy, dual view, power savings and high luminance for outdoors operation.

The spatial light modulator may have a rectangular shape having a first side aligned with the reflective end of the directional waveguide, the optical axis of the Fresnel reflector being inclined with respect to an axis of the rectangular shape of the spatial light modulator that is perpendicular to its first side. Advantageously the display may be provided without light sources arranged on the long edge of the display, minimizing long side bezel width. Such displays are advantageous for use in compact mobile display devices such as cell phones.

The spatial light modulator may be transmissive and arranged to receive the light output through the first guide surface and arranged to modulate a first polarization component of that light having a first polarization; and a reflective polarizer may be disposed between the first guide surface of the waveguide and the spatial light modulator and arranged to transmit the first polarization component and to reflect a second polarization component of the output light having a polarization orthogonal to the first polarization as rejected light, the rear reflector further comprising intermediate facets extending between the reflective facets of the rear reflector and inclined in opposite senses from the reflective facets of the rear reflector in a common plane, so that pairs of a reflective facet and an intermediate facet together form corner facets arranged to reflect rejected light for supply back to the spatial light modulator, the pairs of a reflective facet and an intermediate facet being inclined in a plane that is oriented around the normal to the spatial light modulator so that the rear reflector converts the polarization of rejected light supplied back to spatial light modulator into the first polarization on reflection. A polarization rotator may be disposed between the reflective polarizer and the spatial light modulator and arranged to rotate the first polarization component. Advantageously the backlight made efficiently provide polarized light to the spatial light modulator further providing increased luminance and uniformity at low cost.

According to a third aspect of the present disclosure, a directional display apparatus may comprise: a directional display device according to the second aspect; and a control system arranged to control the light sources. Advantageously, a display apparatus that can switch between different modes of operation in a small form factor with high uniformity can be achieved.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient auto stereo scopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 11 is a schematic diagram illustrating in side view, the structure of a directional display device comprising a wedge waveguide, in accordance with the present disclosure;

FIG. 68A is a schematic diagram illustrating in perspective view, a directional waveguide comprising a Fresnel reflector with first and second inclined optical axes, input tapers and LEDs arranged on a short side, in accordance with the present disclosure;

FIG. 68B is a schematic diagram illustrating in rear view, a directional waveguide comprising a Fresnel reflector with first and second inclined optical axes, input tapers arranged on a side of the waveguide comprising light extraction features and LEDs arranged on a short side, in accordance with the present disclosure;

FIG. 68C is a schematic diagram illustrating in rear view, a directional waveguide comprising a Fresnel reflector with first and second inclined optical axes, input tapers arranged on an output side of the waveguide and LEDs arranged on a short side, in accordance with the present disclosure;

DETAILED DESCRIPTION

Figure 1A:
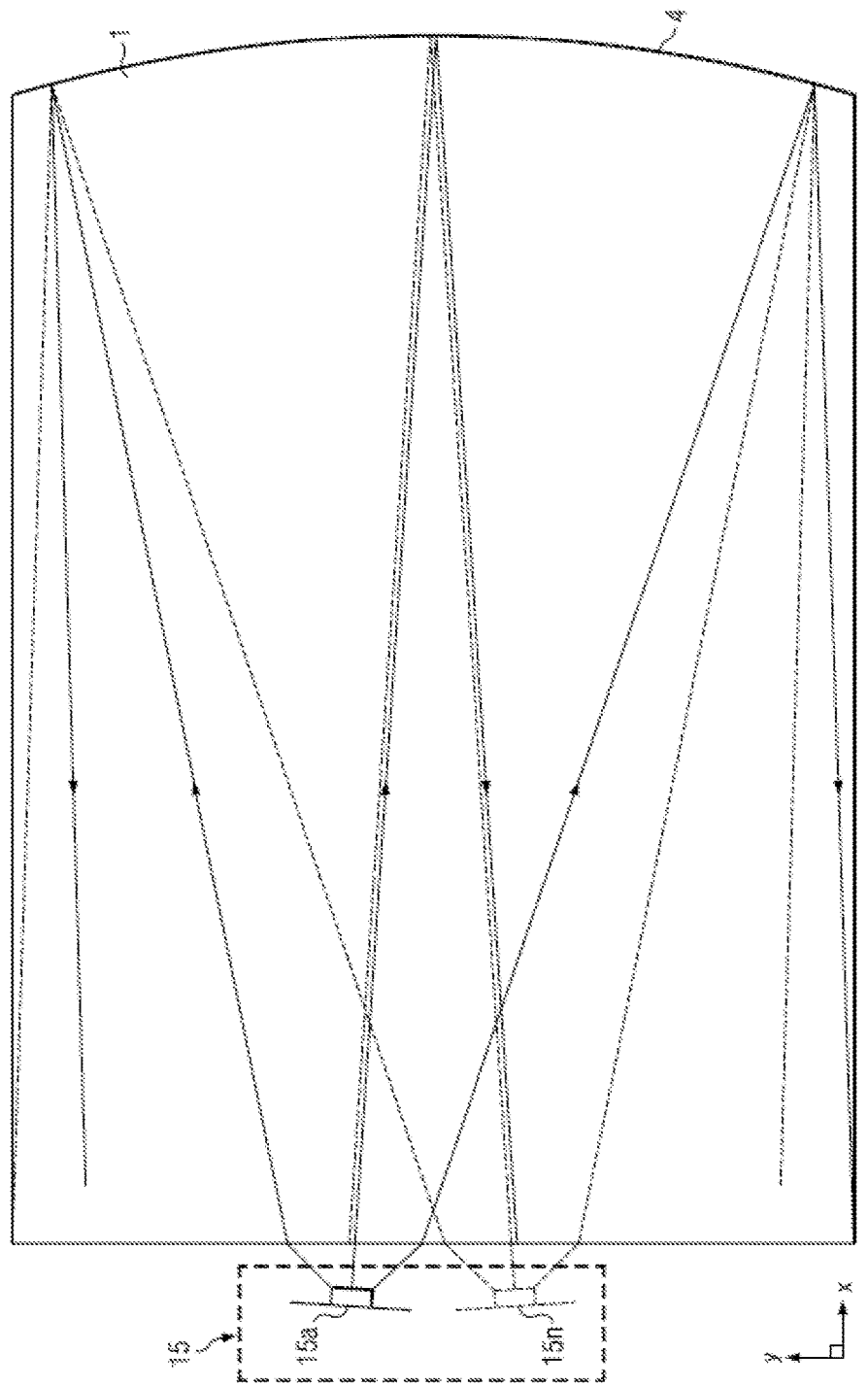
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionally. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 (U.S. Patent Publ. No. 2012/0127573) advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kalil Kalantar et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293 (U.S. Patent Publ. No. 2012/0127573).

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 (U.S. Patent Publ. No. 2012/0127573), which may be referred to herein as an "optical valve" or "optical valve directional backlight," all of which are herein incorporated by reference in their entireties.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
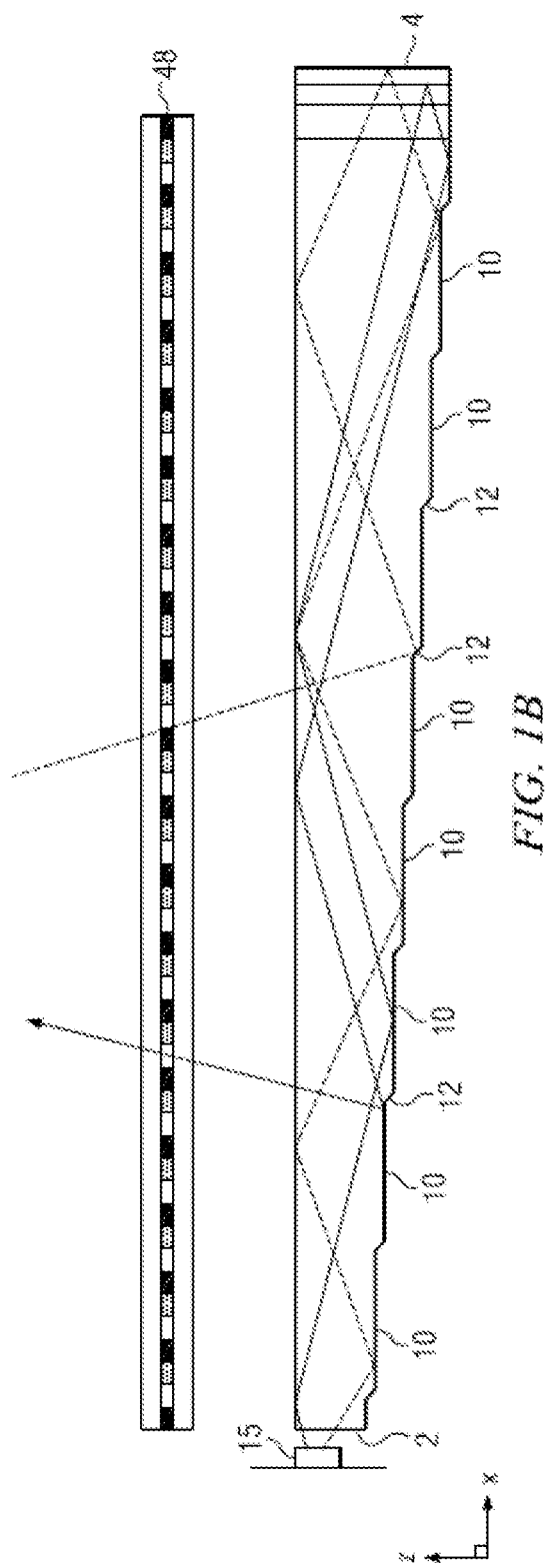
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
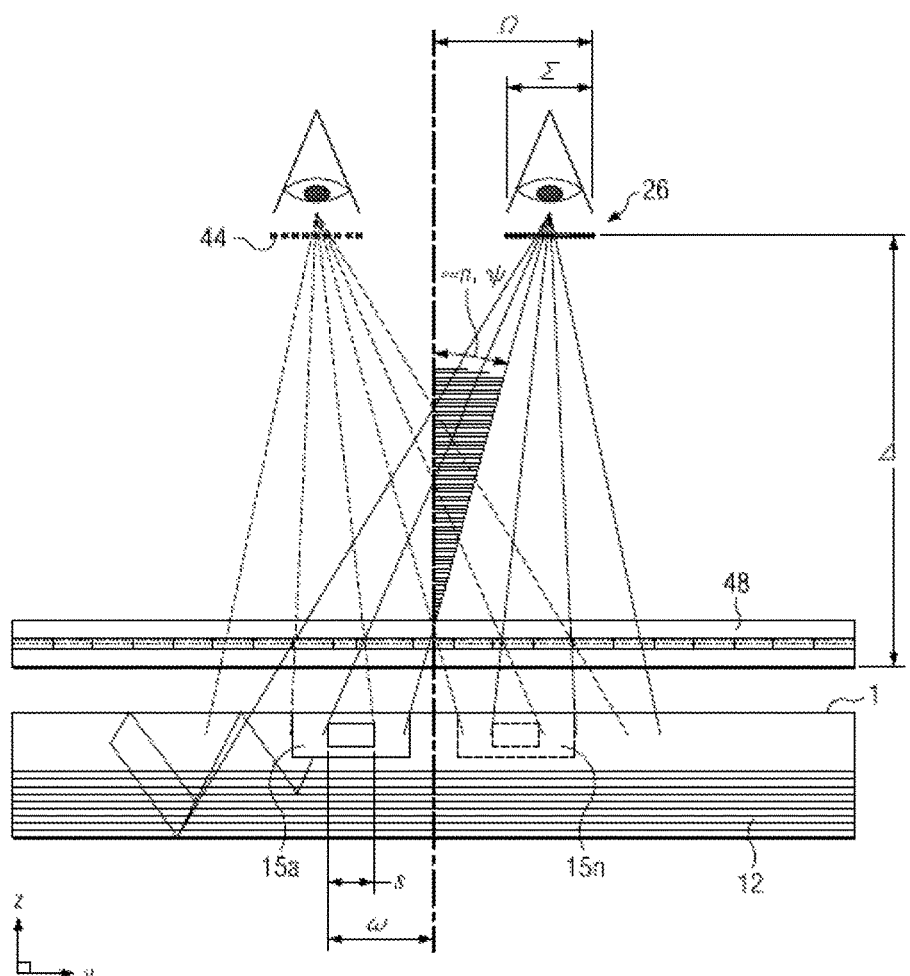
FIG. 2A is a schematic diagram illustrating in a top view of light propagation in another embodiment of a directional display device, in accordance with the present disclosure.
Figure 2B:
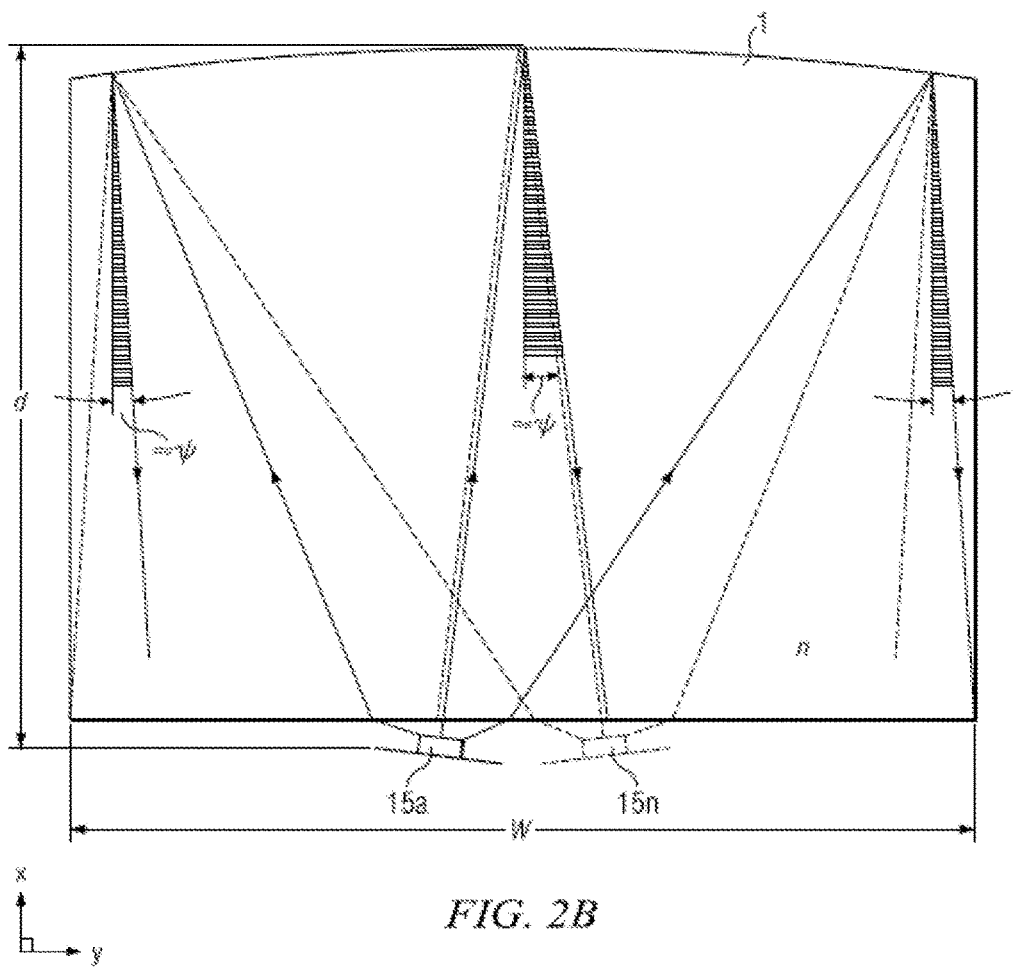
FIG. 2B is a schematic diagram illustrating light propagation in a front view of the directional display device of FIG. 2A, in accordance with the present disclosure.
Figure 2C:
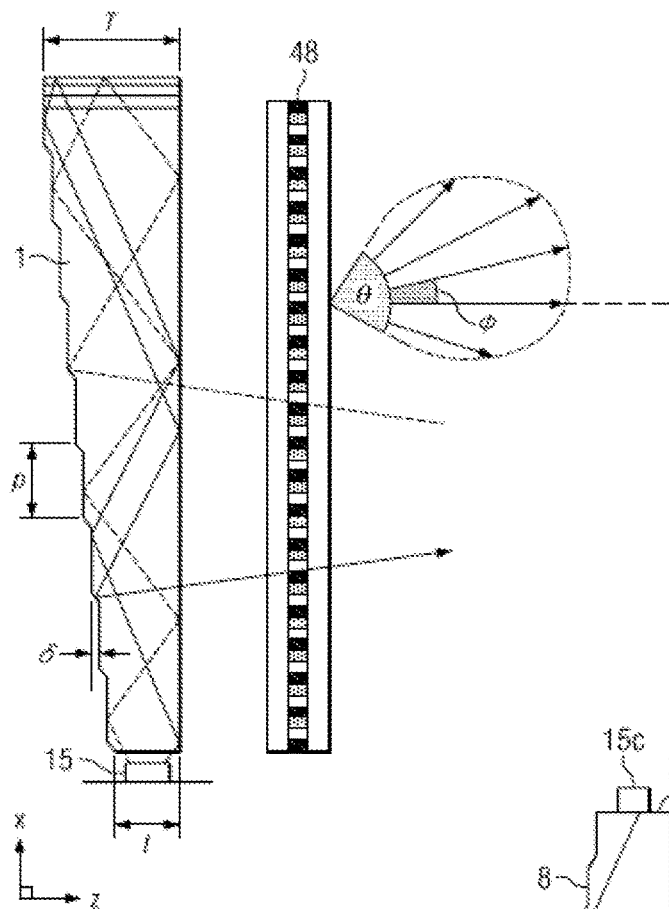
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
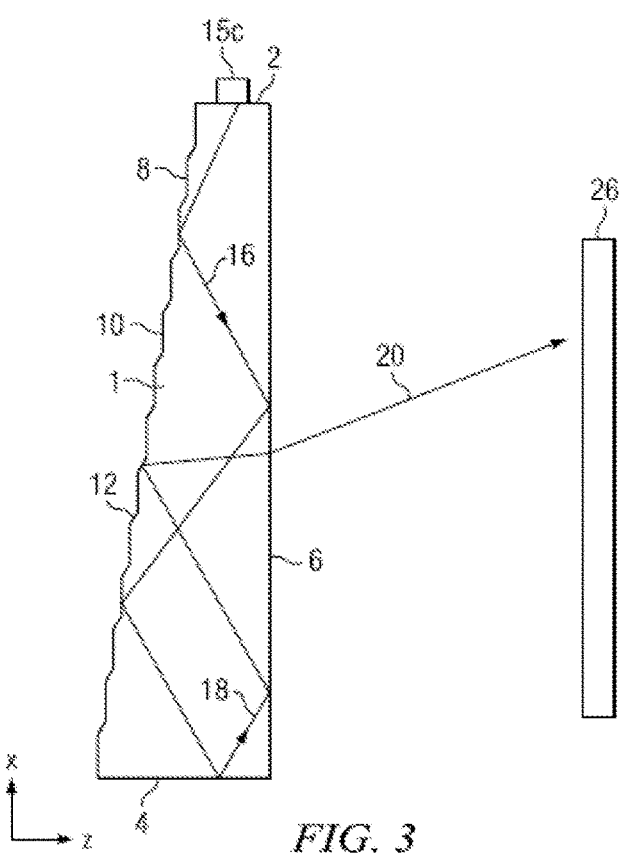
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
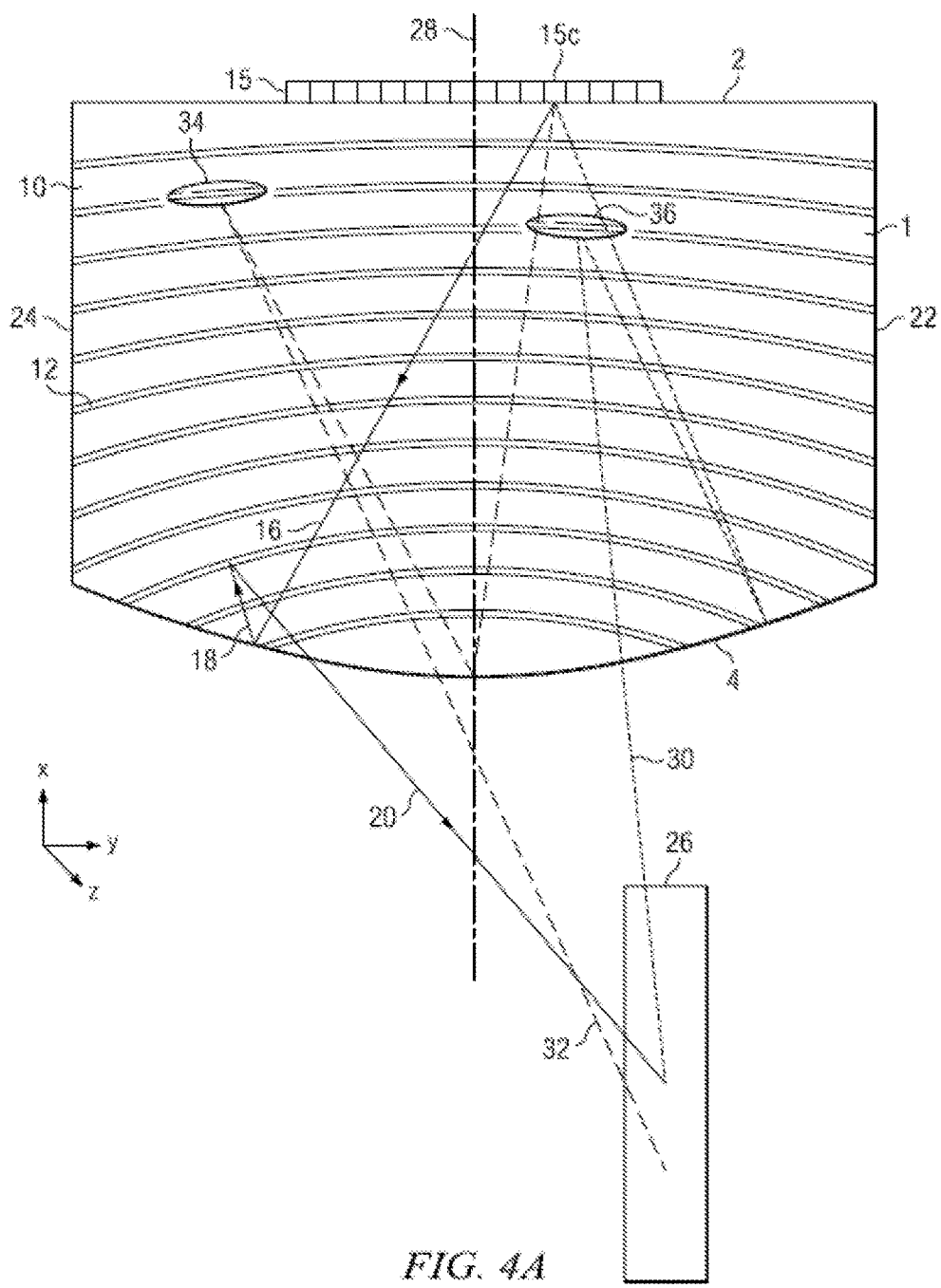
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
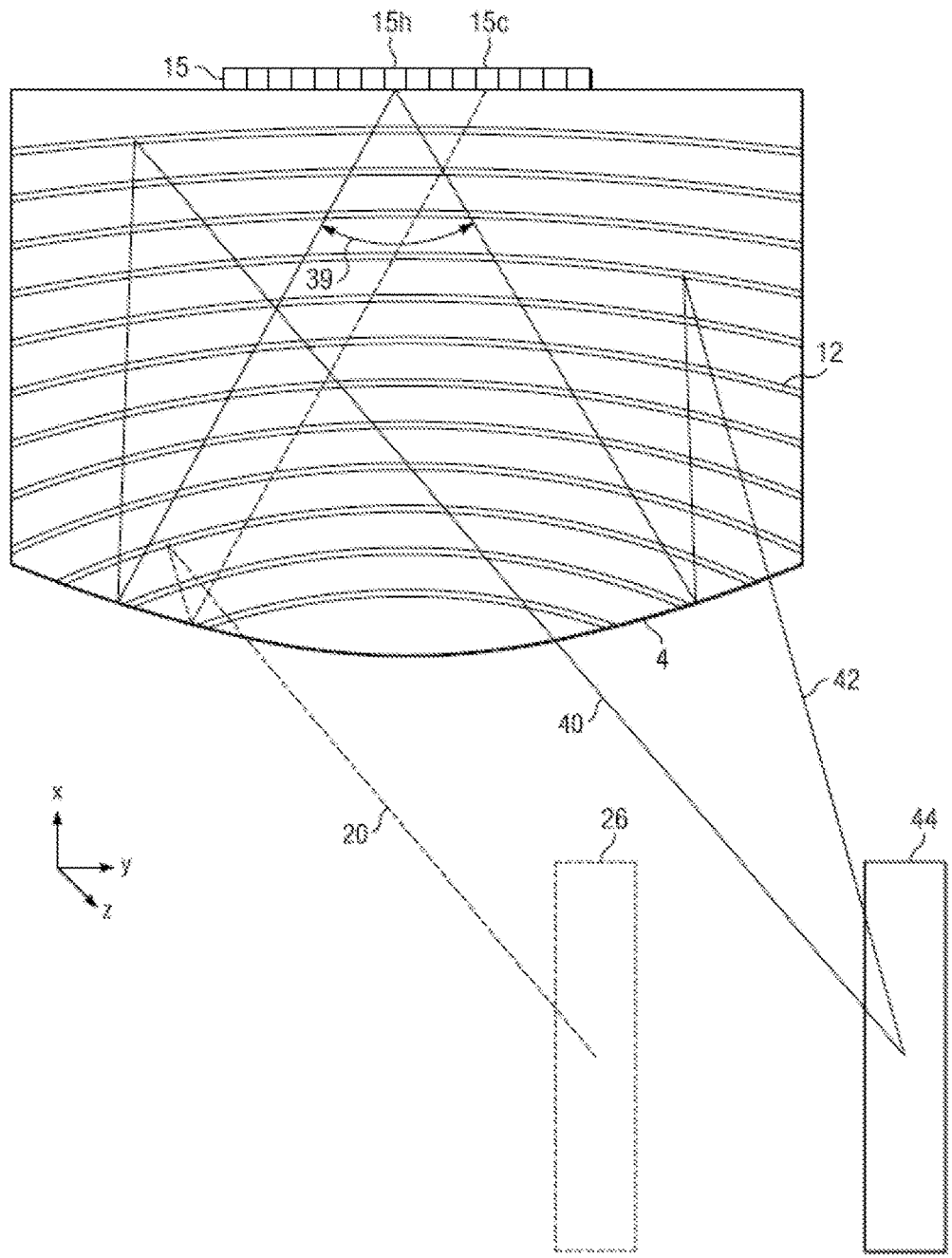
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
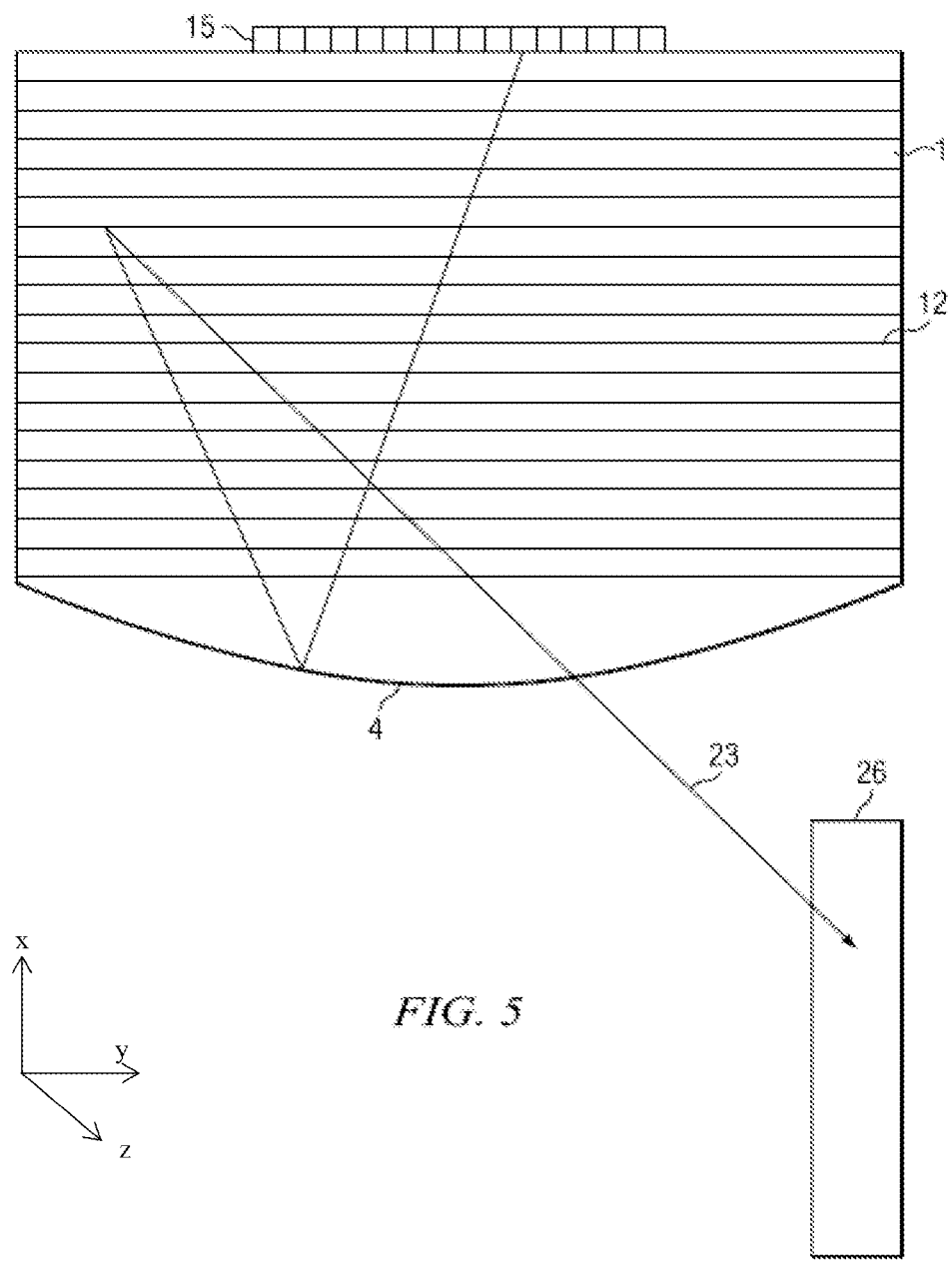
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
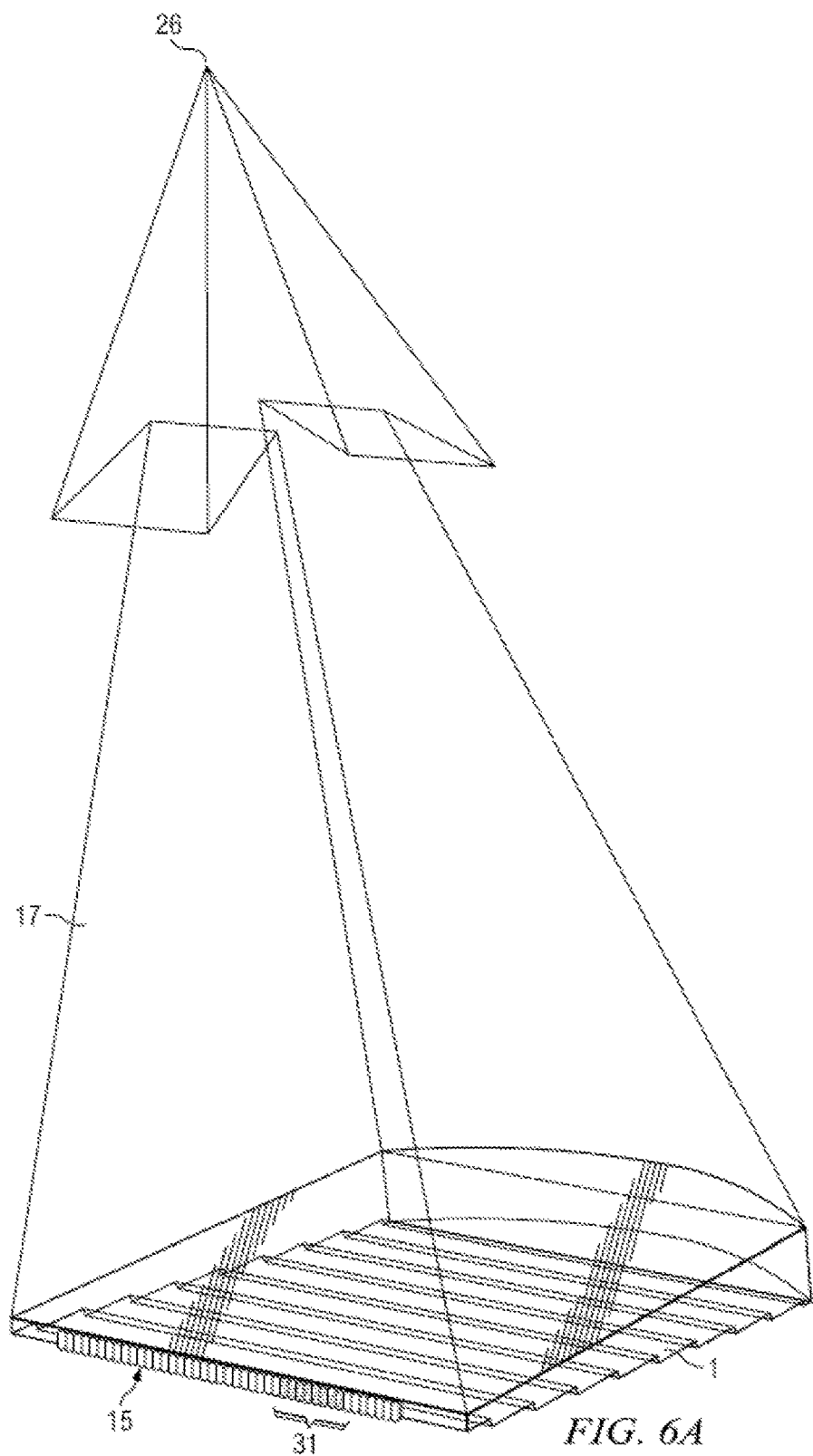
FIG. 6A is a schematic diagram illustrating one embodiment of the generation of a first viewing window in a time multiplexed directional display device in a first time slot, in accordance with the present disclosure.
Figure 6B:
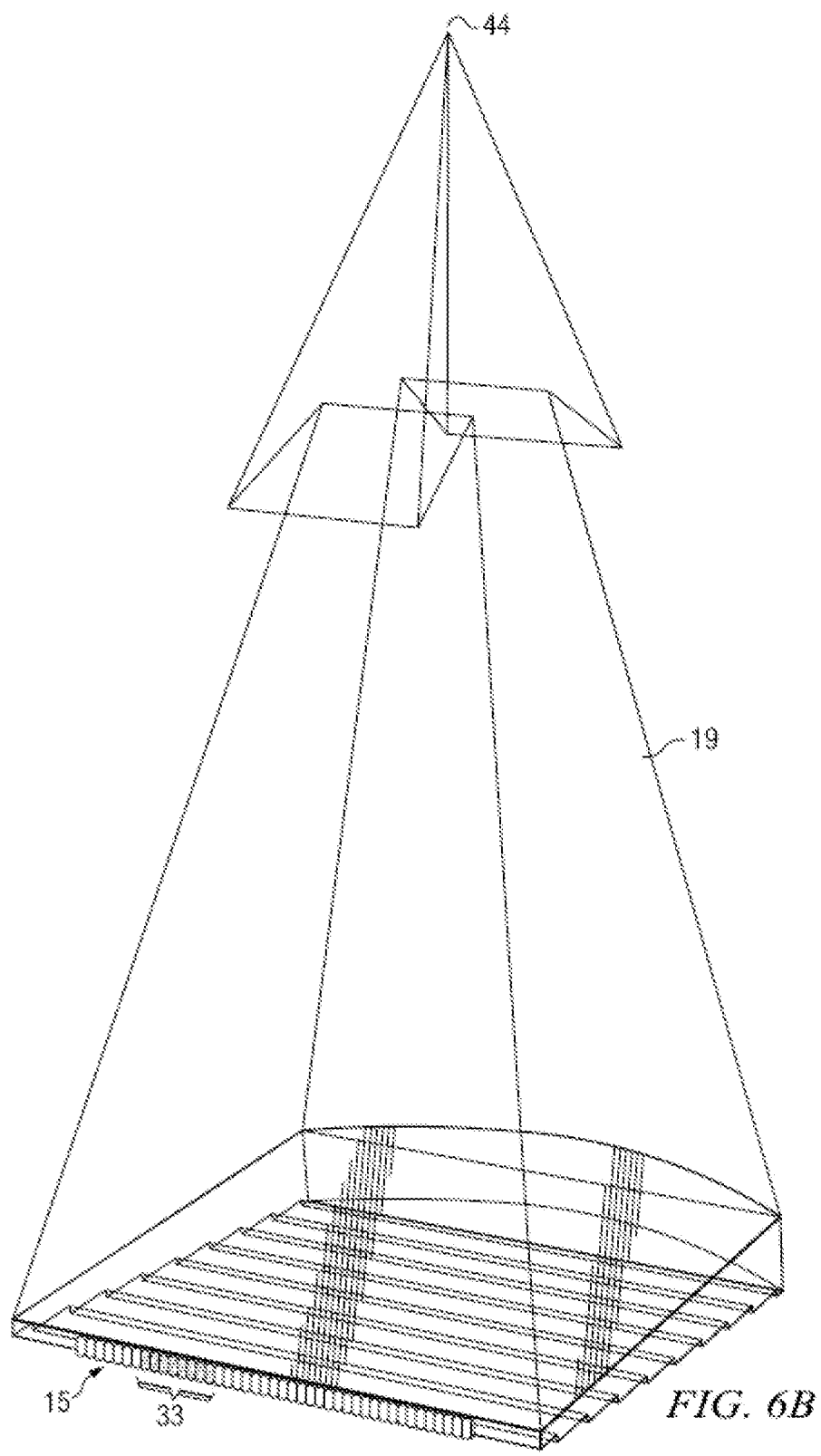
FIG. 6B is a schematic diagram illustrating another embodiment of the generation of a second viewing window in a time multiplexed directional display device in a second time slot, in accordance with the present disclosure.
Figure 6C:
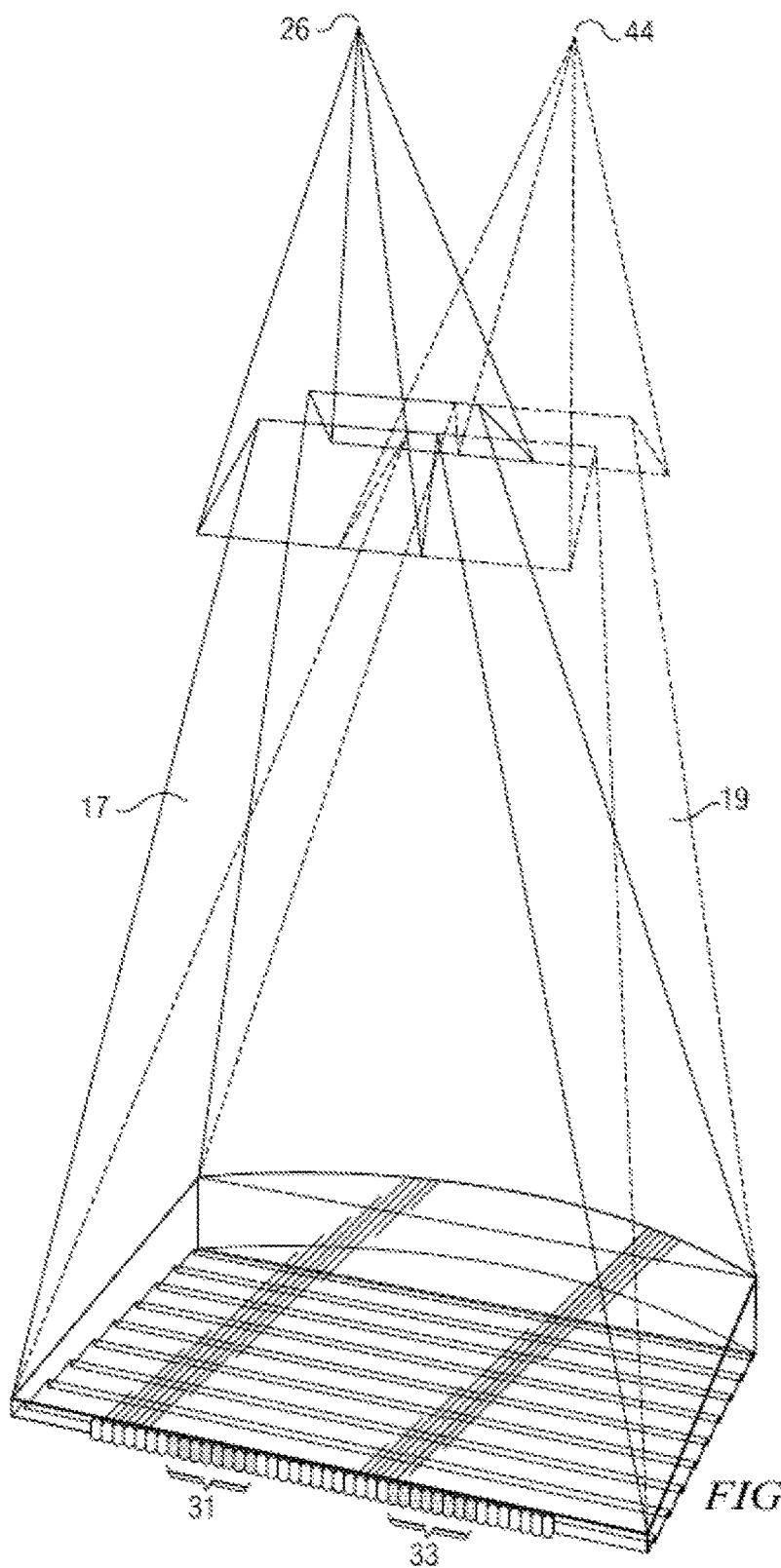
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
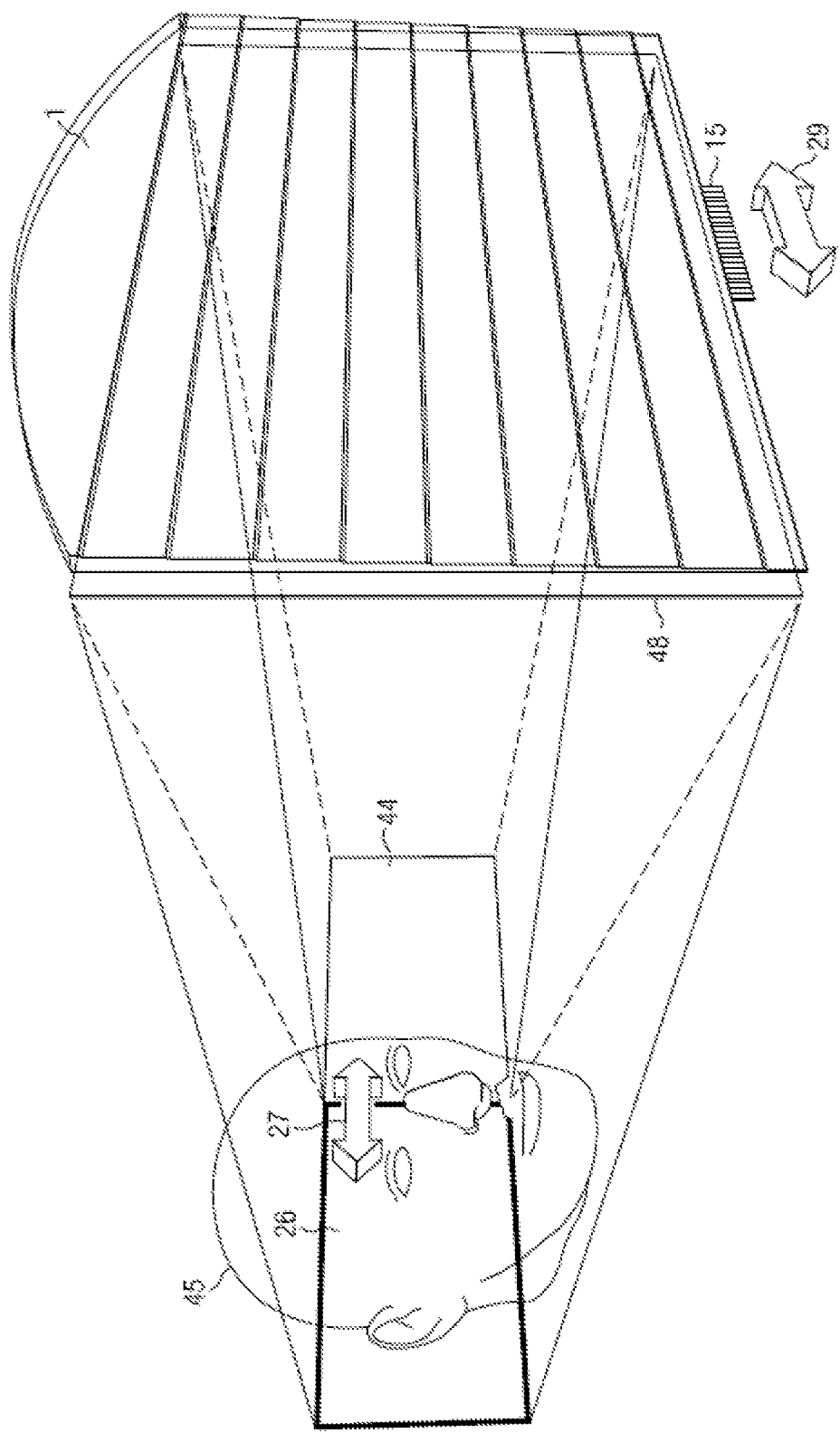
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all of the directional backlights described herein.

Figure 8:
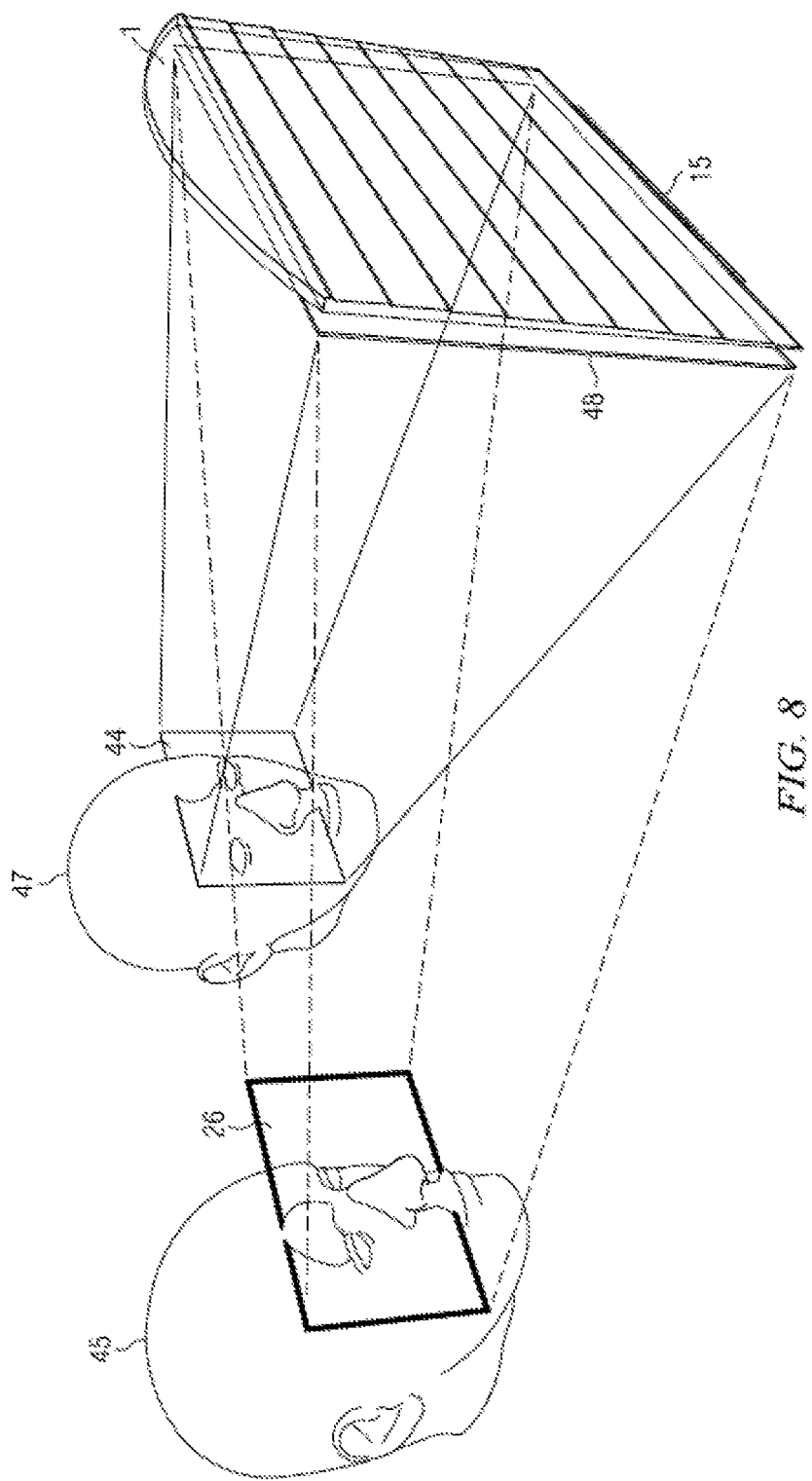
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
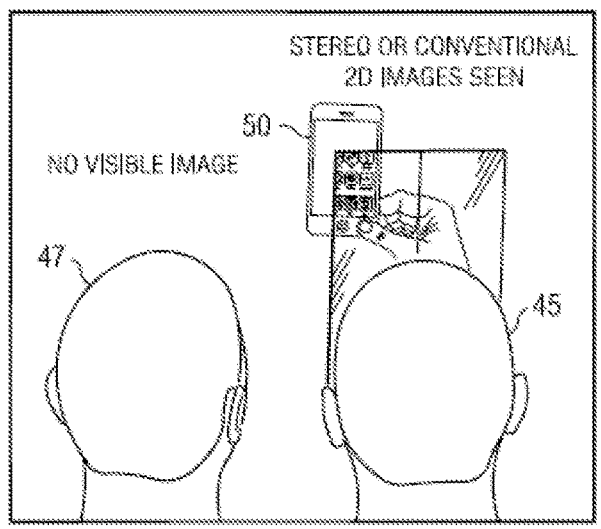
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
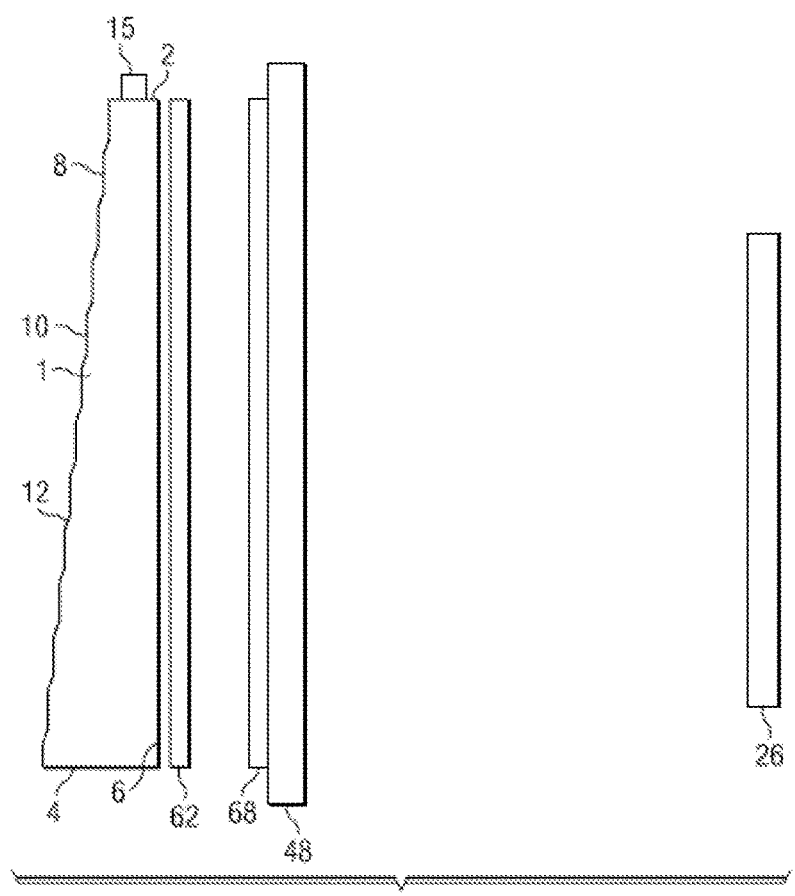
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

FIG. 11 is a schematic diagram illustrating in side view, the structure of a directional display device comprising a wedge directional backlight comprising a wedge waveguide 1104 with faceted mirror end 1102. The first guide surface 1105 of the waveguide 1104 is arranged to guide light by total internal reflection and the second guide surface 1106 is substantially planar and inclined at an angle to direct light in directions that break the total internal reflection for outputting light through the first guide surface 1105. The display device further comprises a deflection element 1108 extending across the first guide surface 1105 of the waveguide 1104 for deflecting light from array 1101 of light sources towards the normal to the first guide surface 1105. Further the waveguide 1104 may further comprise a reflective end 1102 for reflecting input light back through the waveguide 1104, the second guide 1106 surface being arranged to deflect light as output light through the first guide surface 1105 after reflection from the reflective end 1102. The reflective end has positive optical power in the lateral direction (y-axis) in a similar manner to the reflective end shown in FIG. 5 for example. Further facets in the reflective end 1102 deflect the reflected light cones within the waveguide 1104 to achieve output coupling on the return path. Thus viewing windows are produced in a similar manner to that shown in FIG. 11. Further the directional display may comprise a spatial light modulator 1110 and parallax element 1100 aligned to the spatial light modulator 1110 that is further arranged to provide optical windows. A control system 72 similar to that shown in FIG. 11 may be arranged to provide control of directional illumination providing viewing windows 26 and windows 109 from the parallax element and aligned spatial light modulator.

Thus a first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

Figure 12A:
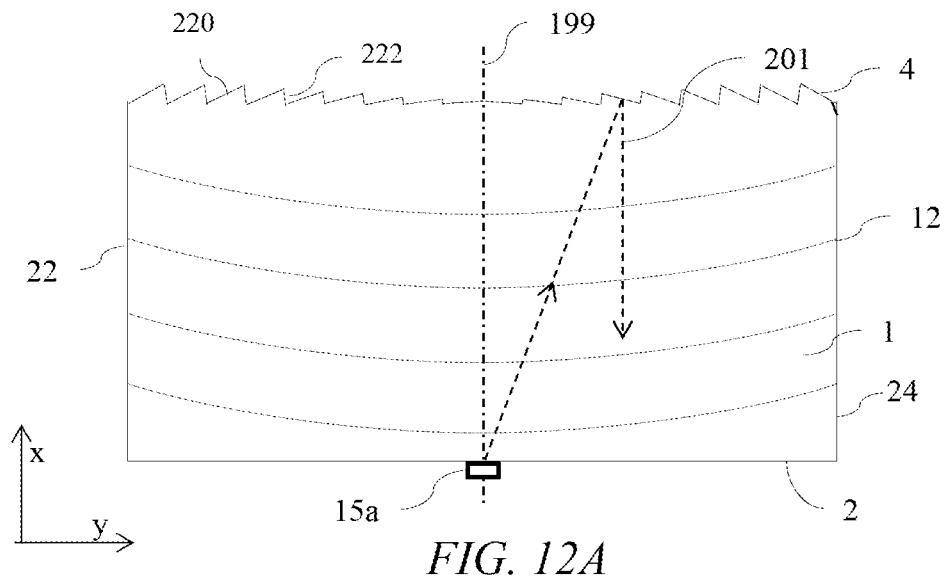
FIG. 12A and FIG. 12B are schematic diagrams illustrating in front and side views respectively, the structure of a directional display device comprising a stepped waveguide, in accordance with the present disclosure.
Figure 12B:
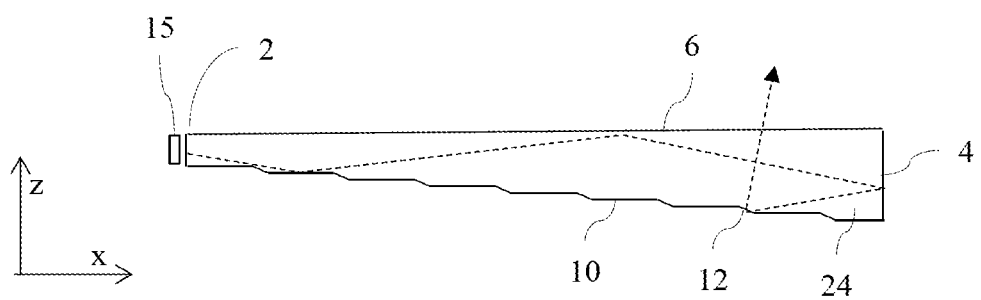

FIGS. 12A-12B are schematic diagrams illustrating in front and side views respectively, the structure of a directional display device comprising a stepped waveguide.

In comparison to the arrangement of FIG. 5, the reflective dome at end 4 of the waveguide is replaced by a Fresnel reflector comprising facets 222 and drafts 224. Further the linear facets are replaced by curved facets that are arranged to provide an optical window 26 that is formed by an image of a light source 15a of the array 15 of light sources. The light sources 15a-n are arranged on an input side 2 that is at the thin end of the waveguide 1.

The arrangement of FIG. 12A can be considered as an on-axis imaging system as will be described with reference to FIG. 12C which is a schematic diagram illustrating in an expanded view, the operation of the stepped waveguide of FIGS. 12A-12B. Such expanded view conveniently illustrates the three dimensional arrangement of optical axes of the system in a two dimensional image. Light rays 201 from source 15a are directed through the waveguide 1 to the Fresnel reflector at end 4. At the end 4, the reflection is represented as a transmission through the surface providing rays direction that is substantially parallel to axis 199. The coordinate system rotates either side of position 50 at extraction feature 12. The reflection at feature 12 is represented as a transmission at a surface. Optical window 26a, which is an image in the lateral direction of light source 15a is centered on axis 199, with the same lateral displacement as the source 15a. Thus the axis 199 can be considered the optical axis of the system. In such an on-axis imaging case, the optical axis is substantially the same as the line along which there is some degree of reflective symmetry in the system in the lateral direction (y-axis). Further, the optical axis 299 is not deflected towards the sides of the waveguide 1.

Figure 12C:
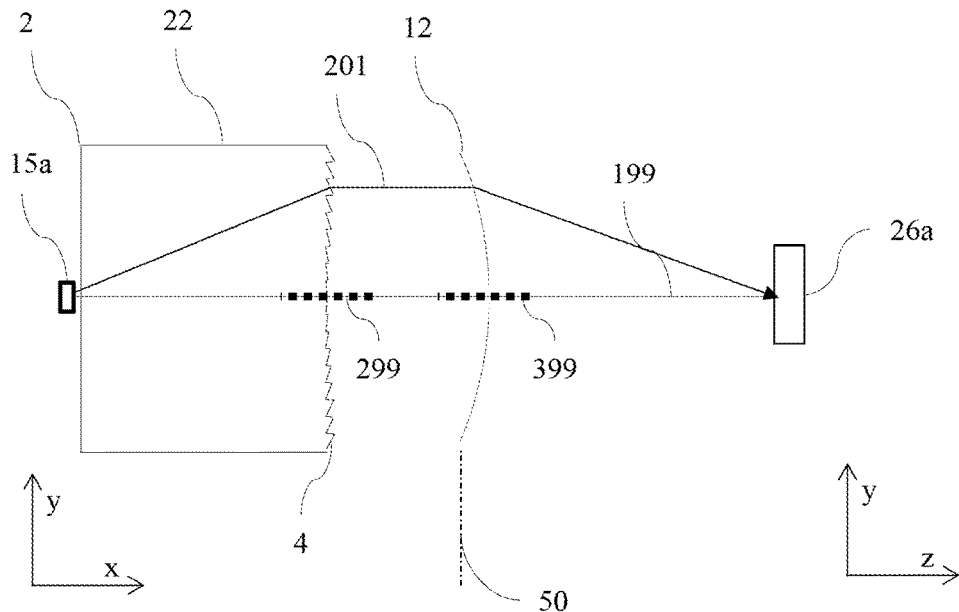
FIG. 12C is a schematic diagram illustrating in an expanded view, the operation of the stepped waveguide of FIGS. 12A-12B, in accordance with the present disclosure.

In the on-axis imaging arrangement of FIGS. 12A-12C, the optical axis 199 is further coincident with optical axis 299 of the Fresnel reflector and optical axis 399 of the curved light extraction feature 12.

Figure 13:
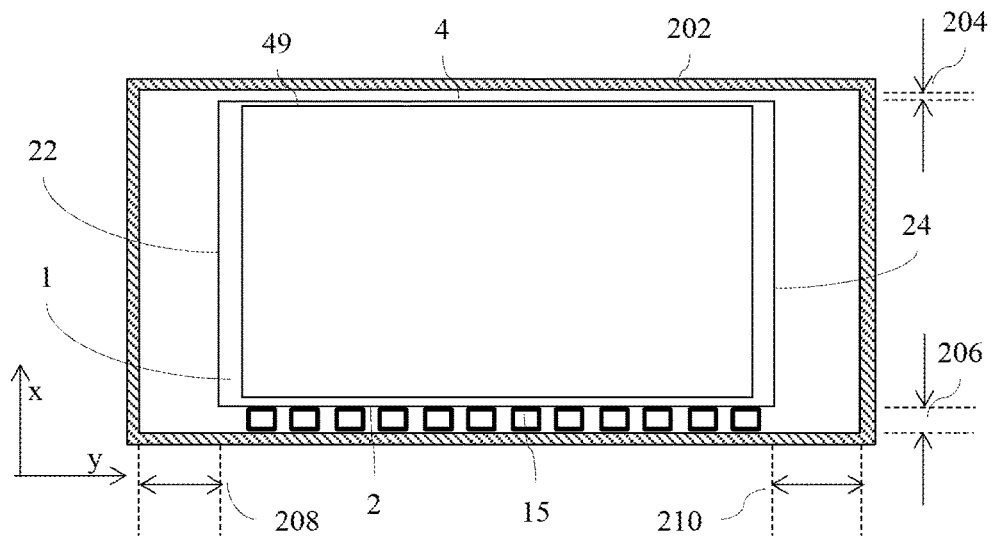
FIG. 13 is a schematic diagram illustrating in front view, an arrangement of a waveguide of FIG. 12A in a mobile display apparatus, in accordance with the present disclosure.

FIG. 13 is a schematic diagram illustrating in front view, an arrangement of a waveguide of FIG. 12A in a mobile display apparatus comprising outer frame 202 and a spatial light modulator 48 comprising rectangular active area border 49. To achieve desirable uniformity at the edges of the spatial light modulator 48, the area of the waveguide 1 is greater than the active area border 49.

The long edge bezel width 204 from the edge of the waveguide 1 to the inner edge of the frame 202 on the side 4 comprising a Fresnel reflector may be limited by light shielding of the Fresnel reflector, however may be relatively small, for example 3 mm or less. The long edge bezel width 206 on the input side 2 is determined by both light shielding, the light source 15 depth, electrical fan-out and light bar mechanics and may typically be larger than the bezel width 204.

Typically the requirements for short edge bezel widths 208, 210 (being the distance from the edges 22, 24 to the inner border of the frame 202) are somewhat large, for example approximately 10 mm or more. Thus oversized waveguide 1 in the lateral direction is considered more desirable than oversize in the orthogonal (x axis) direction.

For mobile devices such as cell phones for example it would be desirable to minimize long edge bezel width of the directional waveguide, to achieve a desirable form factor.

Figure 14:
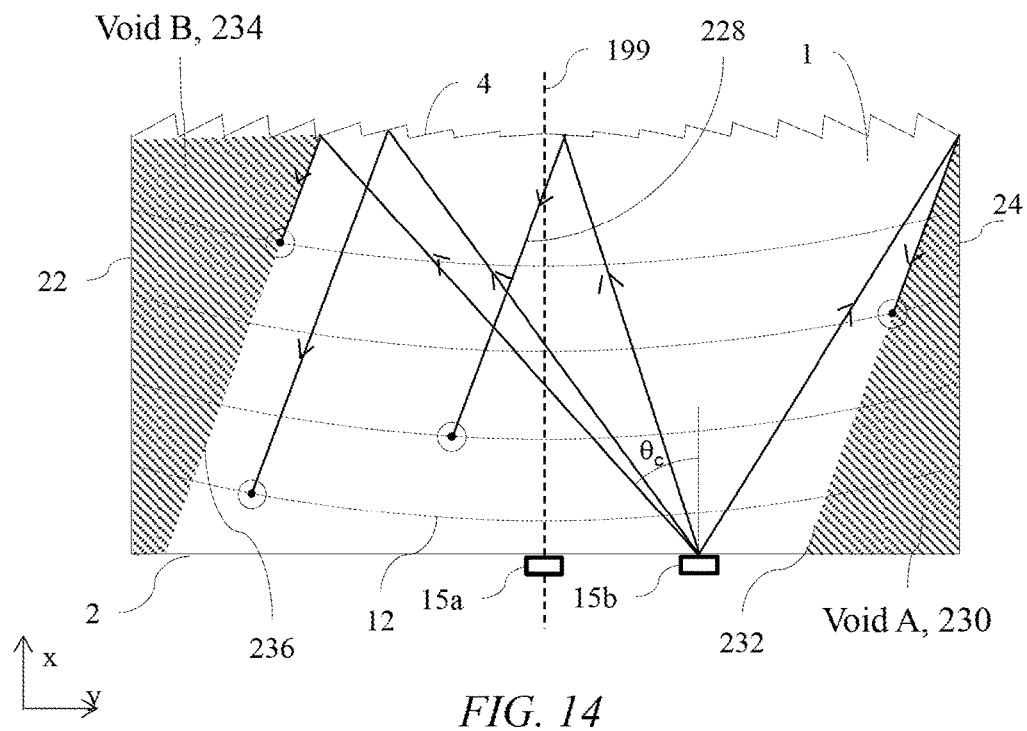
FIG. 14 and FIG. 15 are schematic diagrams illustrating in front view, origin of voids and filling of void A in the waveguide of FIG. 12A, in accordance with the present disclosure.
Figure 15:
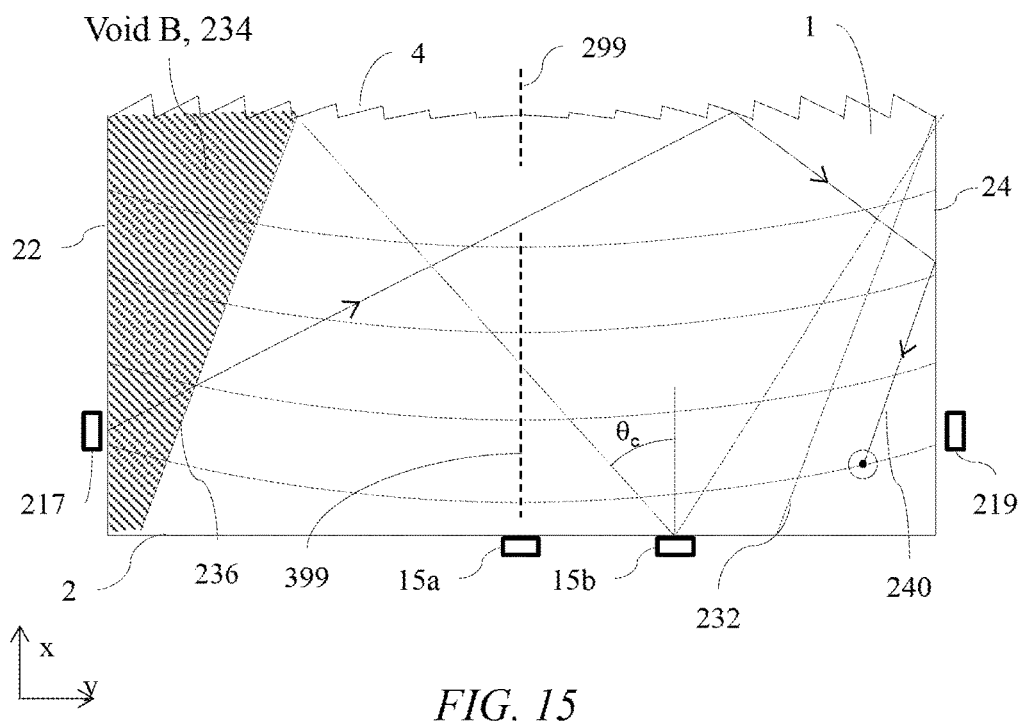

FIGS. 14-15 are schematic diagrams illustrating in front view, origin of voids and filling of void A in the waveguide of FIG. 12A. For off-axis sources such as source 15b, then void regions are provided. Void A, 230 is provided by light that is outside a cone angle subtended by the light source and adjacent edge of the Fresnel reflector. Boundary 232 separates void A from the main illumination region. Void B, 234 is provided by light rays that are outside the critical angle θc of the light entering the waveguide for a light source in air. Boundary 236 separates void B from the main illumination region. Both voids create undesirable non-uniformities for off-axis viewing positions.

FIG. 15 is a schematic diagram illustrating in front view correction of illumination void non-uniformities in the directional waveguide of FIG. 14 and as described in U.S. Provisional Patent Appl. No. 62/167,185, incorporated herein by reference in its entirety. Void A 230 may be compensated by light source array 217 arranged on the sides of the waveguide 1 by means of light ray 240 and similarly light source array 219 may compensate for a void A in the symmetric case.

In comparison to the present embodiments described herein, the light sources 217, 219 on sides 22, 24 do not provide on-axis illumination. The optical axes 299, 399 of the Fresnel reflector and curved facets 12 respectively are aligned substantially centrally to the waveguide 1 and thus are not deflected towards the sides 22, 24 of the waveguide.

It would be desirable to provide a directional waveguide wherein on-axis optical windows 26 are provided with minimal input side bezel width 206.

Figure 16A:
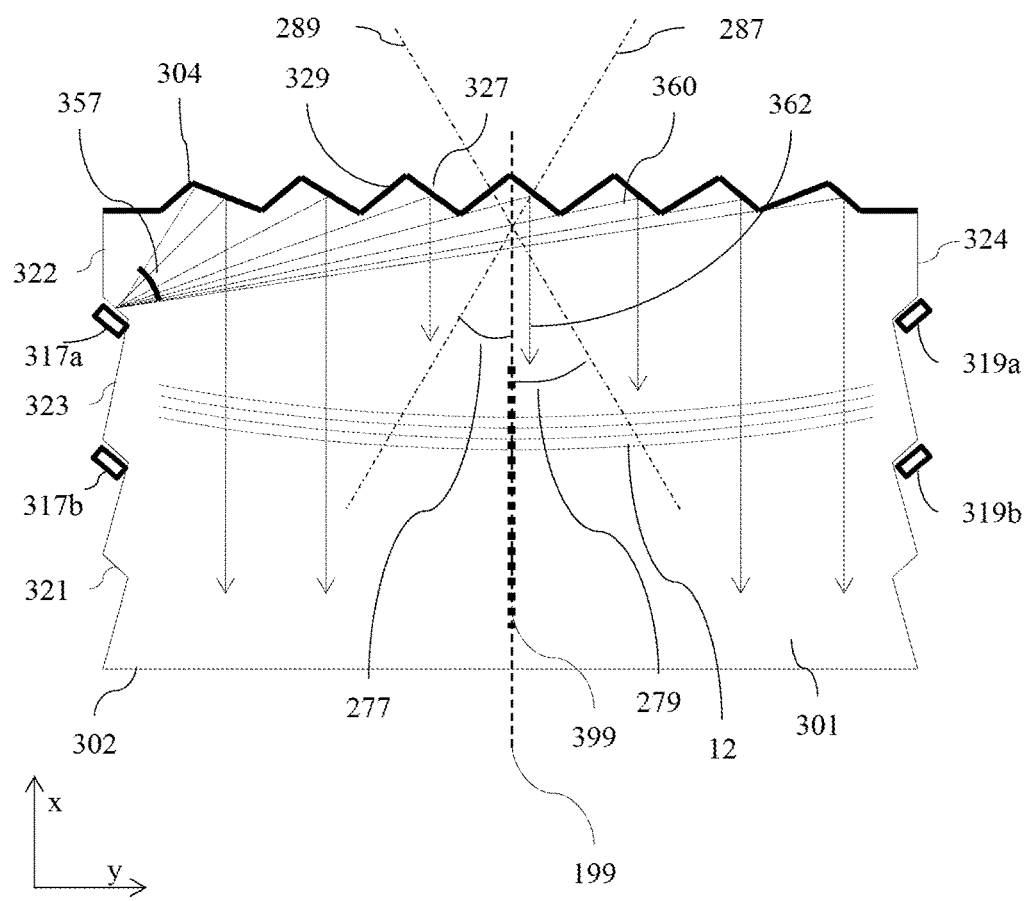
FIG. 16A and FIG. 16B are schematic diagrams illustrating in front and side views respectively, a directional waveguide comprising curved light extraction facets and a Fresnel reflector with first and second inclined optical axes, in accordance with the present disclosure.
Figure 16B:
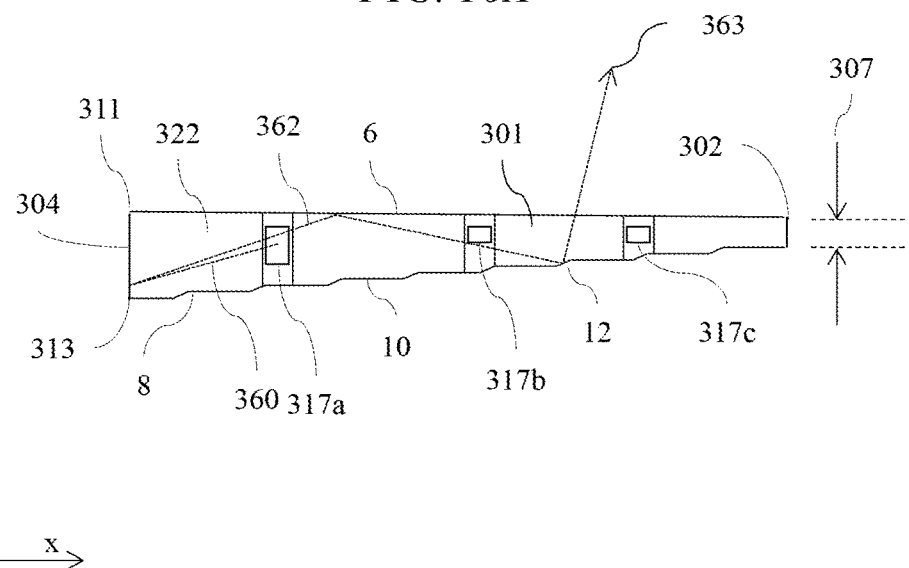

FIGS. 16A-16B are schematic diagrams illustrating in front and side views respectively, a directional waveguide 301 comprising curved light extraction facets 12 and a Fresnel reflector 304 with first and second optical axes 287 and 289. Curved facets 12 may have an optical axis 399 that is substantially parallel to the x-axis.

Thus a directional backlight may comprise a directional waveguide 301 and light sources 317a-n, the directional waveguide 301 comprising: a reflective end 304 that is elongated in a lateral direction (y-axis); first and second opposed guide surfaces 6, 8 extending from laterally extending edges 311, 313 of the reflective end 304 for guiding input light 360 along the waveguide 301 towards the reflective end 304 and for guiding light 362 reflected by the reflected end 304 away from the reflective end 304, the second guide surface 6 being arranged to deflect light reflected from the reflective end 304 through the first guide surface 6 as output light 363; and side surfaces 322, 324 extending between the first and second guide surfaces 6, 8, wherein the light sources 317a-n include an array 317 of light sources arranged along a side surface 322 to provide said input light 360 through that side surface 322, and the reflective end 304 comprises first and second facets 327, 329 alternating with each other in the lateral direction, the first facets 327 being reflective and forming reflective facets of a Fresnel reflector having positive optical power in the lateral direction, the second facets 329 forming draft facets of the Fresnel reflector, the Fresnel reflector having an optical axis 287 that is inclined towards the side surface 322 in a direction in which the Fresnel reflector deflects input light 360 from the array 317 of light sources into the waveguide 301.

Further, the light extraction features 12 have an optical axis 399 to which the optical axis of the Fresnel reflector 287 is inclined. Thus the optical axis 287 may be arranged so that light sources in array 317 on side 322 may be arranged to illuminate the light extraction features normally and provide an off-axis optical window.

The side surface 322 along which the array 317 of sources 317a-n is arranged comprises recesses including input facets 321 facing the reflective end 304, the light sources 317a-n being arranged to provide said input light through the input facets 321. A cone of light with input angle 357 may be provided that is directed in the lateral direction to the Fresnel reflector. If the surface of the facet 321 is for example planar, then the cone angle 357 may be approximately 84 degrees. Advantageously, efficient illumination of the Fresnel reflector may be arranged.

Figure 17:
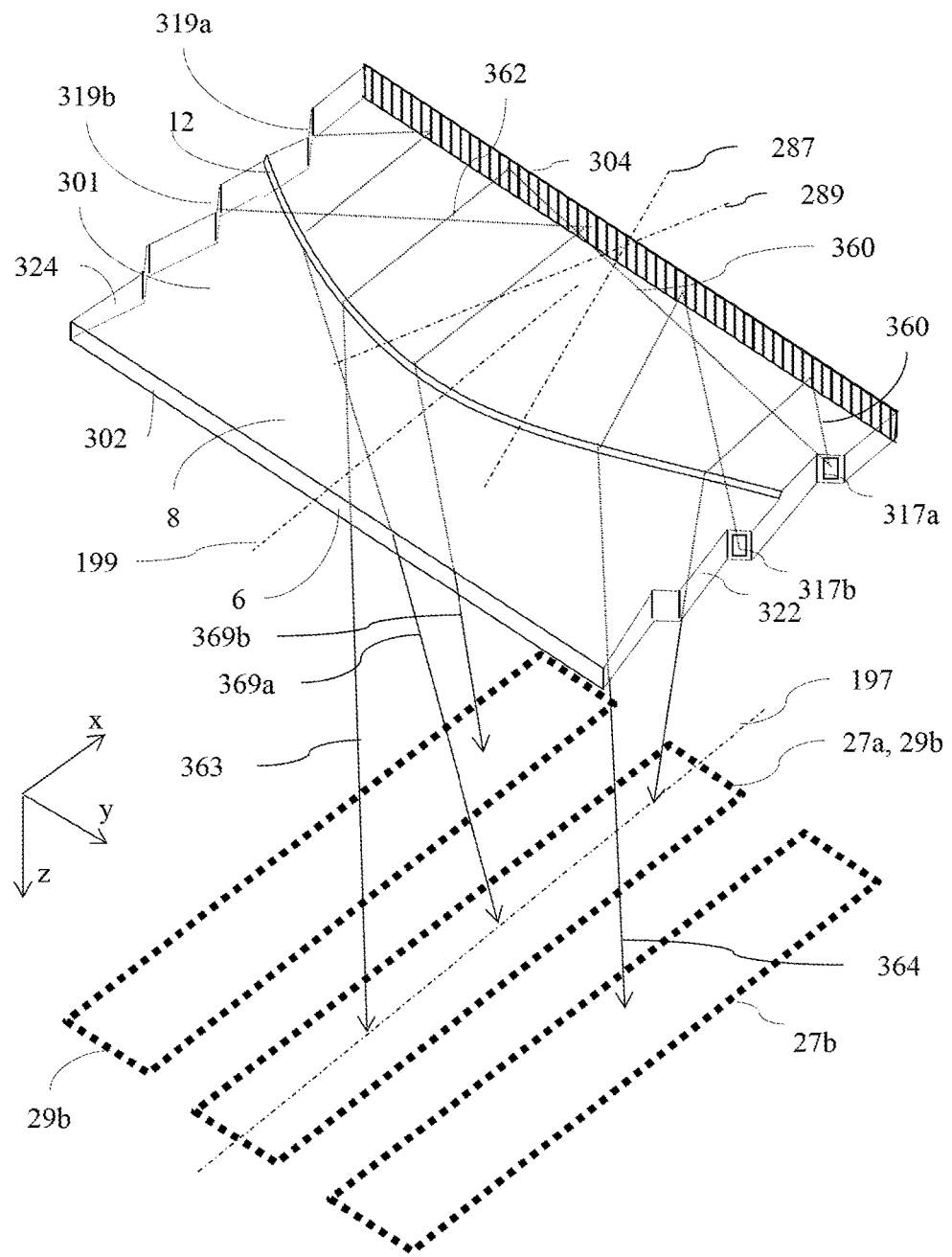
FIG. 17 is a schematic diagram illustrating in perspective view, a directional waveguide comprising a Fresnel reflector with first and second inclined optical axes arranged to provide first and second optical windows, in accordance with the present disclosure.

FIG. 17 is a schematic diagram illustrating in perspective view, a directional waveguide comprising a Fresnel reflector with first and second inclined optical axes arranged to provide first and second optical windows. For illustrative convenience a single light extraction feature 12 is shown, however typically the light extraction features 12 and the intermediate regions 10 may alternate with one another in a stepped shape.

The waveguide 301 is arranged to direct the output light 360 from the light sources 317a-n into respective optical windows 27a-n in output directions that are distributed laterally in dependence on the positions of the light sources 317a-n.

The light extraction features 12 have positive optical power in the lateral direction. Thus light source 317a provides optical window 27a by means of rays 360, 362, 363 and light source 317b provides optical window 27b by means of ray 364, that is displaced in the lateral direction from optical window 27a. The extent of the optical windows 27a,b in the x direction may be substantially determined by the propagation of the light cone within the waveguide 301 in the x-z plane. Advantageously, light sources are not positioned on the side 302 that is opposite the reflective end 304 so that bezel width 206 is minimized.

The extent of the optical windows 27a-n, 29a-n in the lateral direction may be determined by the width and spacing of light sources 317a-n, 319a-n, optical aberrations and diffusion in the display apparatus.

The height 307 of the side 302 may be thinner than the desirable height of the light sources 17a-n of the array 17. As will be described below, advantageously the geometric efficiency of the waveguide 301 may be increased in comparison to the arrangement of FIG. 12A.

FIGS. 16A-17 further illustrate a directional backlight, wherein the light sources include two arrays of light sources 317, 319 each arranged along one of the side surfaces 322, 324, and the first facets 327 and the second facets 329 are reflective, the first and second facets 327, 329 forming, respectively, reflective facets of first and second Fresnel reflectors each having positive optical power in the lateral direction, the second and first facets 329, 327 forming, respectively, draft facets of the first and second Fresnel reflectors 327, 329, the first and second Fresnel reflectors having optical axes 287, 289 inclined towards respective side surfaces 322, 324 in directions in which the Fresnel reflectors deflect input light from the array of light sources arranged along the respective side surface into the waveguide 301.

Long side 302 may be substantially planar or may have other optical structures as will be described below. Short sides 322, 324 may be provided with light input regions 321 and draft regions 323.

The first and second facets 327, 329 may have mirror symmetry about a plane of symmetry extending from the reflective end 304, the optical axes 287, 289 of the first and second Fresnel reflectors being inclined from the plane of symmetry towards the respective side surfaces. Thus axis 287 may be inclined at non zero angle 277 with respect to a plane containing axis 199 and axis 289 may be inclined at non zero angle 279. Axes 287, 289 may intersect at the reflective end 304, or some displacement of optical axes may be provided to achieve a window offset as will be described below. Control of window profile may be provided, advantageously improving optimization of spatial and angular uniformity.

Further the light sources 317a-n and 319a-n may be arranged with mirror symmetry about the plane of symmetry. Light source array 17 may comprise light sources 17a-n that are aligned with input regions 321 on short side 322. On axis light sources may be arranged to provide on axis optical windows 27a, 29b that are aligned with axis 197 that is parallel to the axis 199.

As illustrated in FIGS. 16B and 17 the first guide surface 6 may be arranged to guide light by total internal reflection and the second guide surface may comprises a plurality of light extraction features 12 oriented to direct light reflected by the reflected end 304 in directions allowing exit through the first guide surface 6 as the output light 363 and intermediate regions 10 between the light extraction features 12 that are arranged to guide light 360, 362 along the waveguide 301.

Figure 18A:
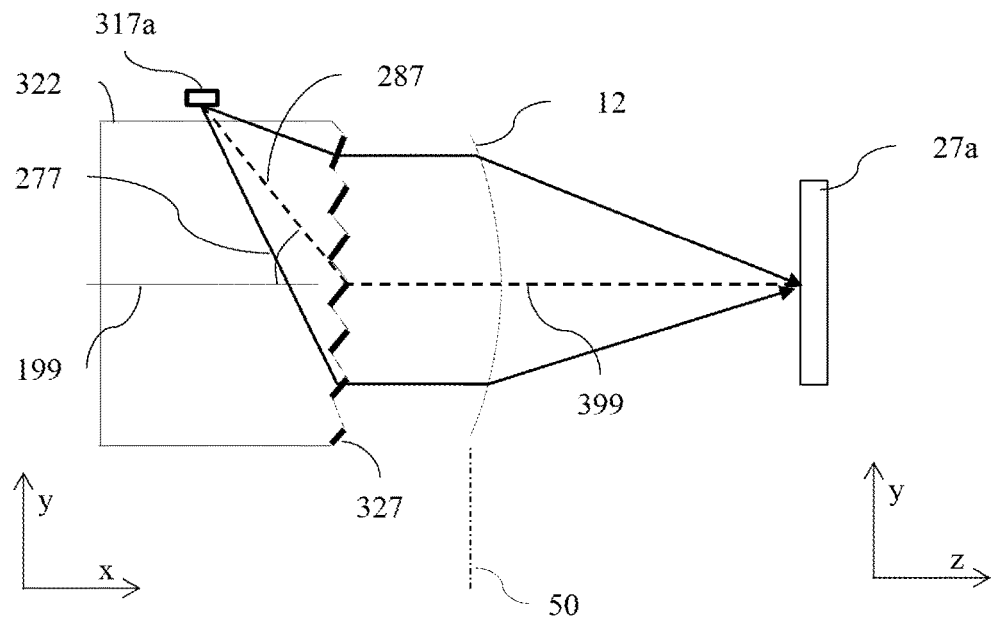
FIG. 18A and FIG. 18B are schematic diagrams illustrating in expanded views, the operation of the stepped waveguide of FIGS. 16A-16B, in accordance with the present disclosure.
Figure 18B:
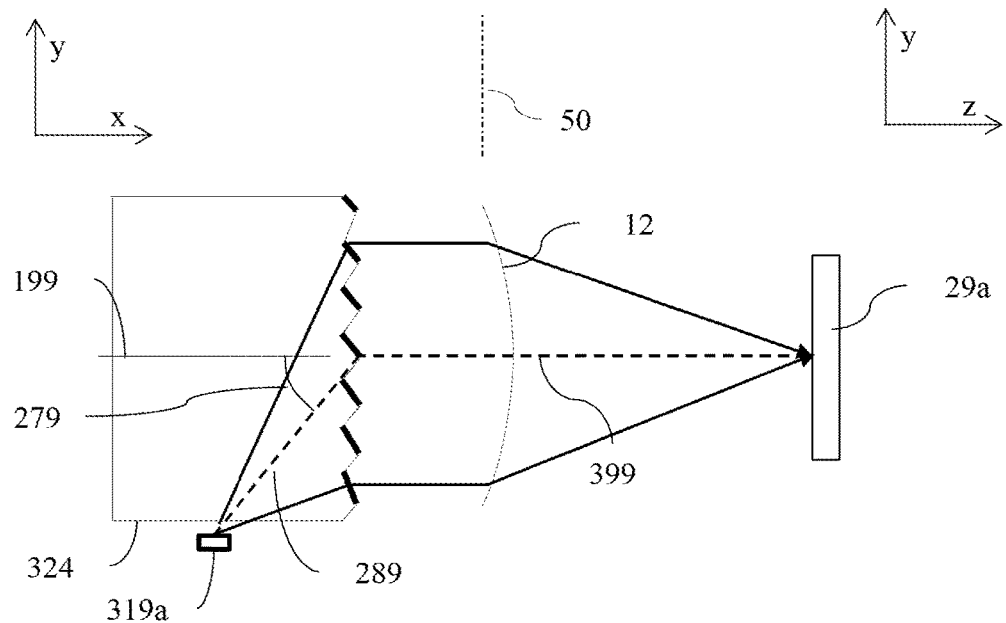

FIG. 18A-18B are schematic diagrams illustrating in expanded views, the operation of the stepped waveguide of FIGS. 16A-17. Thus a ray from the center of light source 317a propagating along axis 287 inclined at angle 277 to axis 199 and along axis 399 may be directed to center of optical window 27a. Similarly a ray from the center of light source 319a propagating along axis 289 inclined at angle 279 to axis 199 and along axis 399 may be directed to center of optical window 29a that may overlap with window 27a at the window plane as will be described herein.

Figure 18C:
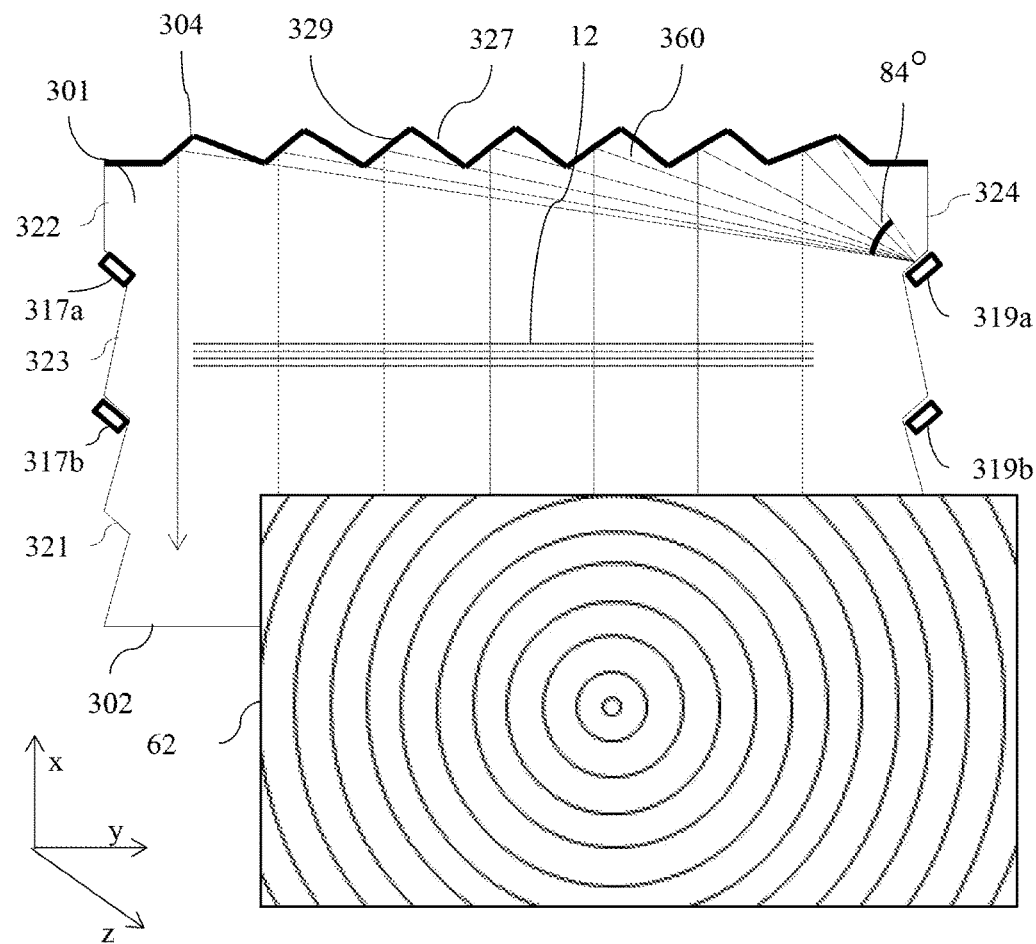
FIG. 18C is a schematic diagram illustrating in front view, a directional waveguide comprising linear light extraction facets, a Fresnel lens and a Fresnel reflector with first and second inclined optical axes, in accordance with the present disclosure.

FIG. 18C is a schematic diagram illustrating in front view, a directional waveguide comprising linear light extraction facets, a Fresnel lens 62 and a Fresnel reflector with first and second inclined optical axes. The light extraction features 12 may be linear, and optical power in the lateral direction provided by the Fresnel lens 62. Advantageously the tooling of the mold of the waveguide 1 may be more conveniently achieved.

Figure 19A:
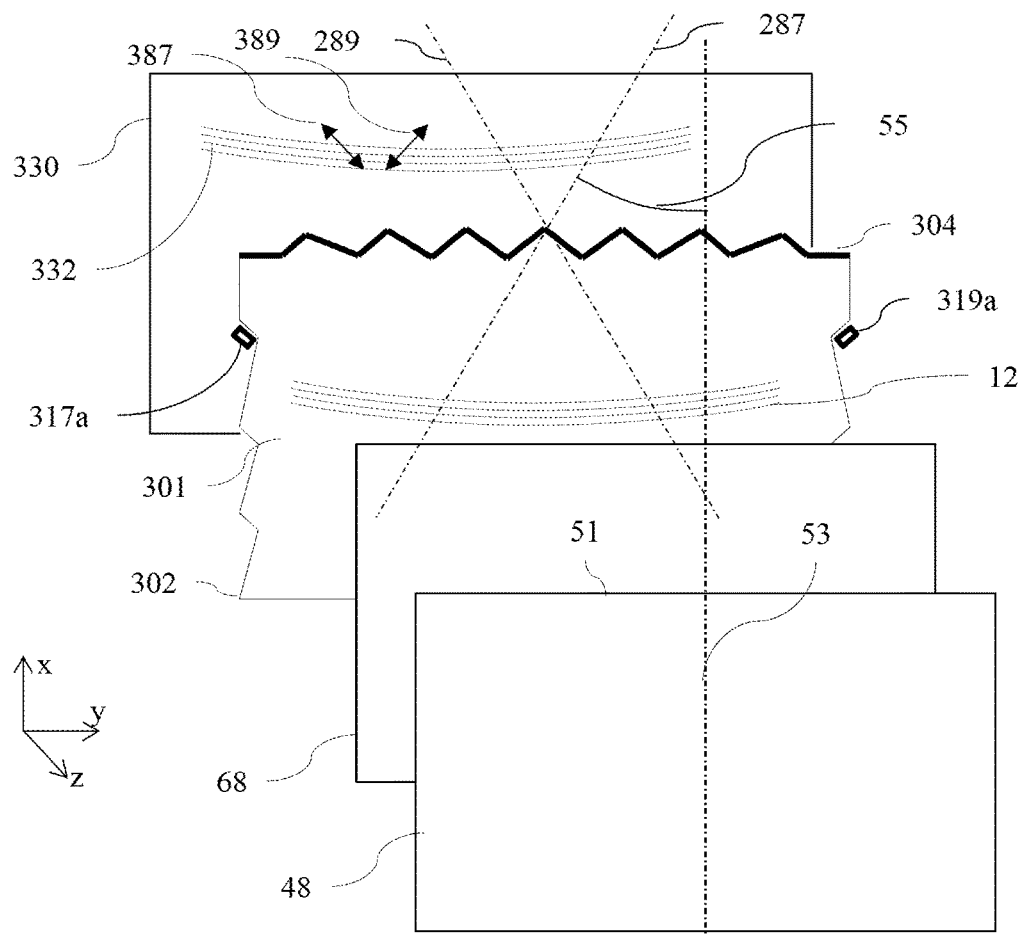
FIG. 19A is a schematic diagram illustrating in expanded front view, a directional display comprising a directional waveguide comprising a Fresnel reflector with first and second inclined optical axes, in accordance with the present disclosure.

FIG. 19A is a schematic diagram illustrating in expanded front view, a directional display device comprising a directional waveguide 301 comprising a Fresnel reflector with first and second inclined optical axes 287, 289.

Thus a directional display device may comprise a directional backlight as described above and a transmissive spatial light modulator 48 arranged to receive the output light from the waveguide 301 and to modulate it to display an image. The spatial light modulator 48 may have a rectangular shape having a first side 51 aligned with the reflective end 304 of the directional waveguide 301, the optical axis 287 of the Fresnel reflector being inclined at a non-zero angle 55 with respect to an axis 53 of the rectangular shape of the spatial light modulator 48 that is perpendicular to its first side 51.

Advantageously the directional display device can provide narrow long-edge bezel widths 204, 206 in mobile display devices such as cell phones.

It would be desirable to efficiently collect light from waveguide 301 and distribute to optical windows. Further, it would be desirable to efficiently provide polarized light to spatial light modulator 48.

Figure 19B:
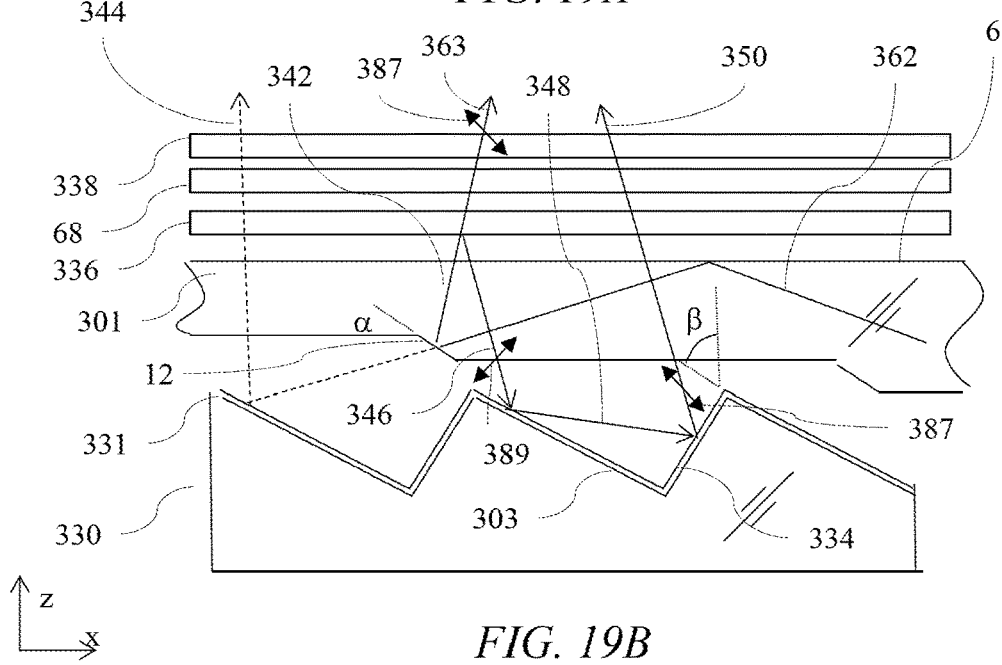
FIG. 19B is a schematic diagram illustrating in side view, a directional display comprising a directional waveguide comprising a Fresnel reflector with first and second inclined optical axes, in accordance with the present disclosure.

FIG. 19B is a schematic diagram illustrating in side view, a directional display comprising a directional waveguide comprising a Fresnel reflector with first and second inclined optical axes. Thus a directional backlight may further comprise a rear reflector 330 comprising a linear array 332 of reflective facets 303 arranged to reflect light from the light sources 317a-n, 319a-n, that is transmitted through the plurality of facets 12 of the waveguide 301, back hrough the waveguide 301 to exit through the first guide surface 6 into said optical windows 27a-n, 29a-n. The facets 12 of the waveguide 301 and the reflective facets 303 of the rear reflector 330 may be inclined in the same sense in a common plane orthogonal to said lateral direction. In a similar manner to that described in U.S. Patent Publ. No. 2014/0240828 entitled "Directional backlight," filed Feb. 21, 2014 (Attorney Ref. No. 355001), and incorporated herein by reference in its entirety, the facets 12 of the waveguide may be inclined at an angle ($\pi/2-\alpha$) to the normal to the first guide surface 6 and the reflective facets of the rear reflector 303 may be inclined at an angle β to the normal to the first guide surface, and $2\beta > \pi/2 - \sin^{-1}(n \cdot \sin(\alpha - \theta_c))$, $\theta_c$ being the critical angle of the facets of the waveguide and n being the refractive index of the material of the waveguide.

Advantageously light that is transmitted by facets 12 of waveguide 301 may be efficiently directed towards the viewing windows 27a-n, 29a-n.

The rear reflector may be spaced from the waveguide 301 such that the light from an individual facet 12 of the waveguide 301 is incident on plural reflective facets 303 of the rear reflector 330, the rear reflector 330 further comprising intermediate facets 334 extending between the reflective facets 303 of the rear reflector 330, the intermediate facets 334 being inclined in an opposite sense from the reflective facets 303 of the rear reflector 330 at an angle such that said light from the light sources that is transmitted through the plurality of facets 12 of the waveguide 301 is not incident on the intermediate facets 334.

Advantageously light that is reflected from the spatial light modulator 48 may be collected and returned to optical windows, increasing efficiency.

The reflective facets 303 of the rear reflector may have an irregular pitch which may be an irregular, randomized pitch. The reflective facets of the rear reflector have an inclination that varies across the array of reflective facets. Advantageously, Moiré effects between the waveguide 301 and rear reflector 330 may be reduced.

The reflective facets 303 of the rear reflector 330 may be linear. The reflective facets 303 of the rear reflector 330 may be curved. Advantageously the facets 330 may be curved as shown in FIG. 19A to provide optical windows that are substantially co-located with the optical windows that are provided directly by reflected light from light extraction features 12.

Rear reflector 330 may be provided comprising reflective surface 331 with facets 303, 304. Light rays 362 from source 317a may be deflected by light extraction feature 12 and exit through side 6 of the waveguide 301, further propagating through reflective polarizer 336, diffuser layer 68, optional polarization rotator 338 such as a half waveplate before incidence onto the spatial light modulator 48 (not shown).

Feature 12 may be uncoated so that some light will be transmitted and be incident onto facet 303 of the rear reflector 330, and directed back through the waveguide as ray 344, advantageously improving efficiency. For light rays 344, 363 reflective polarizer will transmit a first polarization state and reflect the orthogonal polarization state as rays 346 that is further incident onto the facets 303, 334. The facets 303, 334 may be arranged with a 90 degree included angle for example, to achieve a retroreflection property, outputting ray 350 that may have reflected symmetry compared to rays 344, 363. Advantageously the efficiency of the input into the spatial light modulator is improved. Further the angular uniformity may be improved.

It would be desirable to provide an efficient directional backlight in a thin package.

Figure 20A:
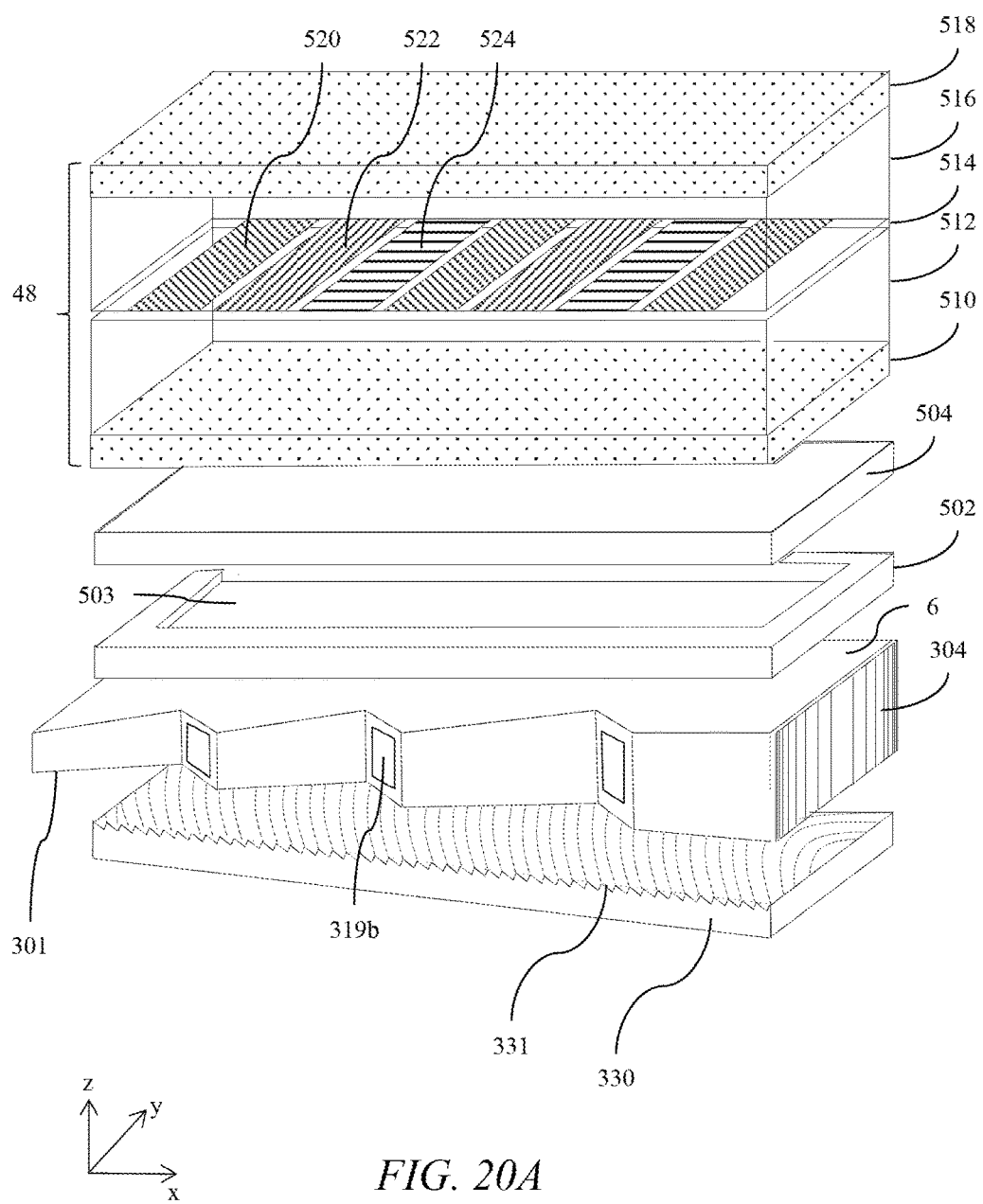
FIG. 20A is a schematic diagram illustrating in perspective view, a directional display comprising a directional waveguide comprising a Fresnel reflector with first and second inclined optical axes, in accordance with the present disclosure.

FIG. 20A is a schematic diagram illustrating in perspective view, a directional display comprising a directional waveguide comprising a Fresnel reflector with first and second inclined optical axes.

A directional display device may thus comprise a directional backlight comprising waveguide 301 as described herein, a transmissive spatial light modulator 48 arranged to receive the light output through the first guide surface 6 and arranged to modulate a first polarization component of that light having a first polarization 387; and a reflective polarizer 336 disposed between the first guide surface 6 of the waveguide 301 and the spatial light modulator 48 and arranged to transmit the first polarization 387 component and to reflect a second polarization 389 component of the output light having a polarization orthogonal to the first polarization 387 as rejected light 346, the rear reflector 330 further comprising intermediate facets 334 extending between the reflective facets 303 of the rear reflector 330 and inclined in opposite senses from the reflective facets 303 of the rear reflector 330 in a common plane, so that pairs of a reflective facet 303 and an intermediate facet 334 together form corner facets arranged to reflect rejected light 346 for supply back to the spatial light modulator 48, the pairs of a reflective facet 303 and an intermediate facet 334 being inclined in a plane that is oriented around the normal to the spatial light modulator 48 so that the rear reflector 330 converts the polarization of rejected light 346 supplied back to spatial light modulator 48 into the first polarization 387 on reflection. Such conversion may be achieved by arranging the first and second polarization states 387, 389 to be linear polarization states that are inclined at substantially 45 degrees to the linearly extended reflective facets 303, 334. A polarization rotator 338 may be further disposed between the reflective polarizer 336 and the spatial light modulator 48 and arranged to rotate the first polarization component.

Advantageously an efficient polarization conversion arrangement may be achieved and high display efficiency provided.

Waveguide 301 and rear reflector 330 are arranged with a light shading layer 502 with clear aperture 503 aligned with the active area of spatial light modulator 48 to obscure scatter from the edge regions of the waveguide 301. Optical control film 504 may comprise reflective polarizer, waveplate, diffusers as described elsewhere herein. Spatial light modulator 48 may comprise polarizers 510, 518, substrates 512, 516 which may be glass and liquid crystal layer 514 that may further comprise pixels 520, 522, 524. The liquid crystal mode may be TN, VA, IPS, ECB or other type of know liquid crystal mode. For some modes of operation the spatial light modulator may have a high response speed, for example to provide 120 Hz or higher frame rate operation. Advantageously such an arrangement can achieve a low thickness desirable for mobile display devices. Further, multiple modes of backlight operation can be achieved as will be further described herein.

It may be desirable to provide efficient autostereoscopic operation of a display.

Figure 20B:
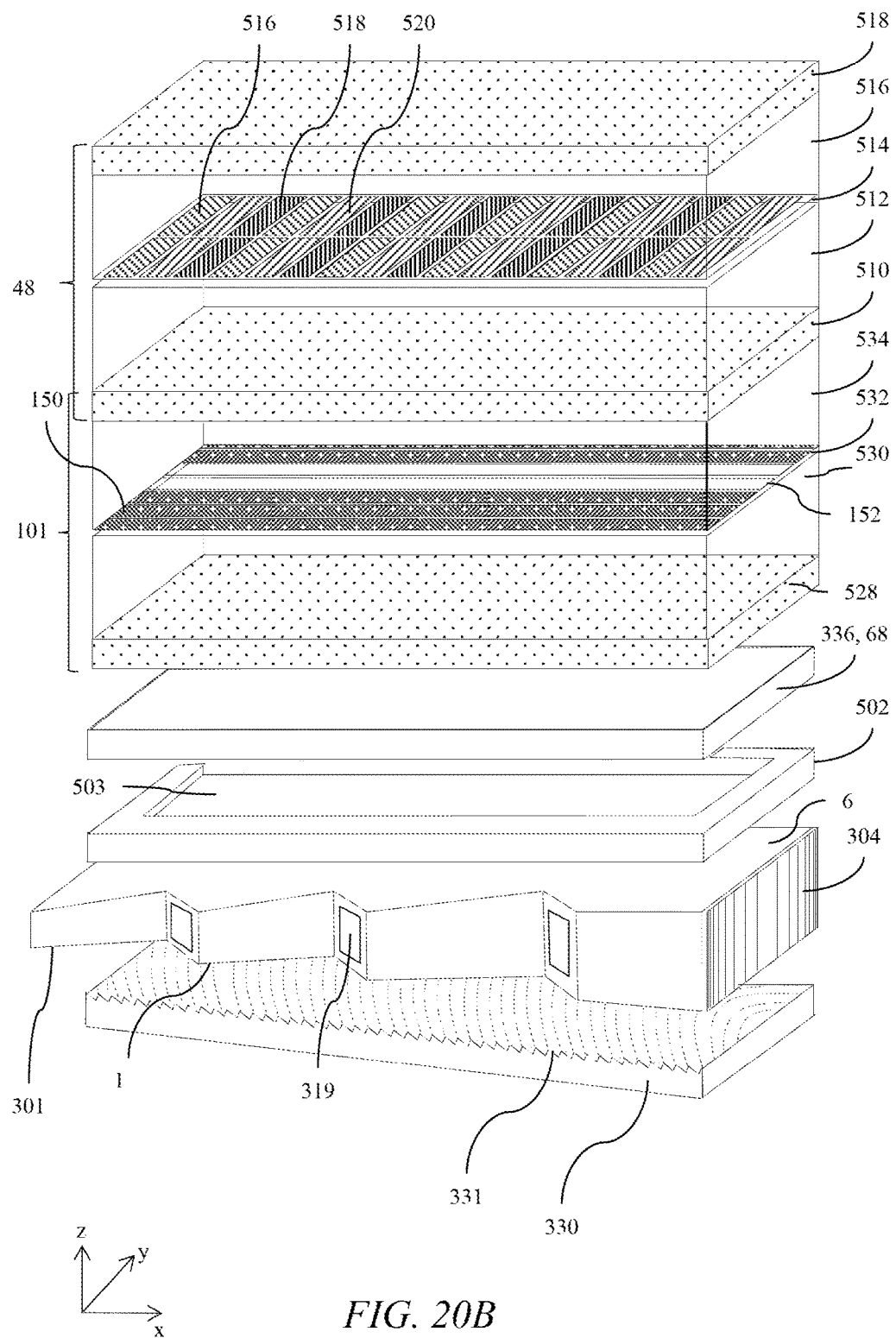
FIG. 20B is a schematic diagram illustrating in perspective view, a directional display comprising a parallax barrier and further comprising a directional waveguide comprising a Fresnel reflector with first and second inclined optical axes, in accordance with the present disclosure.

FIG. 20B is a schematic diagram illustrating in perspective view, a directional display comprising a parallax barrier and further comprising a directional waveguide comprising a Fresnel reflector with first and second inclined optical axes. Such a display is described in U.S. patent application Ser. No. 14/663,251 (U.S. Patent Publ. No. 2015/0268479), entitled "Directional backlight," filed Mar. 19, 2015, which is herein incorporated by reference in its entirety. In comparison to the arrangement of FIG. 20A, a further switchable parallax barrier 101 is arranged in series with the waveguide 301 and spatial light modulator 48. Switchable parallax barrier 101 may further comprise polarizer 528, substrates 530, 534 and liquid crystal layer 532 that may comprise switchable elements 150, 152 that may be arranged to switch between transmitting and absorbing operation. Such barrier elements may be tracked in response to the position of a moving observer. In a conventional backlight, such switchable parallax barriers are typically inefficient.

Advantageously the present embodiment can efficiently illuminate the head of an observer, providing a bright and low power consumption for autostereoscopic operation. Further, cross talk can be reduced by the reduction of pseudoscopic zone visibility. Further low thickness and small bezel width can be achieved.

It would be desirable to provide switchable operation of a directional display apparatus and further control means to optimize functionality.

Figure 21:
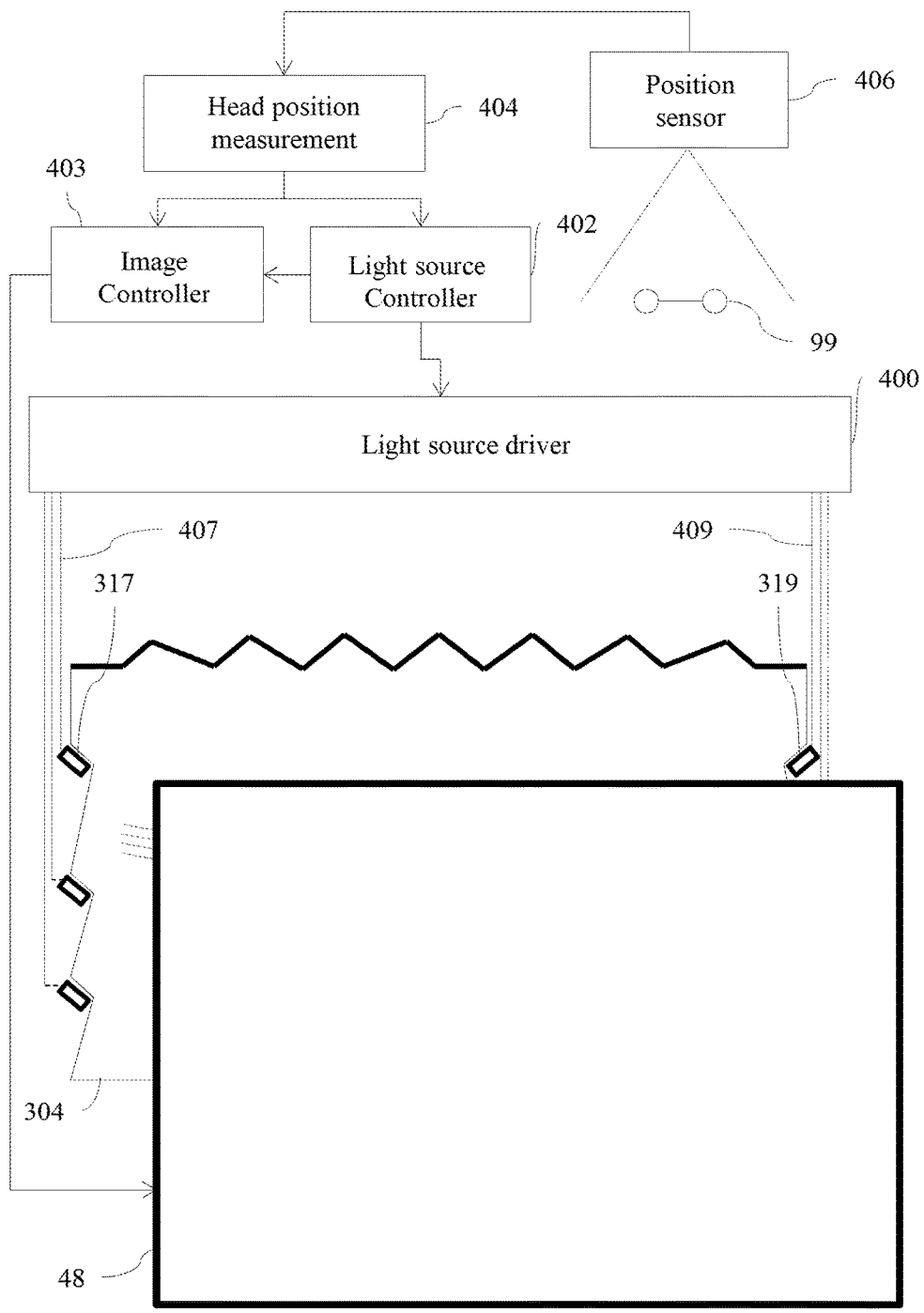
FIG. 21 is a schematic diagram illustrating a control system for a directional display comprising a directional waveguide comprising a Fresnel reflector with first and second inclined optical axes, in accordance with the present disclosure.

FIG. 21 is a schematic diagram illustrating a control system for a directional display comprising a directional waveguide comprising a Fresnel reflector with first and second inclined optical axes. Thus a directional display apparatus may describe a directional display device as described herein and a control system arranged to control the light sources 317a-n, 319a-n.

The arrangement and operation of the control system will now be described and may be applied, with changes as necessary, to each of the display devices disclosed herein. The directional backlight comprises a waveguide 301 and arrays 317, 319 of illumination elements 317a-n arranged as described above. The control system is arranged to selectively operate the illumination elements 317a-n to direct light into selectable optical windows 27a-n.

The control system may comprise a sensor system arranged to detect the position of an observer 99 relative to the display device. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise a light source controller 402 and an image controller 403 that may be supplied with the detected position of the observer supplied from the head position measurement system 404. Alternatively the light source controller may be supplied with a mode selection; such modes will be described further herein.

The illumination controller comprises an LED controller 402 arranged to determine which light sources of array 317 should be switched to direct light to respective eyes of observer 99 in cooperation with waveguide 301; and an LED driver 400 arranged to control the operation of light sources of light source array 317, 319 by means of drive lines 407, 409 respectively. The light source controller 402 may the illuminator elements 317a-n, 319a-n to be operated in dependence on the position of the observer 99 detected by the head position measurement system 72, so that the optical windows 27a-n, 29a-n into which light is directed are in positions corresponding to the left and right eyes of the observer 99. In this manner, the lateral output directionality of the waveguide 301 may correspond with the observer position.

The image controller 403 is arranged to control the SLM 48 to display images. The image displayed on the SLM 48 may be presented in synchronization with the illumination of the light sources of the array 317, 319.

To provide an autostereoscopic display, the image controller 403 and the illumination controller may operate as follows. The image controller 403 controls the SLM 48 to display temporally multiplexed left and right eye images and the LED controller 402 operates the light sources 317a-n, 319a-n to direct light into optical windows in positions corresponding to the left and right eyes of an observer 99 synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 301 may be achieved to correspond with the viewer position so that a first image may be directed to the observer's right eye in a first phase and directed to the observer's left eye in a second phase.

Figure 22:
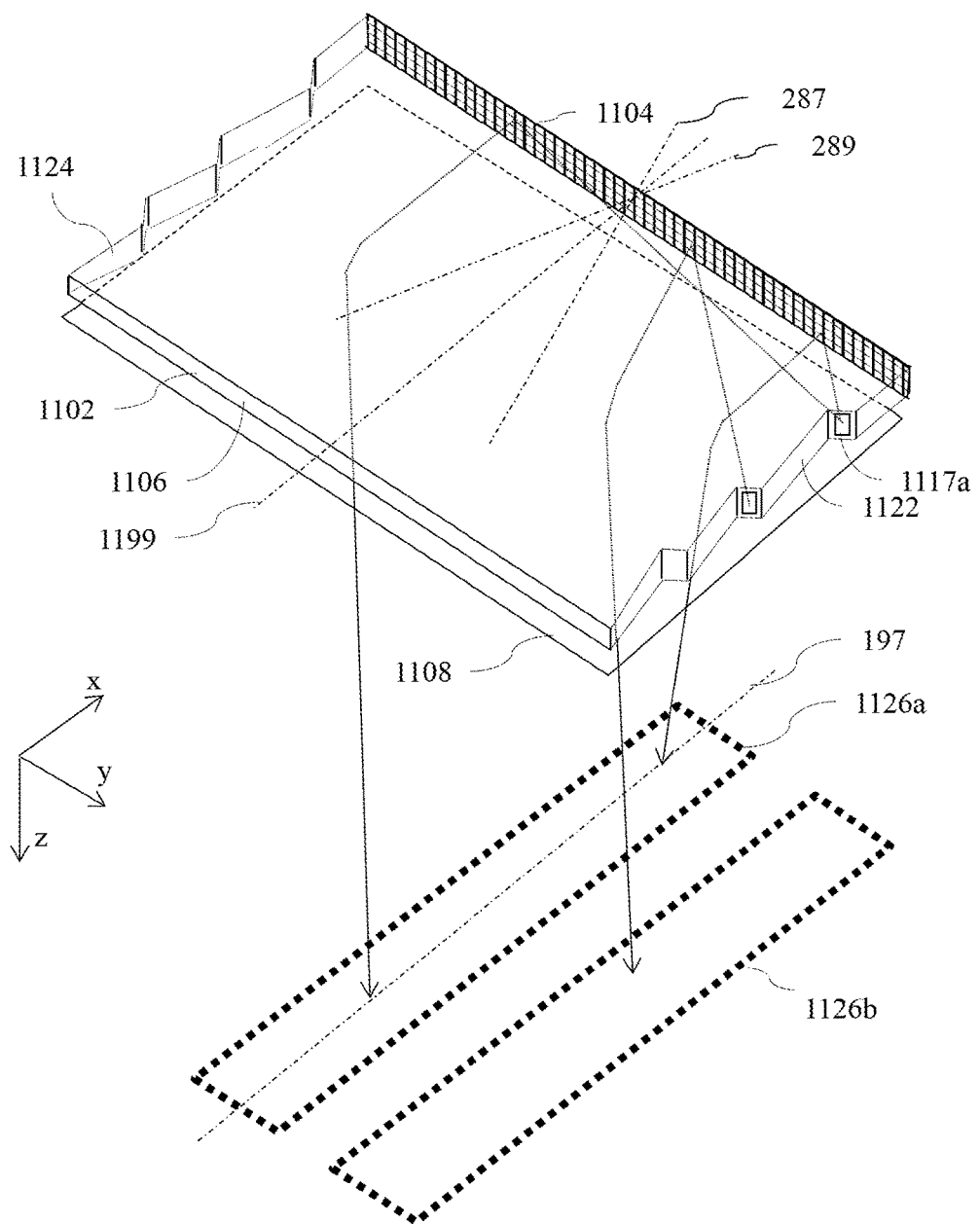
FIG. 22 is a schematic diagram illustrating in perspective view, a directional wedge waveguide comprising a Fresnel reflector with first and second inclined optical axes arranged to provide first and second optical windows, in accordance with the present disclosure.

FIG. 22 is a schematic diagram illustrating in perspective view, a directional wedge waveguide comprising a Fresnel reflector with first and second inclined optical axes arranged to provide first and second optical windows. The extraction of light from the wedge 1102 may be provided in a similar manner to that shown in FIG. 11. The reflective end 1104 may comprise a complex mirror providing deflection in the lateral direction and in the x-z plane. Axes 287, 289 of the Fresnel mirror component of the reflective end are inclined compared to axis 1199. Thus, light source 1117a arranged on side 1122 may be imaged to optical window 1126a and light source 1117b may be imaged to optical window 1126b. Advantageously the long edge bezel width is reduced.

The optical window imaging characteristics and uniformity characteristics will now be described.

Figure 23:
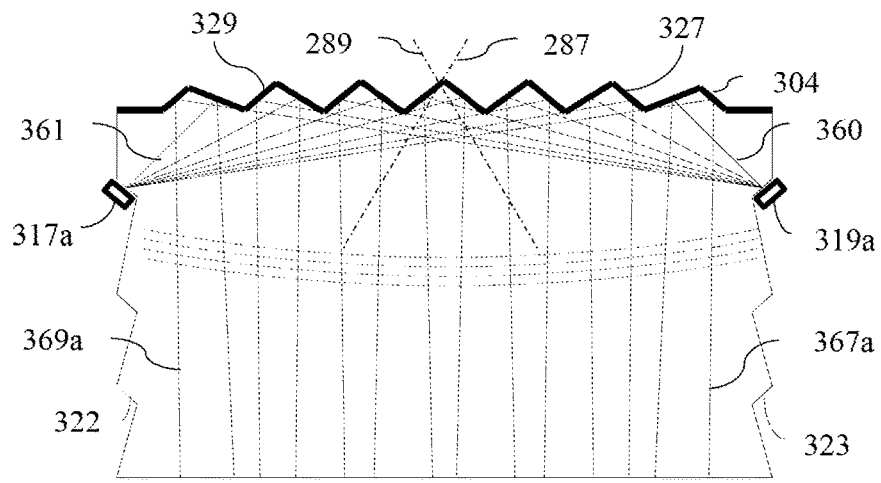
FIG. 23, FIG. 24, and FIG. 25 are schematic diagrams illustrating in front view illumination of directional waveguides comprising a Fresnel reflectors with first and second inclined optical axes, in accordance with the present disclosure.
Figure 24:
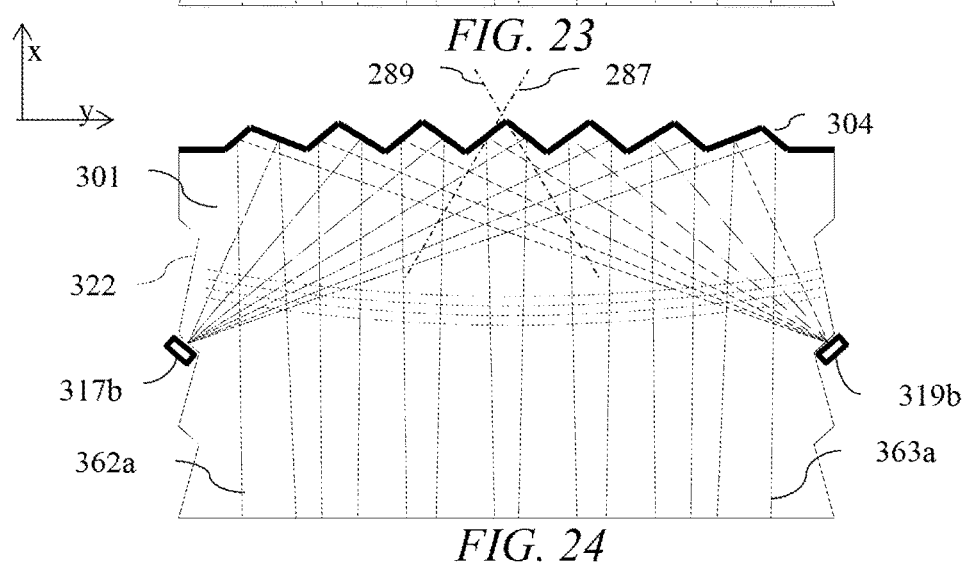
Figure 25:
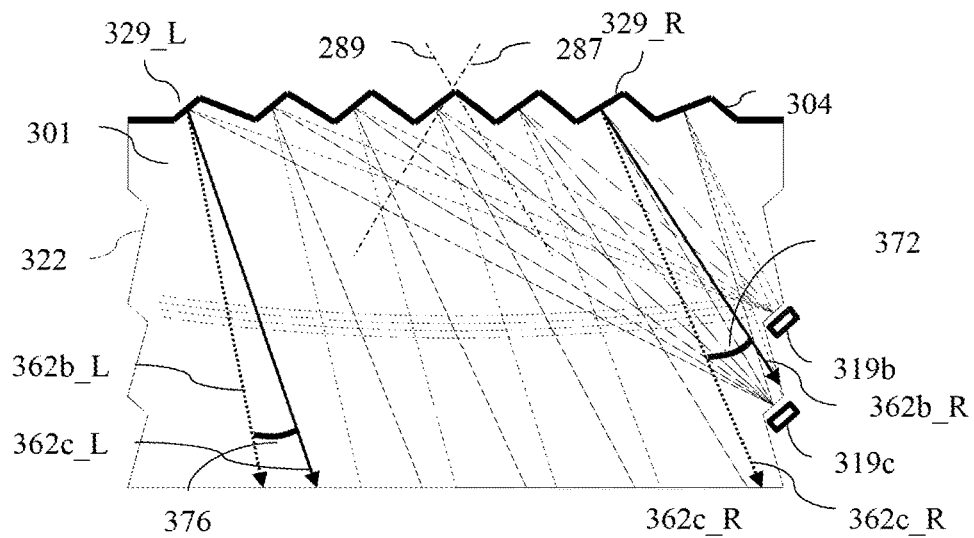

FIGS. 23-25 are schematic diagrams illustrating in from view illumination of directional waveguides comprising a Fresnel reflectors with first and second inclined optical axes. In FIGS. 23-24 the optical axis 287 of the Fresnel reflector is inclined towards the side surface 322 in a direction such that the output light 367a from a light source of the array 317 of light sources arranged along a side surface is directed into the central optical window 27a of the distribution of optical windows 27a-n. FIG. 23 illustrates that the light source 317a may be directed towards the optical window 27a that is on-axis 199 whereas FIG. 24 illustrates that a different light source, for example from light source 317b is directed towards optical window 27b that is arranged to be on-axis, that is aligned with axis 199 in the window plane.

FIGS. 23-24 further illustrate that light source arrays 317a, 319a may cooperate to achieve overlapping windows 27a, 29a in the window plane. Advantageously such overlapping windows can achieve increased luminance in comparison with arrangements in which a single light source provides an optical window. Such displays can conveniently achieve high luminance operation. Advantageously, bright images can be seen when the display is operated in high illuminance environments, such as outdoors on sunny days. Total display power consumption can be reduced in comparison to conventional backlights with the same display luminance.

Further in comparison to FIG. 12A, light sources of arrays 317, 319 that provide on-axis optical windows may be provided at the thicker part of the sides 322, 324. Thus for a given total backlight stackup thickness, light sources such as LEDs with higher aperture height can be used than in FIG. 12A, as shown further for light sources 317a and 317b in FIG. 16B. Thus higher luminance operation can be achieved using conventional LED packages. The LEDs that are closer to the side 302 may be arranged to provide off-axis illumination as will be described. Such LEDs are not typically required to provide such high luminance levels for off-axis viewing positions. Advantageously, display luminance for on-axis viewing can be further increased, optimizing outdoors operation.

FIG. 25 illustrates off-axis operation of lights sources 319b, 319c for the arrangement of FIG. 23. Light sources 319b, 319c respectively provide rays 362b_R, 362c_R on the right side of the waveguide 301 and rays 362b_L, 362c_L on the left side. The path length of the rays 362b_R from the source 319b to the facet 329_R is different to the path length of rays 362b_L to the facet 329_L. This path length different means that the angle of the cone 372 between rays 362b_R and 362c_R is greater than the angle of the cone 376 between the rays 362b_L and 362c_L.

Figure 26:
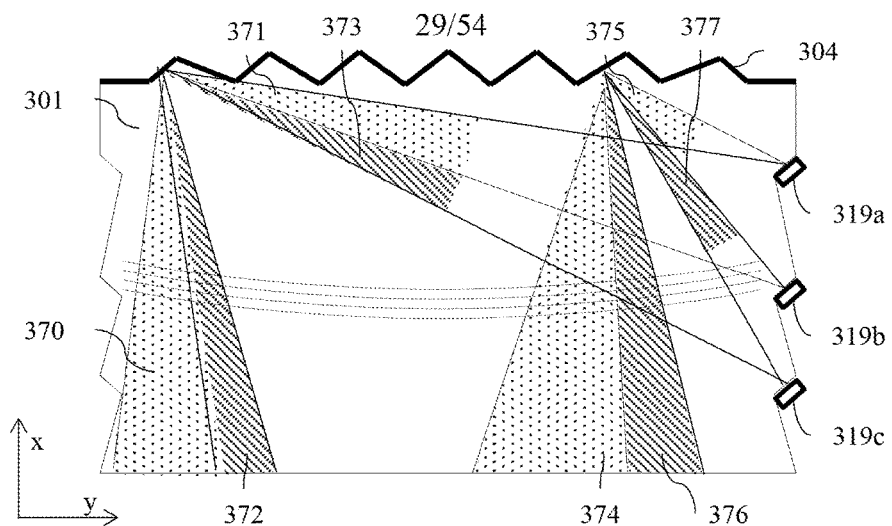
FIG. 26 and FIG. 27 are schematic diagrams illustrating in front views, variation of magnification in the lateral direction of a directional waveguide comprising a Fresnel reflector with first and second inclined optical axes arranged to provide first and second optical windows, in accordance with the present disclosure.
Figure 27:
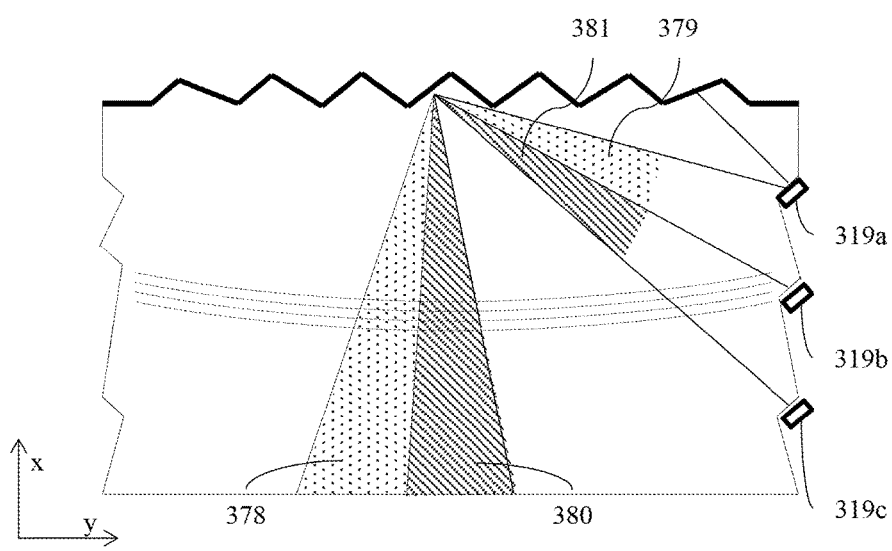
Figure 28:
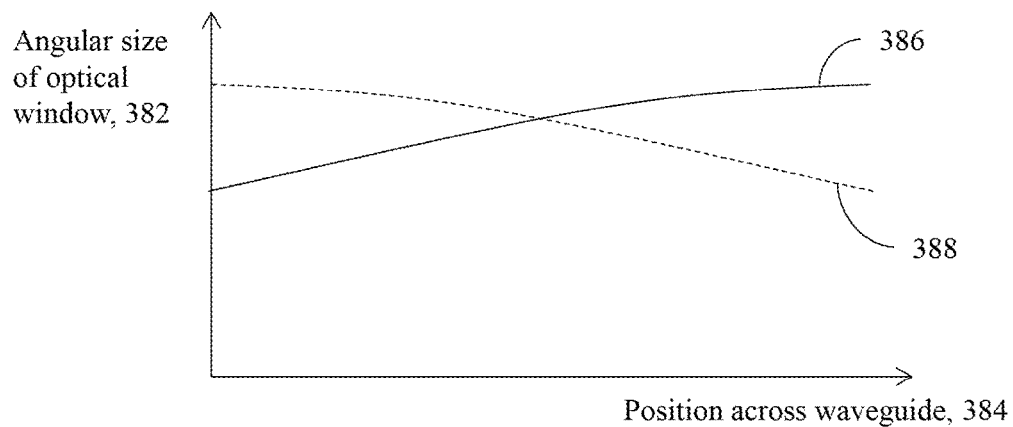
FIG. 28 is a schematic graph illustrating variation of magnification in a lateral direction for first and second light sources, in accordance with the present disclosure.

FIGS. 26-27 are schematic diagrams illustrating in front views, variation of magnification in the lateral direction of a directional waveguide comprising a Fresnel reflector with first and second inclined optical axes arranged to provide first and second optical windows. Thus cones 370, 374 and 378 have different sizes as do cones 372, 376, 380. The change in cone angle with lateral position across the Fresnel reflector changes the magnification of the system, further illustrated in FIG. 28 which is a schematic graph illustrating variation of magnification in a lateral direction for first and second light sources by plotting angular size of optical window 382 against position 384 across the waveguide 301. Thus for array 319 the magnification may change as illustrated schematically by profile 386 and for array 317 the magnification may change as illustrated schematically by profile 388.

Figure 29:
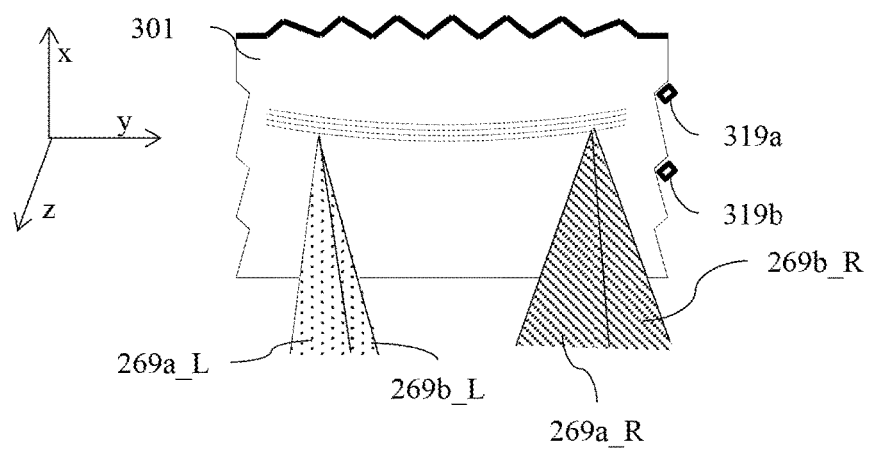
FIG. 29 is a schematic diagram illustrating in front view the variation of magnification in a lateral direction for first and second light sources on the same side of a directional waveguide, in accordance with the present disclosure.
Figure 30:
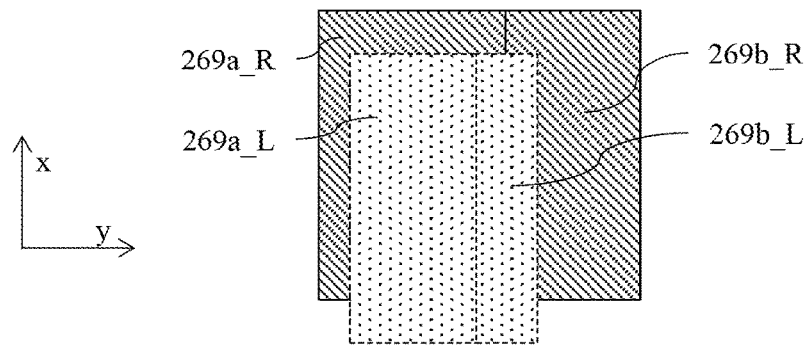
FIG. 30 is a schematic diagram illustrating in front view optical window sizes for the arrangement of FIG. 29, in accordance with the present disclosure.

FIG. 29 is a schematic diagram illustrating in front view the variation of magnification in a lateral direction for first and second light sources on the same side of a directional waveguide and FIG. 30 is a schematic diagram illustrating in front view optical window sizes for the arrangement of FIG. 29. Thus optical windows provided at the window plane (where cones from different regions of the waveguide 301 overlap) by cones 269a_R, 269a_L, 269b_R and 269b_L have different locations and widths in the lateral direction.

Figure 31:
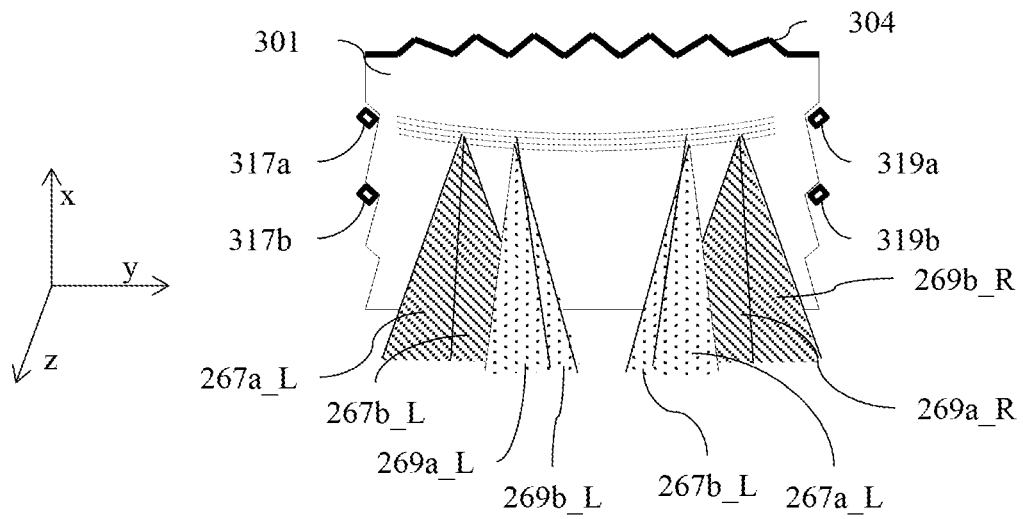
FIG. 31 is a schematic diagram illustrating in front view the variation of magnification in a lateral direction for first and second light sources on both sides of the directional waveguide, in accordance with the present disclosure.
Figure 32:
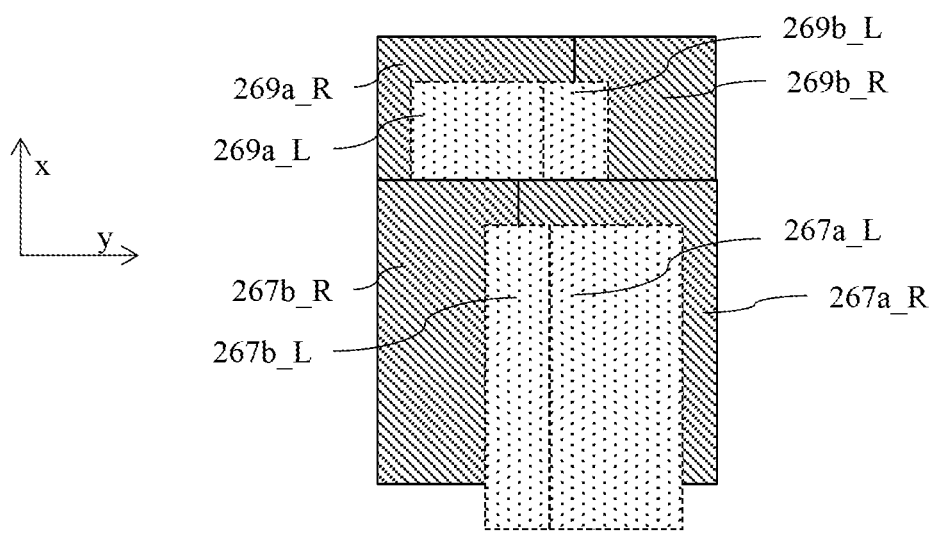
FIG. 32 is a schematic diagram illustrating in front view optical window sizes for the arrangement of FIG. 31, in accordance with the present disclosure.

FIG. 31 is a schematic diagram illustrating in front view the variation of magnification in a lateral direction for first and second light sources on both sides of the directional waveguide and FIG. 32 is a schematic diagram illustrating in front view optical window sizes for the arrangement of FIG. 31. Thus the optical windows provided by light sources on the left side 322 and right side 324 further overlap, providing symmetric illumination of the window plane.

Figure 33A:
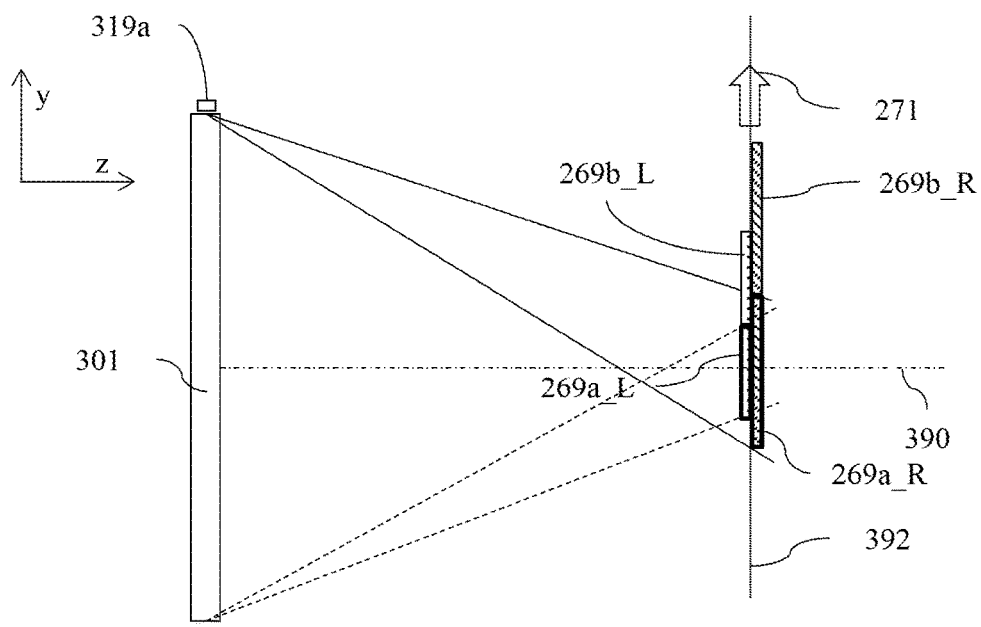
FIG. 33A and FIG. 33B are schematic diagrams illustrating in top view optical window locations for the arrangement of FIG. 23, in accordance with the present disclosure.
Figure 33B:
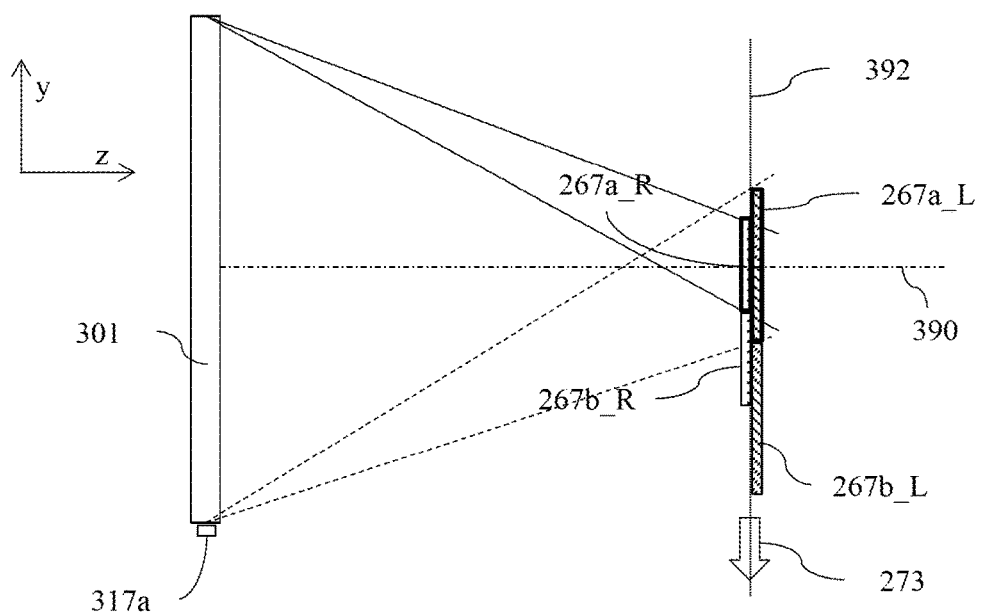

FIGS. 33A-33B are schematic diagrams illustrating in top view optical window locations for the arrangement of FIG. 23, in a similar manner to the front view of FIG. 32. In this arrangement, the optical windows 267a_R, 267a_L may be arranged to aligned on axis by means of design of facets 327_R and 327_L. Similarly, optical windows 269a_R, 269a_L may be arranged to aligned on axis by means of design of facets 329_R and 329_L. Thus optical windows 269a-n are provided in direction 271 along the lateral direction and optical windows 267a-n are provided in direction 273 along the lateral direction, opposite to direction 271. Advantageously, high luminance may be provided in the on-axis optical window region at the window plane 392 due to the overlapping optical windows.

It would be desirable to increase the width of the overlapping optical window to increase the width of viewer freedom for high luminance operation.

Figure 34A:
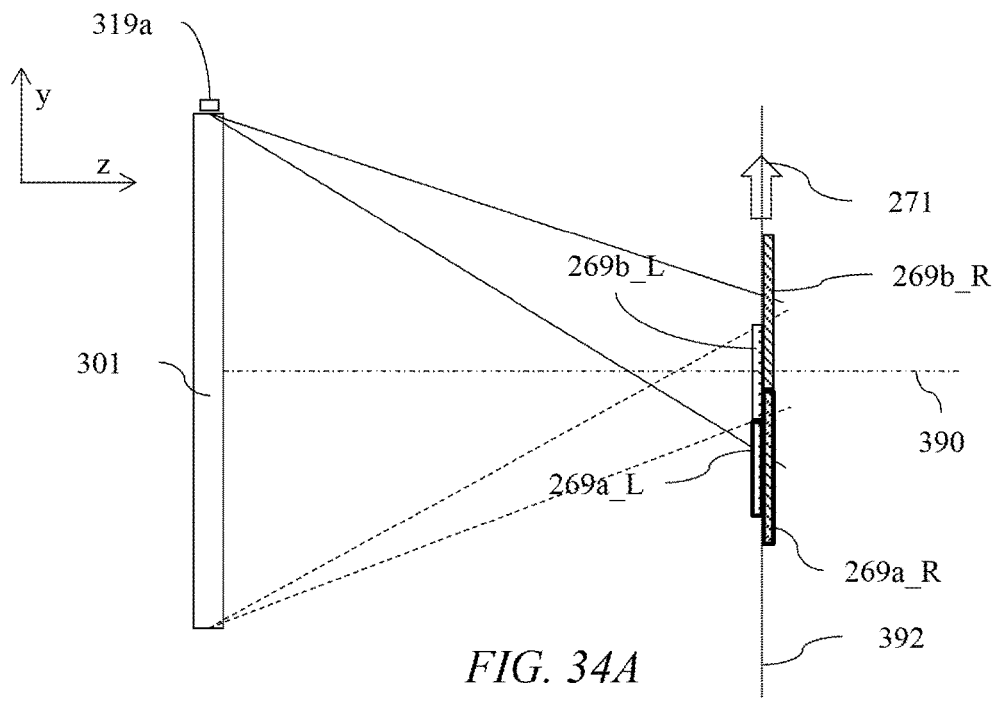
FIG. 34A and FIG. 34B are schematic diagrams illustrating in top view optical window locations for the arrangement of FIG. 24, in accordance with the present disclosure.
Figure 34B:
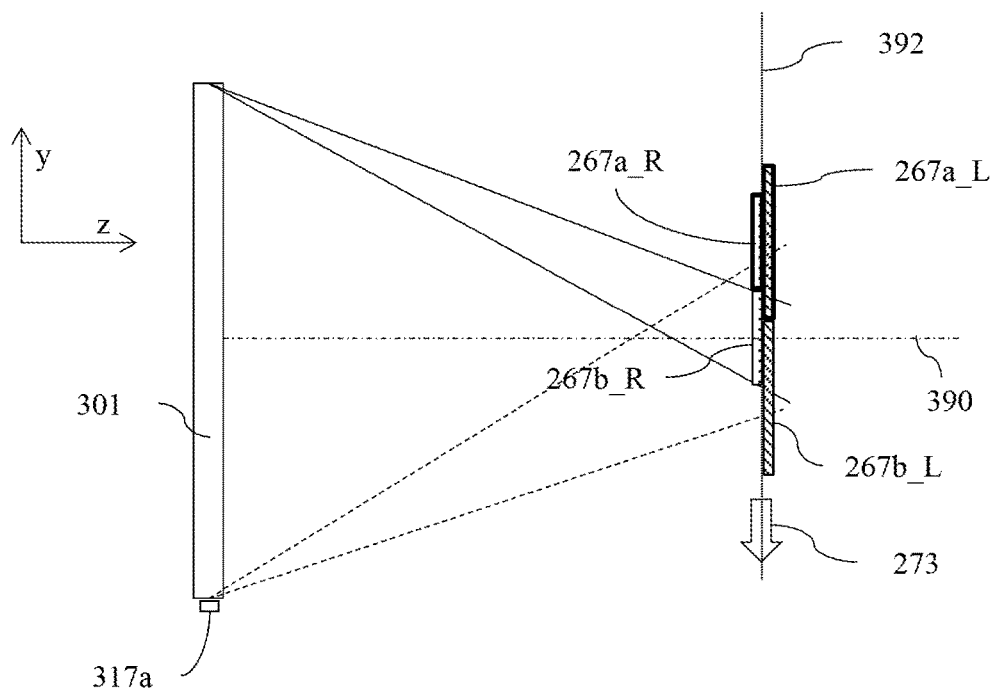

FIGS. 34A-34B are schematic diagrams illustrating in top view optical window locations for the arrangement of FIG. 24. In these arrangements, sources 317b and 319b are arranged to provide on-axis optical windows in a similar manner to FIG. 24. Advantageously, viewer freedom is extended.

Figure 35:
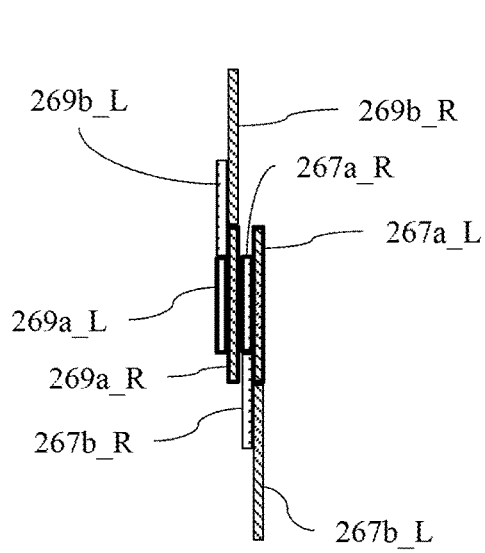
FIG. 35 is a schematic diagram illustrating in top view optical window combination for the arrangement of FIGS. 33A-33B, in accordance with the present disclosure.
Figure 36:
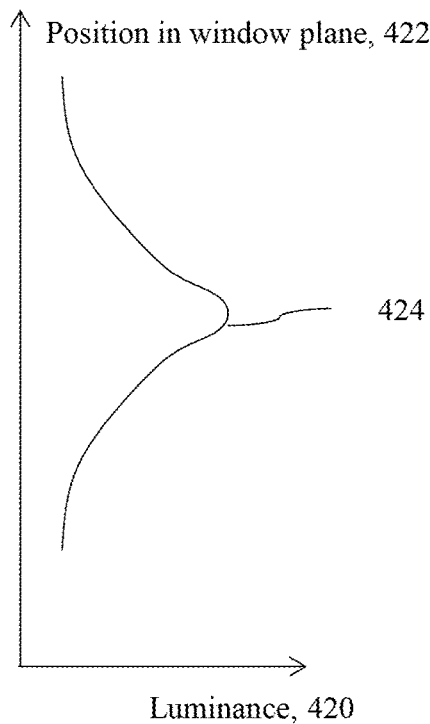
FIG. 36 is a schematic graph illustrating the variation of display luminance with viewing angle for the optical window combination of FIG. 35, in accordance with the present disclosure.
Figure 37:
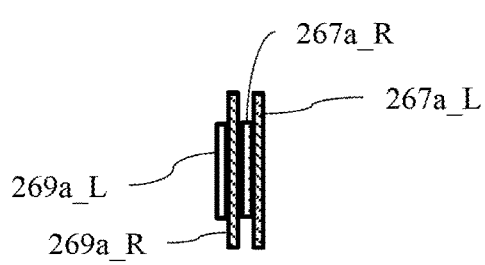
FIG. 37 is a schematic diagram illustrating in top view central optical window combination for the arrangement of FIG. 33A, in accordance with the present disclosure.

FIG. 35 is a schematic diagram illustrating in top view optical window combination for the arrangement of FIGS. 33A-33B and FIG. 36 is a schematic graph illustrating the variation of display luminance 422 with lateral position 424 in the window plane for the optical window combination of FIG. 35. FIG. 37 is a schematic diagram illustrating in top view central optical window combination for the arrangement of FIG. 33A and FIG. 38 is a schematic graph illustrating the variation of display luminance 422 with lateral position 424 in the window plane for the optical window combination of FIG. 37.

In a first mode of operation illustrated in FIG. 36, several of the light sources of arrays 317, 319 may be illuminated. The combined viewing window represented by curve 424 is the combination of the optical windows for a region of the display surface. Advantageously a wide viewing angle display with symmetric angular viewing window profile can be achieved.

Figure 38:
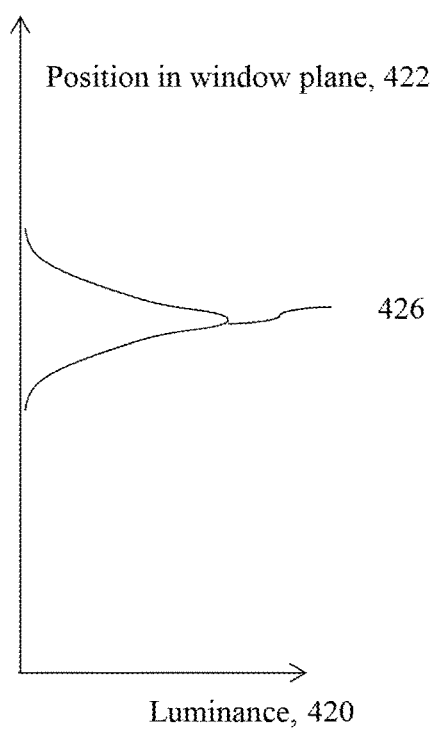
FIG. 38 is a schematic graph illustrating the variation of display luminance with viewing angle for the optical window combination of FIG. 37, in accordance with the present disclosure.

In a second mode of operation illustrated in FIG. 38, a narrower viewing window size can be achieved by illumination of sources 317a and 319a only for example. The addition of light from both sides can provide relatively uniform display luminance. Such a second mode can advantageously be arranged to provide one or more of (i) Privacy mode of operation, similar to FIG. 9 (ii) green mode of operation wherein light is sent mainly to a central viewer but not wasted in regions away from the viewer's eyes (iii) Sunlight mode of operation wherein for the same total power consumption as the wide angle mode a high luminance image is provided over a narrower viewing angle (iv) parallax optical element illumination as described with reference to FIG. 20B.

The embodiments above describe overlapping windows of different size for different positions on the display surface. It would be desirable to provide a viewing window arrangement suitable for autostereoscopic operation with low cross talk.

Figure 39:
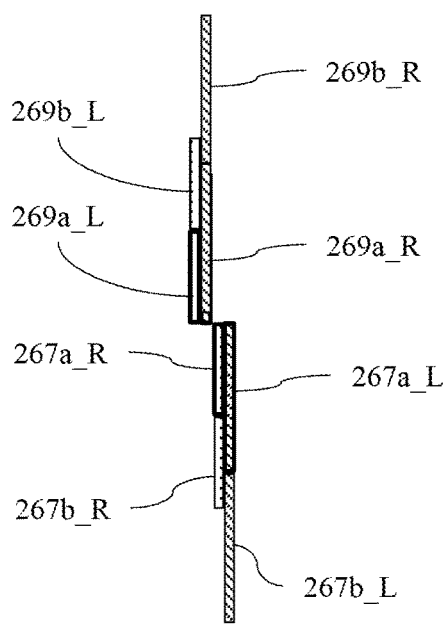
FIG. 39 is a schematic diagram illustrating in top view an alternative optical window combination, in accordance with the present disclosure.
Figure 40:
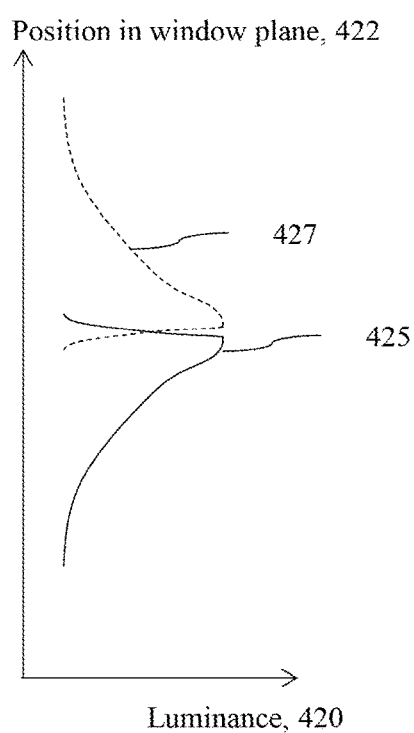
FIG. 40 is a schematic graph illustrating the variation of display luminance with viewing angle for the optical window combination of FIG. 37, in accordance with the present disclosure.

FIG. 39 is a schematic diagram illustrating in top view an alternative optical window combination and FIG. 40 is a schematic graph illustrating the variation of display luminance with viewing angle for the optical window combination of FIG. 39. The on-axis edges of the optical windows 269b_L, 269b_R are aligned with the on-axis edges of the optical windows 269a_R, 267a_L. In this manner, the viewing windows 427, 425 may be provided. Advantageously an autostereoscopic window arrangement may be provided with low cross talk.

Figure 41:
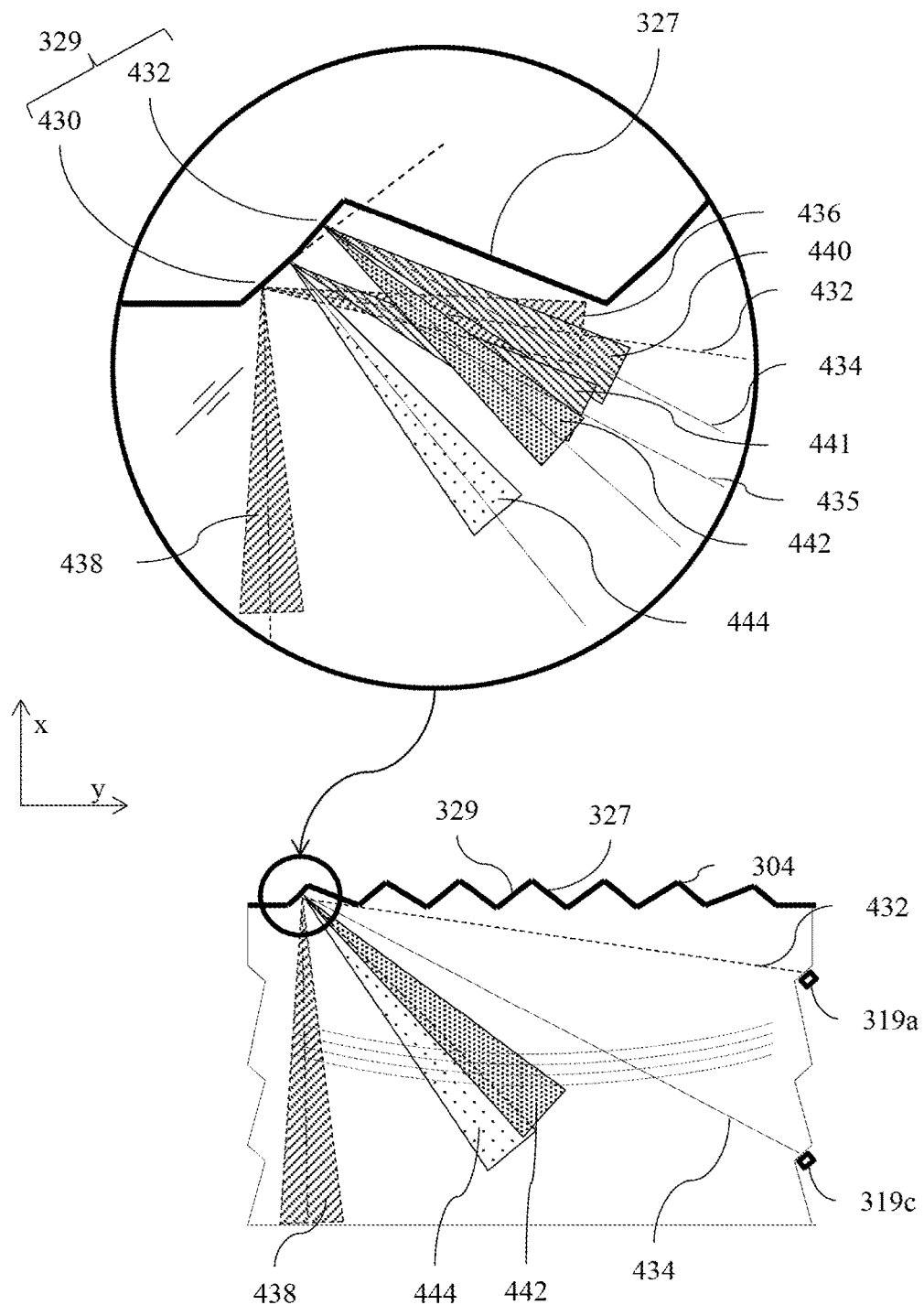
FIG. 41 is a schematic diagram illustrating in front view a Fresnel reflector facet arranged to achieve increased optical window uniformity for positions across the Fresnel reflector in the lateral direction, in accordance with the present disclosure.

FIG. 41 is a schematic diagram illustrating in front view a Fresnel reflector facet arranged to achieve increased optical window uniformity for positions across the Fresnel reflector in the lateral direction. Considering light sources 319a, 319c illuminating facet 329 then light rays 432, 434 and respective light cones 436, 440 (representing the width of the light source) are incident on the facet 329. Light rays 432 are incident on facet region 430, whereas light rays 434 are incident on a larger area of facet 329 which may comprise at least two regions 430, 432. After reflection, cone 438 is provided by region 430 for light from source 319a. By comparison, cones 442, 444 may be provided from the two facet regions 430, 432 respectively. Thus, the total reflected cone width is increased for rays 434. Advantageously, the difference in path length between sources 319a, 319c and facet 329 can be compensated. Further luminance non-uniformities may be compensated.

It would be desirable to increase efficiency and improve lateral uniformity.

Figure 42:
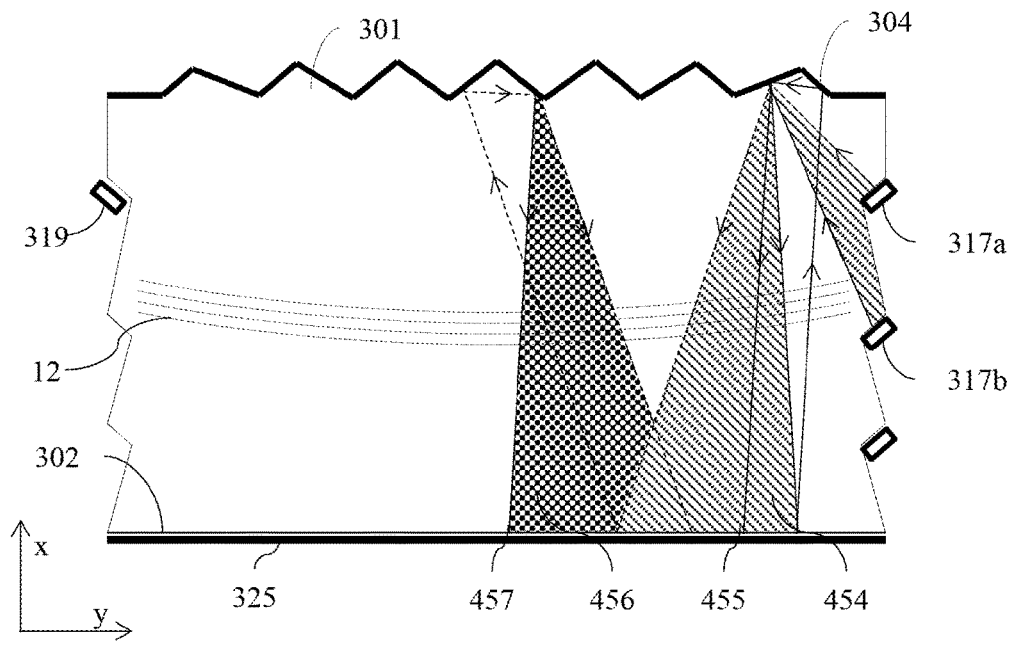
FIG. 42 and FIG. 43 are schematic diagrams illustrating in front views waveguides comprising a Fresnel reflector with first and second inclined optical axes and a reflective side opposite the Fresnel reflector, in accordance with the present disclosure.
Figure 43:
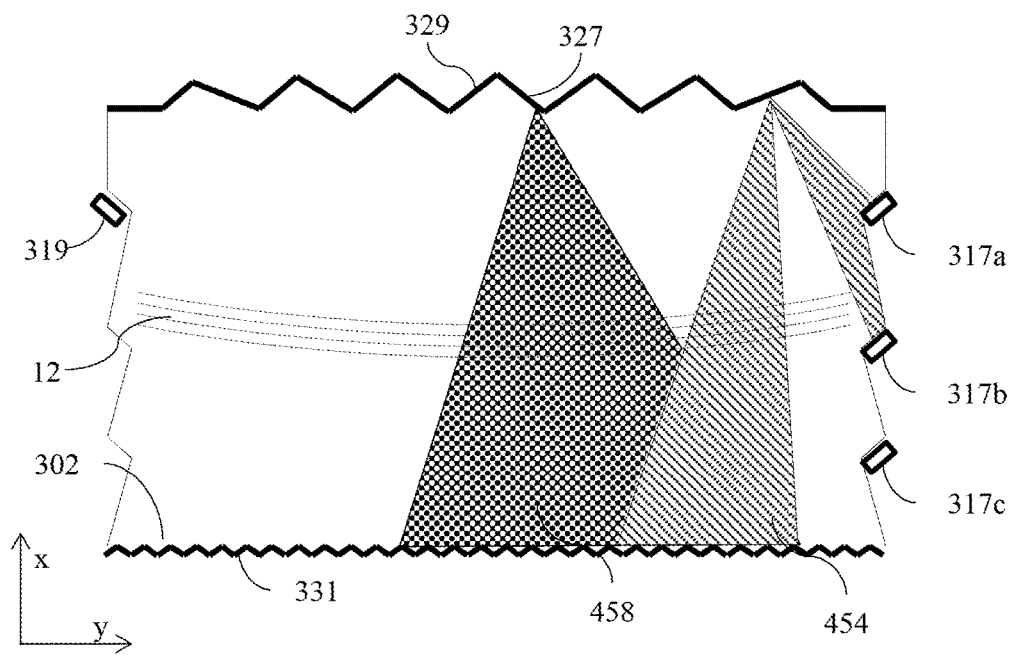

FIGS. 42-43 are schematic diagrams illustrating in front views waveguides comprising a Fresnel reflector with first and second inclined optical axes and a reflective side opposite the Fresnel reflector. The directional backlight may further comprise a rear end 302 facing the reflective end 304. At least part of the rear end 302 may be reflective. The reflective layer 325 may comprise for example a coating or separate reflective material. As illustrated in FIG. 16B, end 302 may have a finite thickness, and thus some light loss may occur for light that is incident on side 302 and transmitted. Advantageously the thickness of side 302 may be less than for the thickness of side 2 in FIG. 12B, thus geometric efficiency may be optimized.

Desirably, light that is incident on the rear end 302 may be reflected within the waveguide to provide off-axis imaging. As shown in FIG. 42, for a plane reflector, incident light cone 454 may be specularly reflected back to Fresnel reflector 304. The facets 327, 329 may be arranged with a 90 degree or similar included angle. Such an included angle would reflect cone 456, advantageously increasing uniformity of output.

FIG. 43 illustrates a reflective rear end 302 comprising a structured surface. Such a surface may increase the cone 458 of reflected light. Advantageously, extended wide angle output can be provided and uniformity increased.

It would be desirable to provide increased control of wide angle output.

Figure 44:
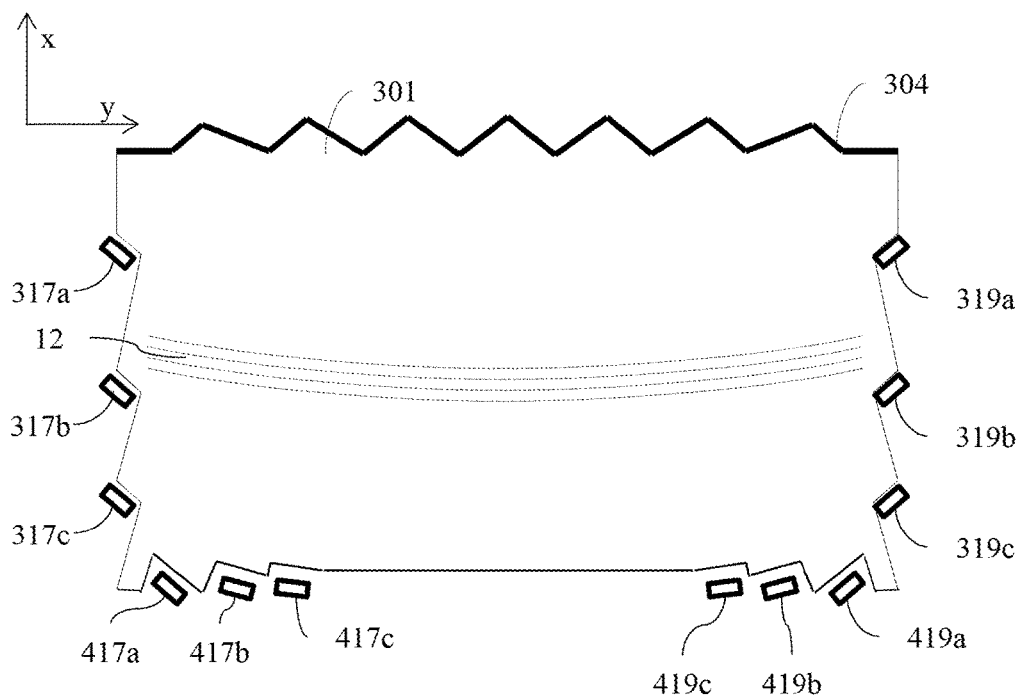
FIG. 44 and FIG. 45 are schematic diagrams illustrating in front views waveguides comprising a Fresnel reflector with first and second inclined optical axes and light sources on the side opposite the Fresnel reflector, in accordance with the present disclosure.
Figure 45:
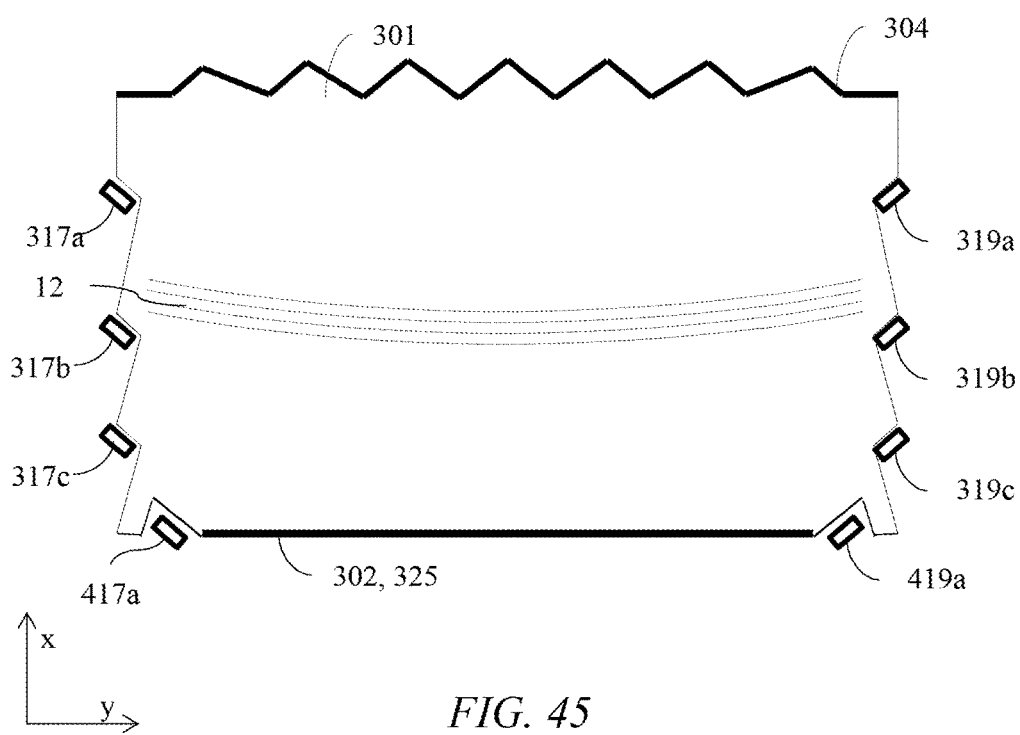

FIGS. 44-45 are schematic diagrams illustrating in front views waveguides comprising a Fresnel reflector with first and second inclined optical axes and light sources on the side opposite the Fresnel reflector. The backlight may further comprise input sources 417a-c, 419a-c arranged along at least part of the rear end 302 adjacent the side surface 322, 324 respectively. As illustrated in FIG. 44 at least part of the rear end 302 is non-reflective, while in FIG. 45, the gap in the lateral direction on the rear end 302 between the sources 417a, 419a may be reflective. Advantageously, increased control of off-axis illumination can be achieved.

It would be desirable to provide increased lateral uniformity across the waveguide 301.

Figure 46:
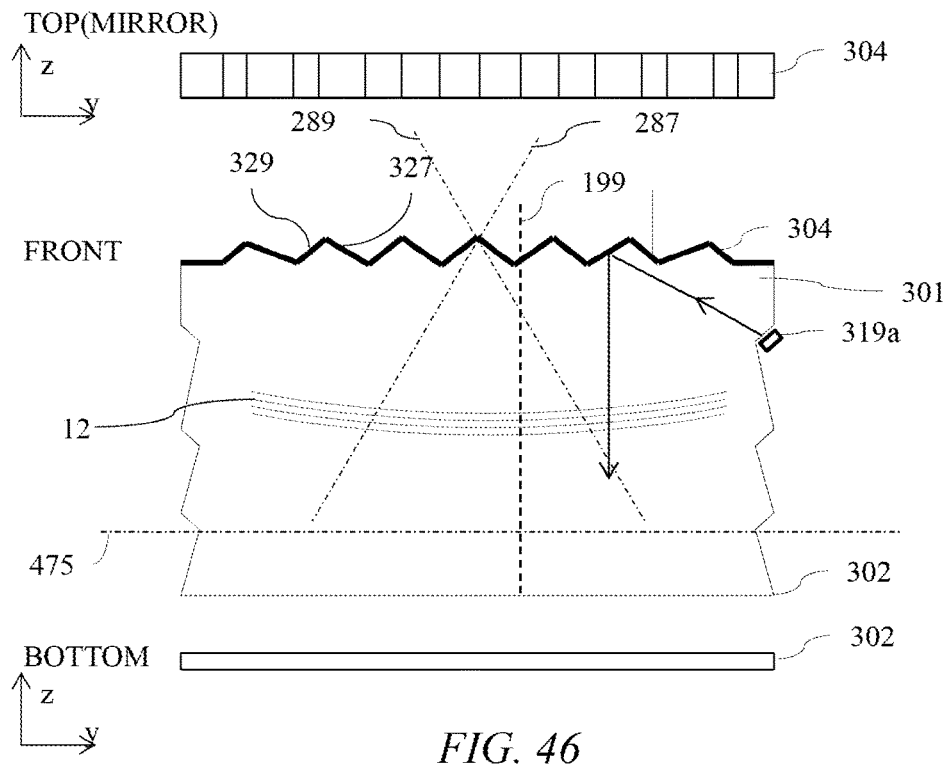
FIG. 46 is a schematic diagram illustrating in top, front and bottom views a stepped imaging waveguide comprising a Fresnel reflector with first and second inclined optical axes, rectangular mirror side and rectangular side opposite the Fresnel reflector, in accordance with the present disclosure.

FIG. 46 is a schematic diagram illustrating in top, front and bottom views a stepped imaging waveguide comprising a Fresnel reflector with first and second inclined optical axes 287, 289, rectangular mirror side 304 and rectangular rear end 302. Lateral variation in window magnification, symmetric light source arrays 317, 319 and reflected light from the rear end 302 all contribute to lateral non-uniformities across the waveguide.

Figure 47:
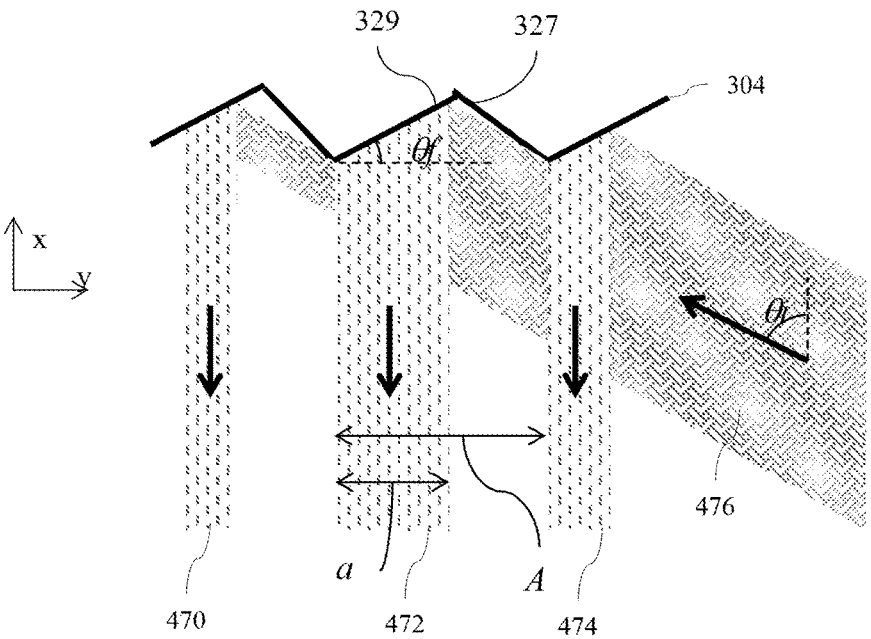
FIG. 47 is a schematic diagram illustrating in front view reflection efficiency at the facets of a Fresnel reflector, in accordance with the present disclosure.

FIG. 47 is a schematic diagram illustrating in front view reflection efficiency at the facets of a Fresnel reflector. The reflective end 304 is thus a Fresnel reflector comprising alternating reflective facets 327 and 329, the reflective facets providing the Fresnel reflector with positive optical power. Off-axis light beam 476 is incident on the facets 329 that are shadowed by facets 327. Thus across pitch A of the facets 329, reflected beam 472 of width a is provided. The reflection efficiency may then be given by the ratio a/A:

$$\frac{a}{A} = \frac{\cos(\theta i)}{\cos(\theta i - 2 \cdot \theta f)} \qquad \text{eqn. 1}$$

where $\theta_i$ is the incident angle and $\theta_f$ is the facet 329 angle. Thus for a central light source 319a the efficiency varies across the lateral extent of the Fresnel reflector.

Figure 48:
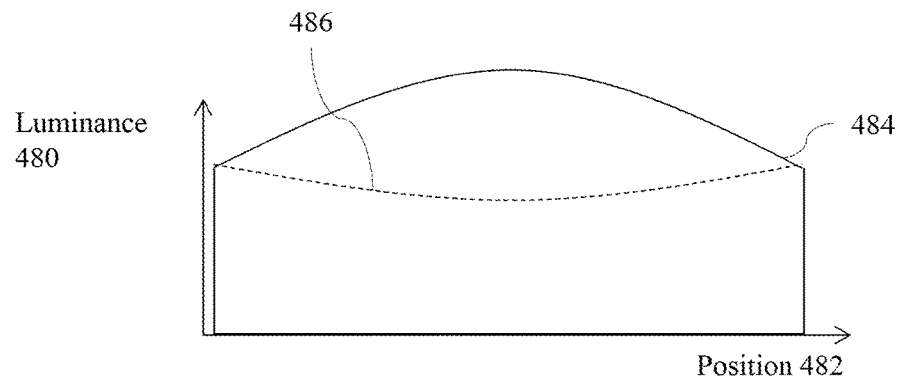
FIG. 48 is a graph illustrating variation of output luminance with lateral position for the waveguide arrangement of FIG. 46, in accordance with the present disclosure.

FIG. 48 is a graph illustrating variation of output luminance with lateral position for the waveguide arrangement of FIG. 46. Thus profile 484 may be provided by mirror shading illustrated in FIG. 47, while combination with magnification and other changes may achieve a resultant profile 486 that may provide lower efficiency in the center of the waveguide.

Figure 49:
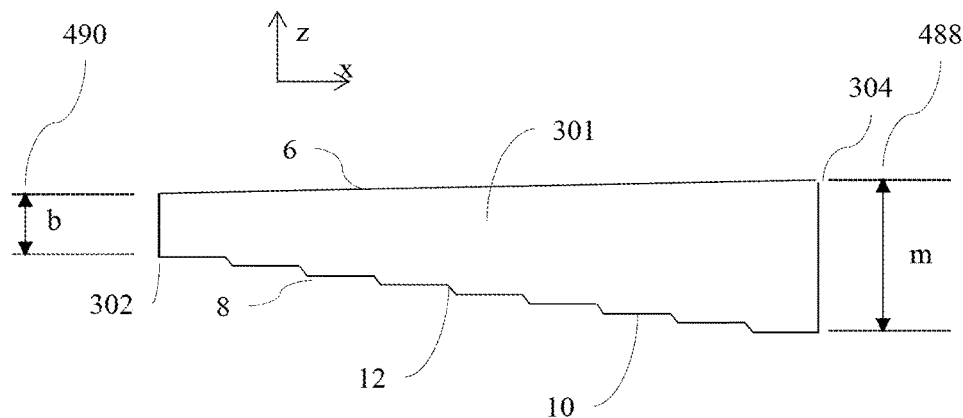
FIG. 49 and FIG. 50 are schematic diagrams illustrating stepped imaging waveguides with different efficiencies, in accordance with the present disclosure.
Figure 50:
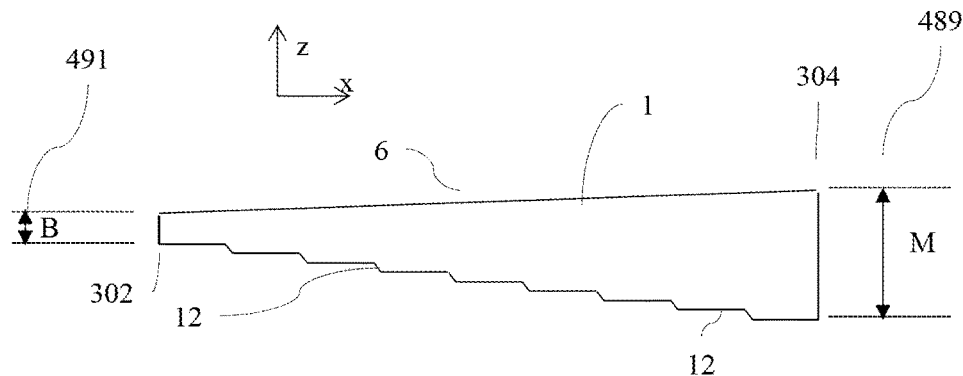

FIGS. 49-50 are schematic diagrams illustrating stepped imaging waveguides with different efficiencies, being cross sections in the x-direction. FIG. 49 illustrates a first cross section with rear end 302 height 490, b and Fresnel reflector end 304 height 488, m and FIG. 50 illustrates a second cross section with rear end 302 height 491, B and Fresnel reflector end 304 height 489, M. Thus sides 6 are not generally parallel to elements 10 of the stepped side 8. The relative geometric efficiency of the waveguide 301 of the two cross sections is approximately given by:

Relative Geometric Efficiency=(1−b/m)/(1−B/M)  eqn.2

Height difference may arise from regions 10 that are not typically not parallel to side 6. Desirably the step height may be at least 0.5 micrometers, preferably at least 1.0 micrometers and more preferably at least 1.5 micrometers to minimize facet rounding during tooling and molding of the waveguide 1. To minimize Moiré visibility the pitch of the facets 12 may be desirably less than 500 micrometers, more preferably less than 350 micrometers and most preferably less than 200 micrometers. Thus the range of height difference 225 may be determined by fabrication and image appearance characteristics of the light guide.

It would be desirable to control the lateral geometric efficiency to compensate for the Fresnel reflector efficiency roll-off shown in FIG. 48.

Figure 51:
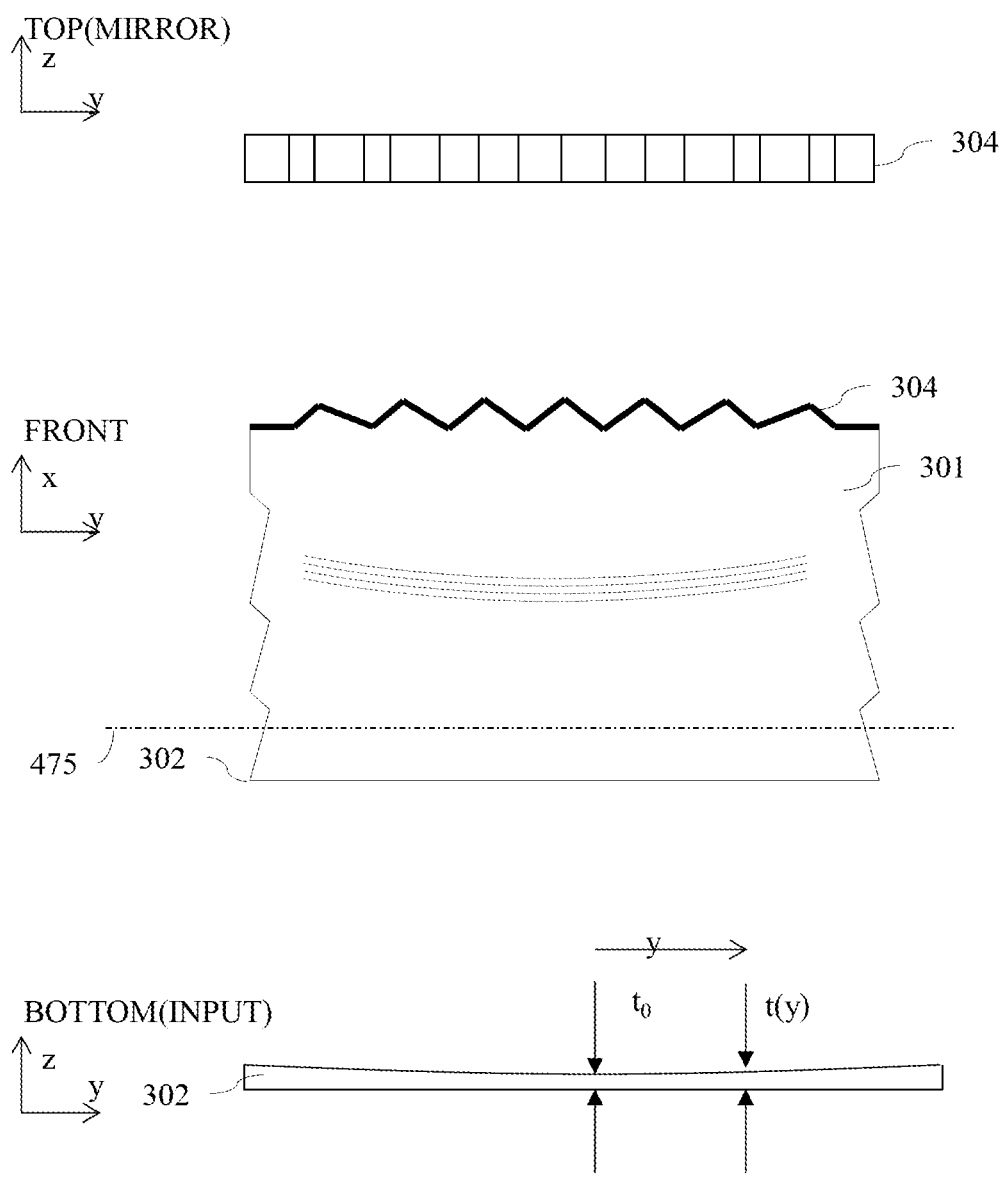
FIG. 51 is a schematic diagram illustrating in top, front and bottom views a stepped imaging waveguide comprising a Fresnel reflector with first and second inclined optical axes, rectangular mirror side and side opposite the Fresnel reflector with a height profile that varies laterally, in accordance with the present disclosure.

FIG. 51 is a schematic diagram illustrating in top, front and bottom views a stepped imaging waveguide comprising a Fresnel reflector with first and second inclined optical axes, rectangular mirror side and rear side 302 opposite the Fresnel reflector end 304 with a height profile that varies laterally. Thus the directional waveguide may comprise a waveguide 301 as described herein wherein the ratio between (a) height of the rear end 302 between the first and second guide surfaces 6, 8 and (b) the height of the reflective end between the first and second guide surfaces has a profile across the lateral direction that is greatest at the optical axis of the Fresnel reflector and reduces towards each side of the optical axis.

Figure 52A:
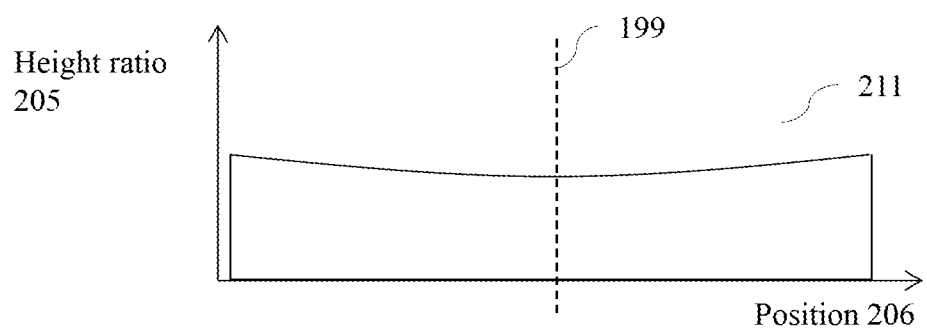
FIG. 52A is a graph illustrating variation of a graph in which the ratio between (a) height of the input end between the first and second guide surfaces and (b) the height of the reflective end between the first and second guide surfaces has a profile across the lateral direction that is smallest at the center of the Fresnel reflector and reduces towards each side of the center, in accordance with the present disclosure.
Figure 52B:
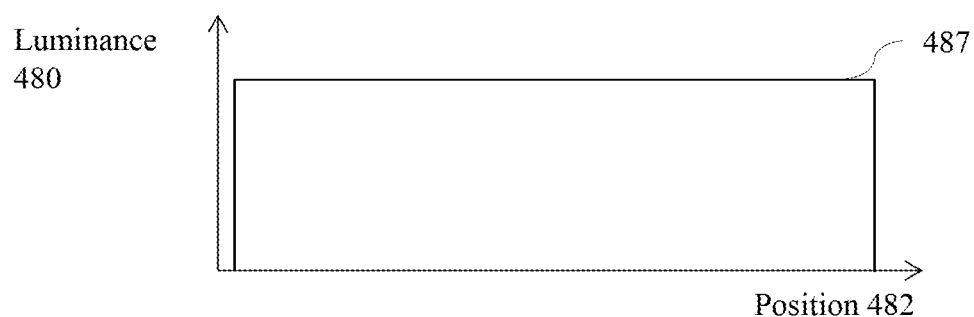
FIG. 52B is a graph illustrating variation of output luminance with lateral position for the waveguide arrangement of FIG. 51, in accordance with the present disclosure.

FIG. 52A is a graph illustrating variation of a graph in which the ratio between (a) height of the input end between the first and second guide surfaces and (b) the height of the reflective end between the first and second guide surfaces has a profile across the lateral direction that is smallest at the center of the Fresnel reflector and reduces towards each side of the center and FIG. 52B is a graph illustrating a flat of output luminance 480 profile 487 with lateral position 482 for the waveguide arrangement of FIG. 51.

Advantageously the lateral uniformity of the waveguide 301 may be optimized.

Figure 53:
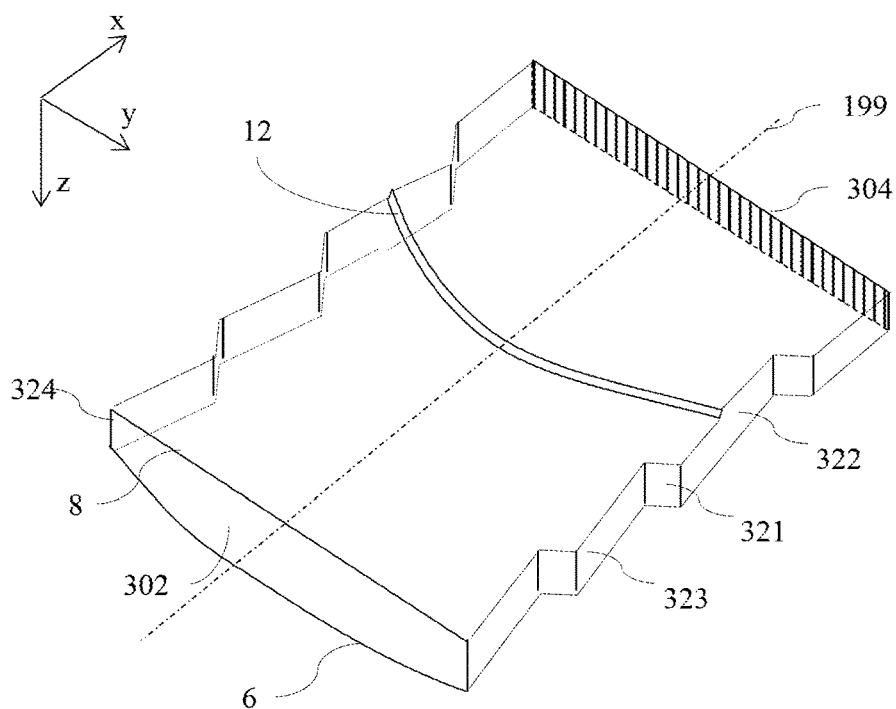
FIG. 53, FIG. 54, FIG. 55, and FIG. 56 are schematic diagrams illustrating in perspective views arrangements of waveguides comprising a Fresnel reflector with first and second inclined optical axes and height ratios with non-flat profiles in a lateral direction, in accordance with the present disclosure.
Figure 54:
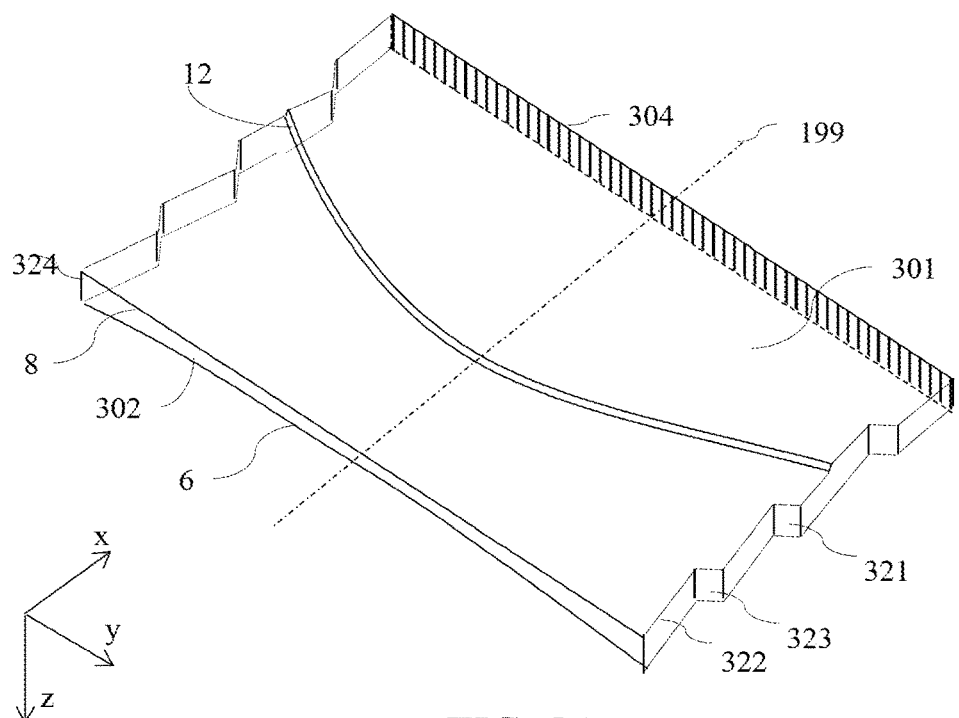
Figure 55:
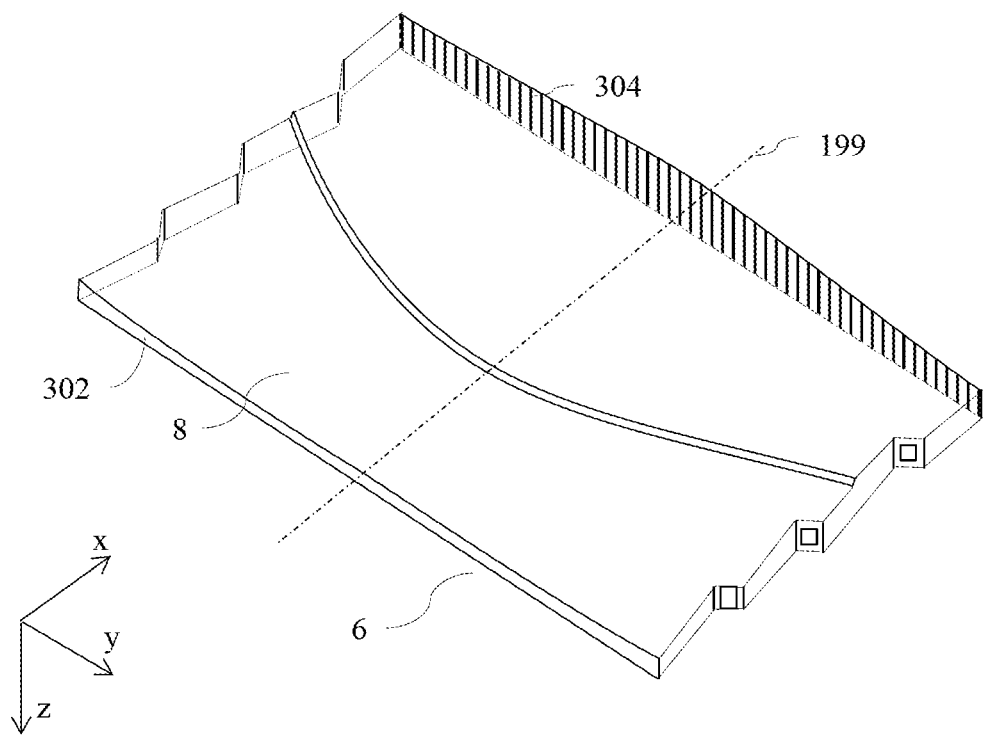
Figure 56:
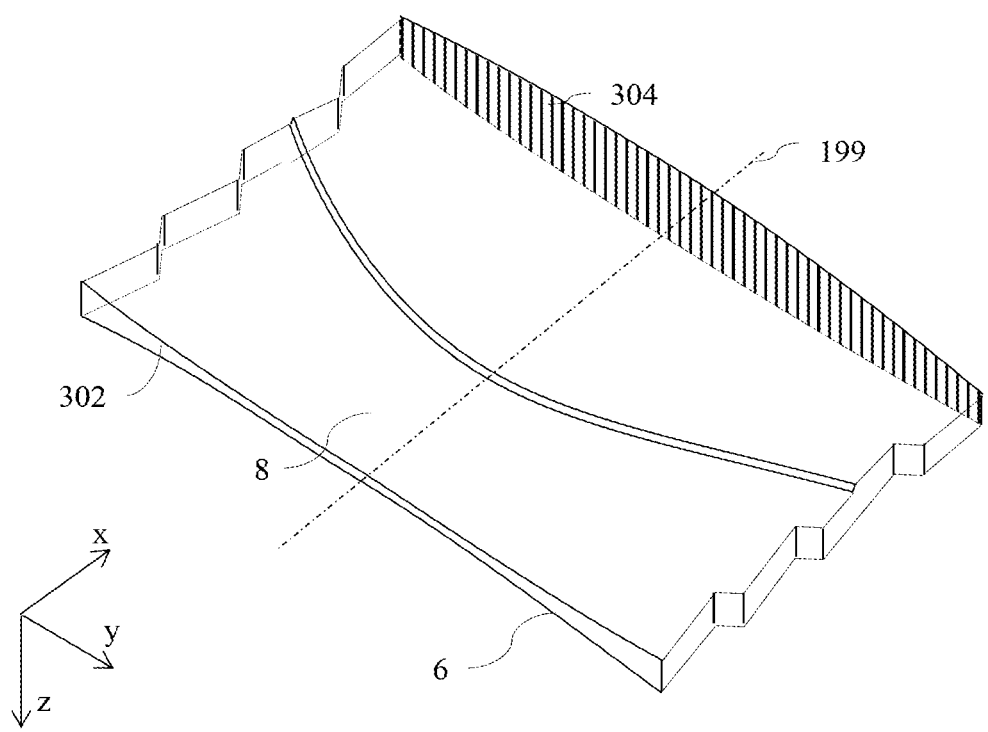

FIGS. 53-56 are schematic diagrams illustrating in perspective views arrangements of waveguides comprising a Fresnel reflector with first and second inclined optical axes and height ratios with non-flat profiles in a lateral direction. In the present embodiments, the ratio of reflective end 304 height to rear end 302 height may typically be smallest at the optical axis 199 although can be greatest at the optical aperture as shown in FIG. 53 for example, depending on the detailed luminance variations across the output of the Fresnel mirror and light extraction features 12.

The embodiments of FIGS. 53-56 can achieve desirable spatial uniformity for an observer 99 viewing the display apparatus from on-axis optical window locations. It would be desirable to provide high spatial uniformity for off-axis viewing positions in the window plane 392.

FIG. 53 further shows a portrait arrangement of waveguide 301. Advantageously, portrait operation may be provided for privacy and other directional modes of operation.

Figure 57:
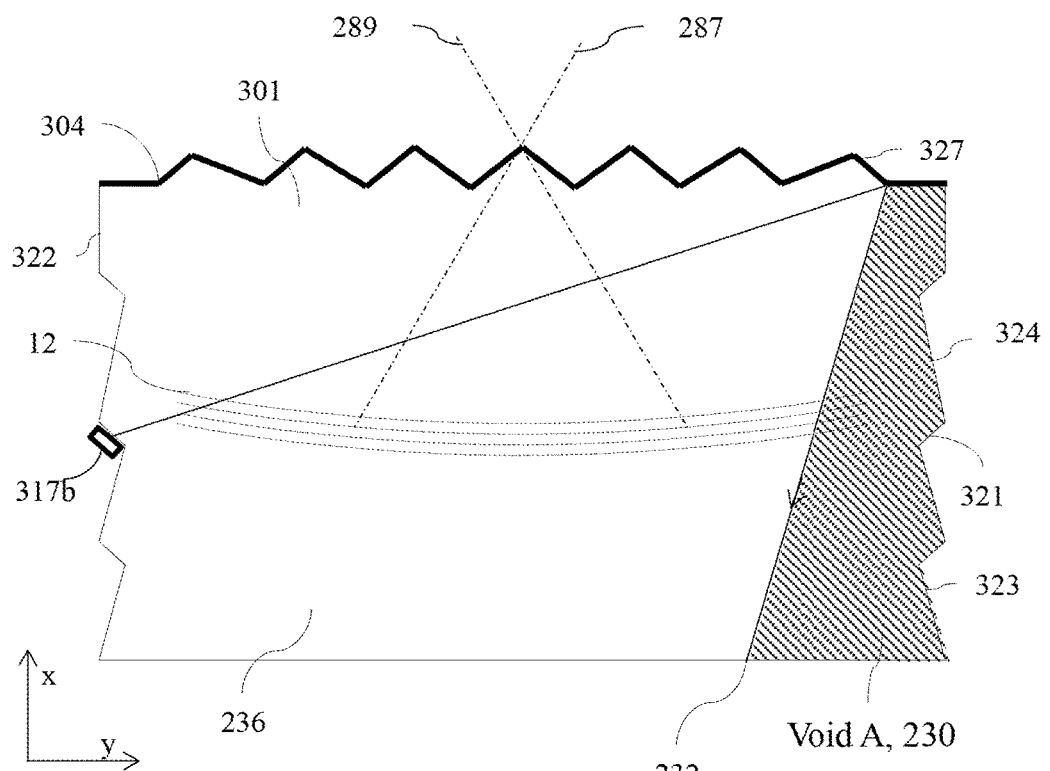
FIG. 57 is a schematic diagram illustrating in top view, formation of an illumination void in a directional waveguide comprising a Fresnel reflector with first and second inclined optical axes, in accordance with the present disclosure.
Figure 58:
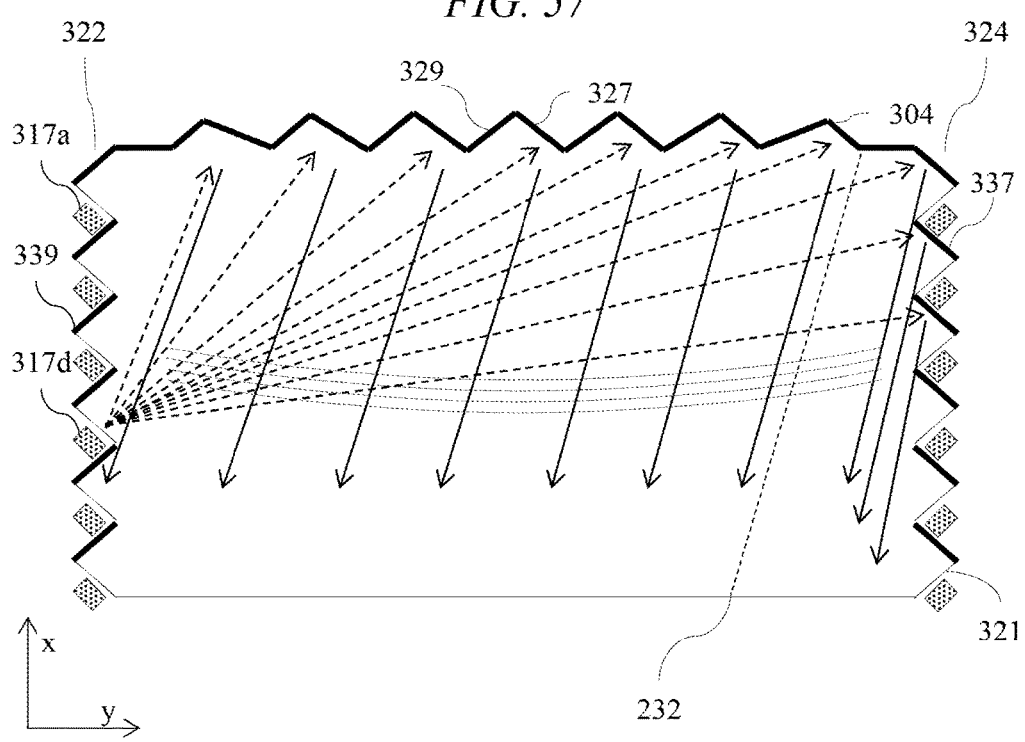
FIG. 58, FIG. 59, FIG. 60, FIG. 61, and FIG. 62 are schematic diagrams illustrating in top view, directional waveguides comprising a Fresnel reflector with first and second inclined optical axes arranged to provide filling of illumination voids, in accordance with the present disclosure.

FIG. 57 is a schematic diagram illustrating in top view, formation of an illumination void in a directional waveguide comprising a Fresnel reflector with first and second inclined optical axes. Light ray 232 from source 317b reflected from facet 327 generates void A, 230 in a similar manner to that shown in FIG. 14. A similar void (not shown) may be present on the left side for the reflected geometry from light source 319b.

It would be desirable to remove the appearance of void A, 230.

FIGS. 58-62 are schematic diagrams illustrating in top view, directional waveguides comprising a Fresnel reflector with first and second inclined optical axes arranged to provide filling of illumination void A. Transmissive facets 321 may be arranged as disclosed elsewhere herein. Reflective facets 337 may be further arranged between transmissive facets 321. The facets may have an inclination such that light rays from source 317d remain parallel to void boundary 232 after reflection from reflective facets 337. Thus, the facets 337 operate as part of a Fresnel reflector comprising facets 327 and facets 337. Further facets 339 between sources of array 317 may be arranged to operate as part of a Fresnel reflector comprising facets 329 and facets 339.

Thus the side surface 324 opposite the surface 322 along which the array 617 of light sources is arranged may comprise side reflective facets 337 wherein said side reflective facets 337 provide a side Fresnel reflector with substantially the same positive optical power in the lateral direction and optical axis direction as the Fresnel reflector arranged at the reflective end 604.

Figure 59:
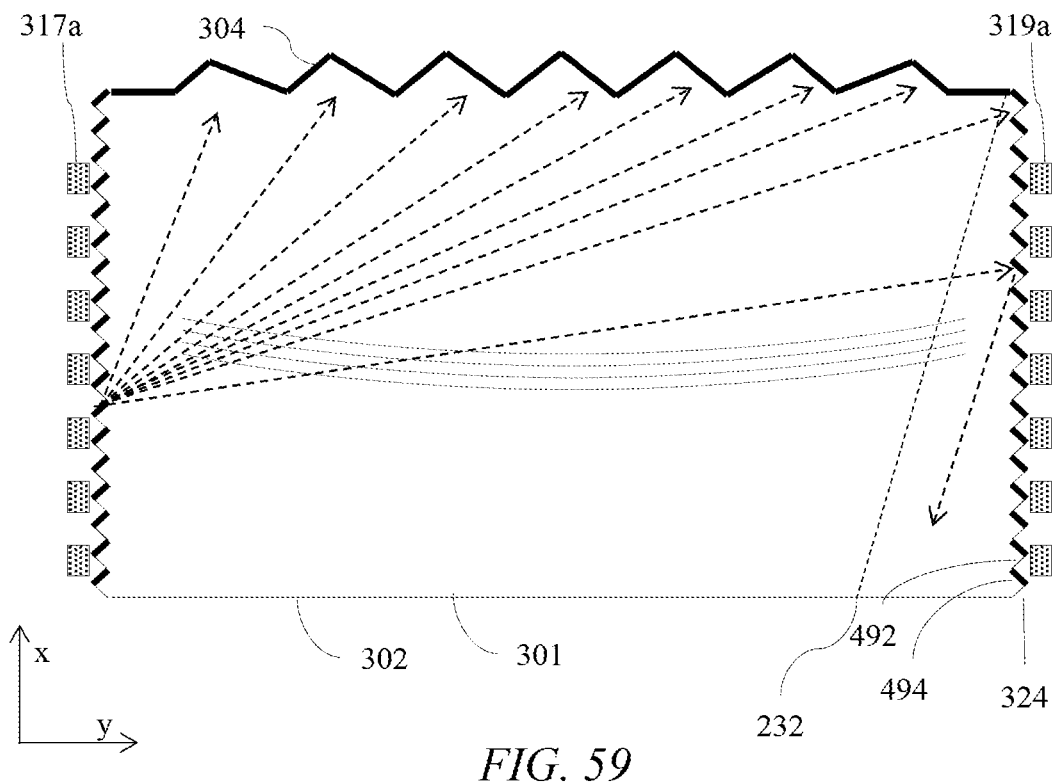
Figure 60:
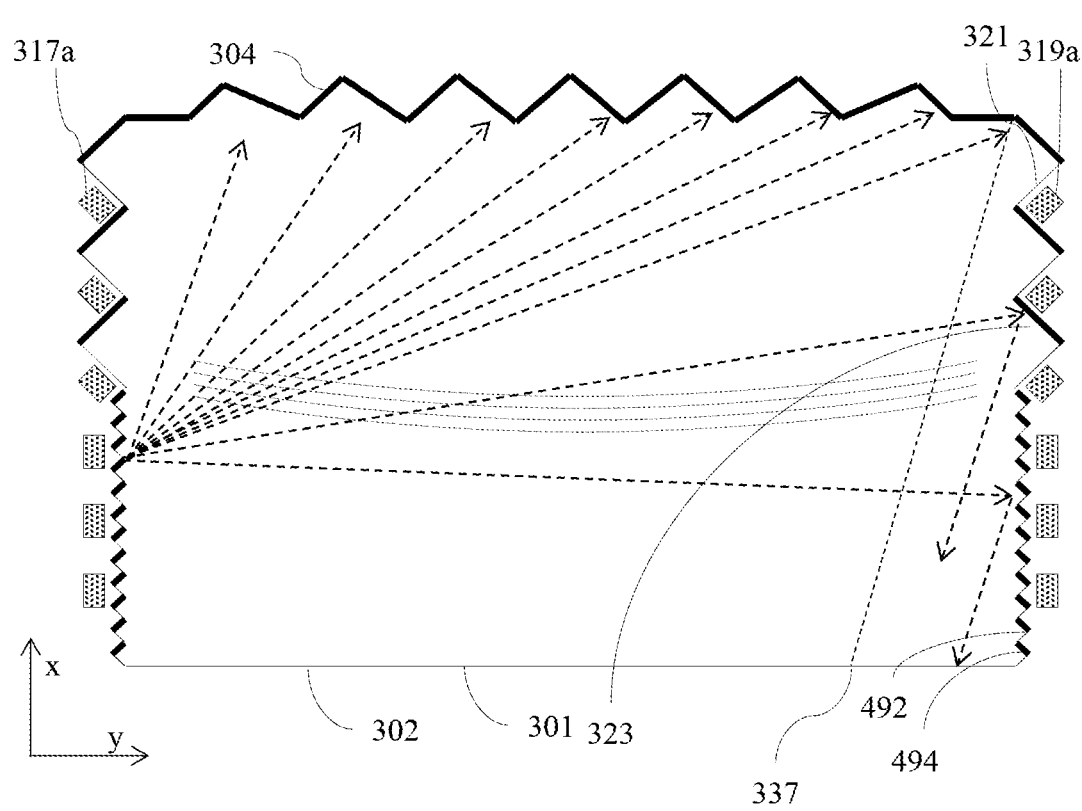

FIG. 59 illustrates that the input and reflective facets 492, 494 may be on a pitch that is different to the light source arrays 317, 319. Advantageously alignment of the light sources 317a-n, 319a-n to the facets is not required, and the light sources may be arranged in a linear array, improving mechanical ruggedness. FIG. 60 illustrates that a combination of linear and rotated light sources and input facets 321 may be provided. Advantageously, high luminous flux light sources can be accurately aligned to optimize efficiency, whereas low luminous flux light sources can be more conveniently aligned.

Figure 61:
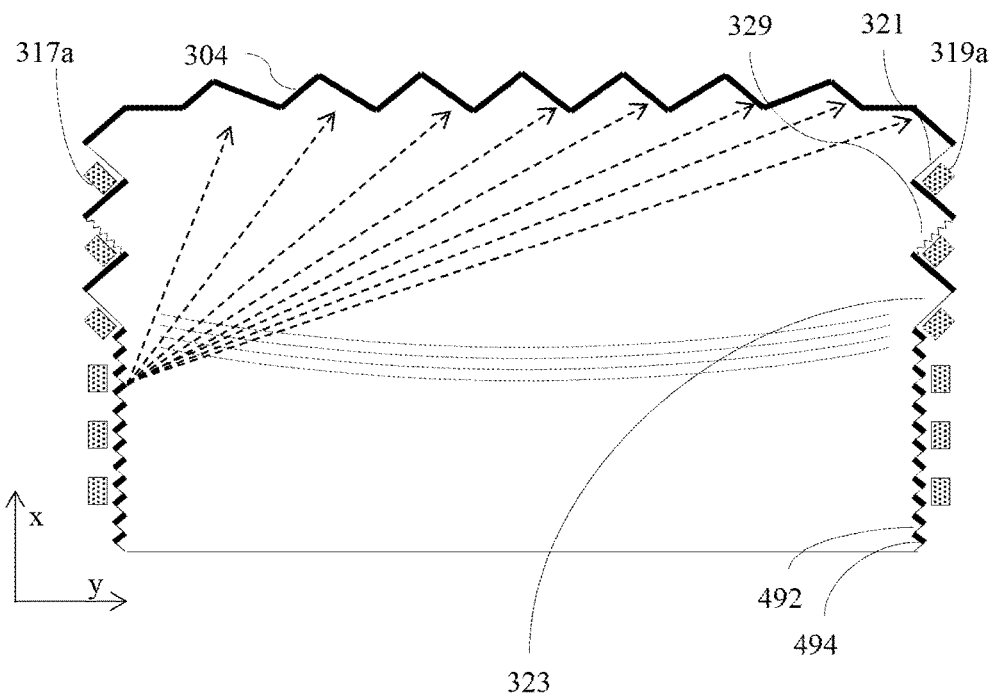
Figure 62:
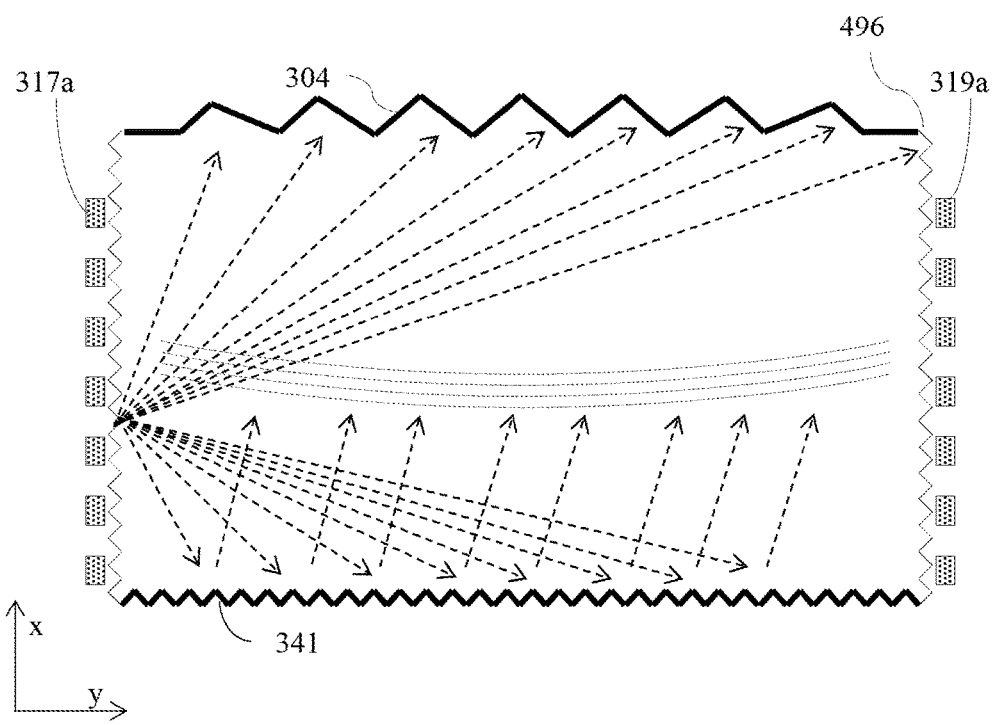

FIG. 61 illustrates that the input facets 321 may be provided with microstructure 329. Such microstructure may be arranged to provide efficient spreading of light from the light sources onto the Fresnel reflector 327, 329 and reflective facets 337, 339. The microstructure may be the same on each facet 321, 492 or may vary along the side of the waveguide to provide optimization of uniformity and efficiency. FIG. 62 illustrates that light from the light sources 317a-n and 319a-n may further be incident on to the rear end 302 with a microstructure 341 arranged to direct light to off-axis viewing directions, conveniently to increase off-axis optical window luminance.

Considering FIG. 13, it would be further desirable to provide light sources on one side of the waveguide 301, thus reducing short side bezel width in addition to reduced long side bezel width, thus achieving a smaller footprint backlight.

Figure 63:
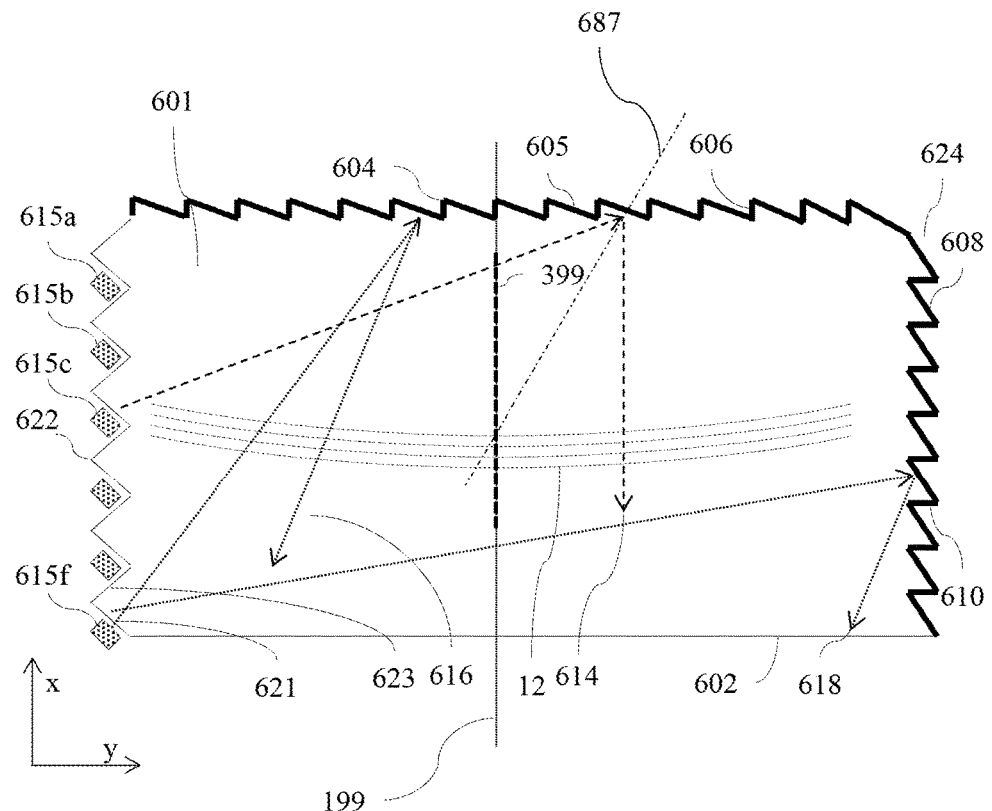
FIG. 63 is a schematic diagram illustrating in top view, a directional waveguide comprising a Fresnel reflector with an inclined optical axis and light sources on a short side, in accordance with the present disclosure.
Figure 64:
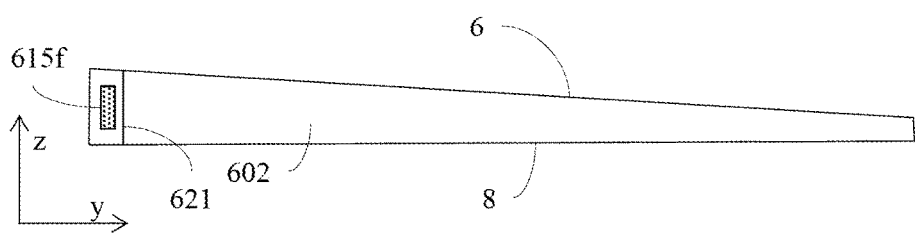
FIG. 64 is a schematic diagram illustrating in bottom view, a directional waveguide comprising a Fresnel reflector with an inclined optical axis and light sources on a short side, in accordance with the present disclosure.
Figure 65:
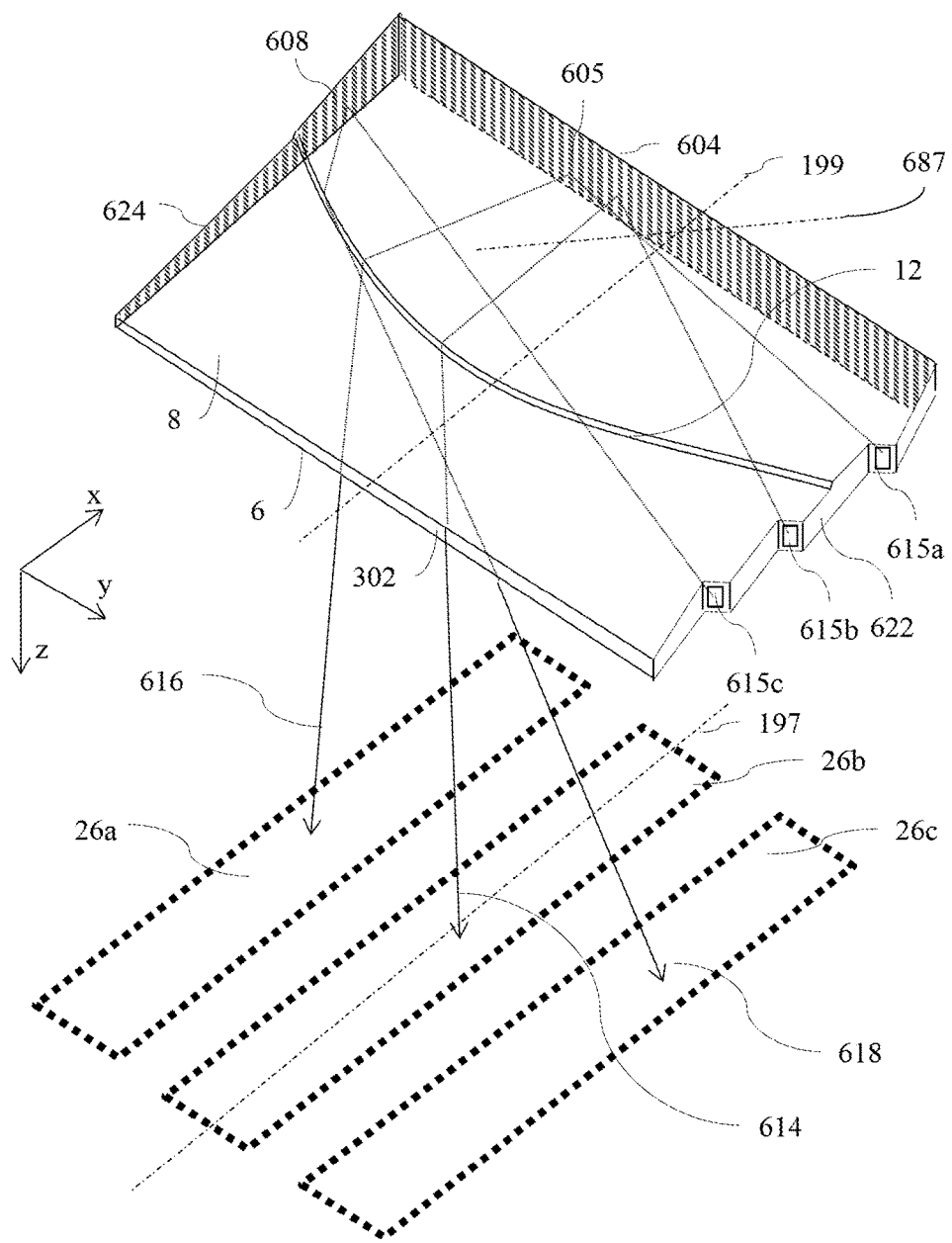
FIG. 65 is a schematic diagram illustrating in perspective view, a directional waveguide comprising a Fresnel reflector with an inclined optical axis and light sources on a short side, in accordance with the present disclosure.

FIG. 63 is a schematic diagram illustrating in top view, a directional waveguide comprising a Fresnel reflector with an inclined optical axis and array 615 of light sources 615a-n on short side 622 and FIG. 64 is a schematic diagram illustrating in bottom view, a directional waveguide comprising a Fresnel reflector with an inclined optical axis and light sources on a short side. FIG. 65 is a schematic diagram illustrating in perspective view, a directional waveguide comprising a Fresnel reflector with an inclined optical axis and light sources on a short side.

Thus a directional backlight may comprise a directional waveguide 601 and light sources 615a-n, the directional waveguide 601 comprising a reflective end 604 that is elongated in a lateral direction (y axis); first and second opposed guide surfaces 6, 8 extending from laterally extending edges of the reflective end 604 for guiding input light along the waveguide 601 towards the reflective end 604 and for guiding light reflected by the reflected end 604 away from the reflective end 604, the second guide surface 8 being arranged to deflect light reflected from the reflective end 604 through the first guide surface 6 as output light; and side surfaces 622, 624 extending between the first and second guide surfaces 6, 8, wherein the light sources include an array 615 of light sources 615a-n arranged along a side surface 622 to provide said input light through that side surface 622, and the reflective end 604 comprises first and second facets 605, 606 alternating with each other in the lateral direction, the first facets 605 being reflective and forming reflective facets of a Fresnel reflector having positive optical power in the lateral direction, the second facets 606 forming draft facets of the Fresnel reflector, the Fresnel reflector having an optical axis 687 that is inclined towards the side surface 622 in a direction in which the Fresnel reflector deflects input light from the array 615 of light sources into the waveguide 601, the waveguide 601 being arranged to direct the output light from the light sources 615a-n into respective optical windows 26a-n in output directions that are distributed laterally in dependence on the positions of the light sources.

The side surface 624 opposite the surface 622 along which the array 615 of light sources is arranged may comprise side reflective facets 608 wherein said side reflective facets 608 provide a side Fresnel reflector with substantially the same positive optical power in the lateral direction and optical axis direction as the Fresnel reflector arranged at the reflective end 604. Side reflective facets may provide void A filling in the same manner as described in FIG. 58 for example.

Short side 624 may comprise an array of reflective facets 608 and draft facets 610. Reflective end 604 may comprise a Fresnel reflector with facets 604 and draft facets 606. In operation, light from source 615c may be directed to facets 604 of reflective end 604 and collimated so that rays 614 are parallel to axis 199. Optical axis 399 of curved facets 12 may also be aligned and an on-axis optical window 626c is provided at a window plane.

FIG. 64 illustrates the rear end 602 shape so that the ratio between (a) height of the rear end 602 between the first and second guide surfaces 6,8 and (b) the height of the reflective end 604 between the first and second guide surfaces has a profile across the lateral direction that is greatest at the side on which the light source array 615 is arranged and reduces in the lateral direction. Further the height of the rear end 602 between the first and second guide surfaces 6, 8 may have a profile across the lateral direction that is greatest at the side on which the light source array is arranged and reduces in the lateral direction.

Advantageously, lateral spatial non-uniformities may be compensated for on-axis optical window locations.

Advantageously a directional backlight can be provided that achieves a smaller footprint in comparison to the arrangement of FIG. 17 for example. Further spatial uniformity for viewing from on-axis and off-axis optical window locations may be achieved.

It would be desirable to provide a high luminance output from the waveguide 301 using a thin waveguide. Further it would be desirable to use light sources that may comprise LEDs with height that is similar to the height of the reflective end of the waveguide.

Figure 66:
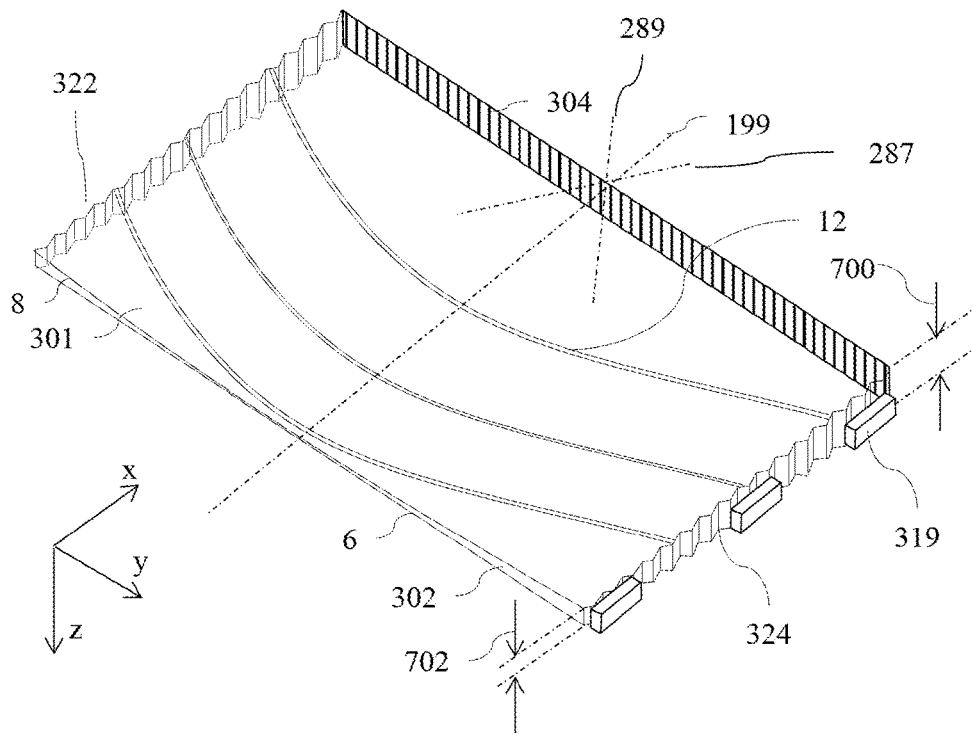
FIG. 66 is a schematic diagram illustrating in perspective view, a directional waveguide comprising a Fresnel reflector with first and second inclined optical axes and LEDs arranged on a short side, in accordance with the present disclosure.
Figure 67A:
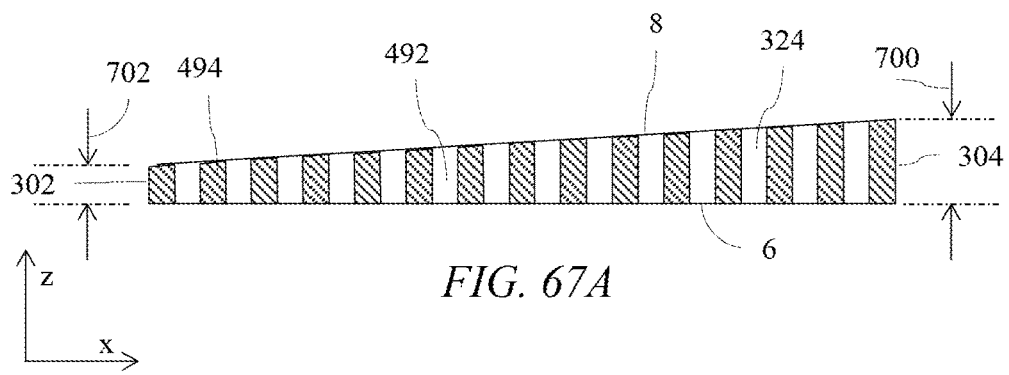
FIG. 67A is a schematic diagram illustrating in side view, a side of a directional waveguide that is tapered and comprises input and reflective facets, in accordance with the present disclosure.

FIG. 66 is a schematic diagram illustrating in perspective view, a directional waveguide 301 comprising a Fresnel reflector 304 with first and second inclined optical axes 287 and light sources 319 that may comprise LEDs arranged on a short side surfaces 322, 324. FIG. 67A is a schematic diagram illustrating in side view, a side 324 of a directional waveguide 301 that is tapered and comprises input and reflective facets. Surfaces 322, 324 may comprise a structure surface with input facets 492 and reflective facets 494 as described elsewhere herein. Height 700 of Fresnel reflector 304 is greater than height 702 of side 302 and has a taper that may be linear or another profile determined by the height and pitch of the extraction features 12 between at the Fresnel reflector 304 and side 302.

Figure 67B:
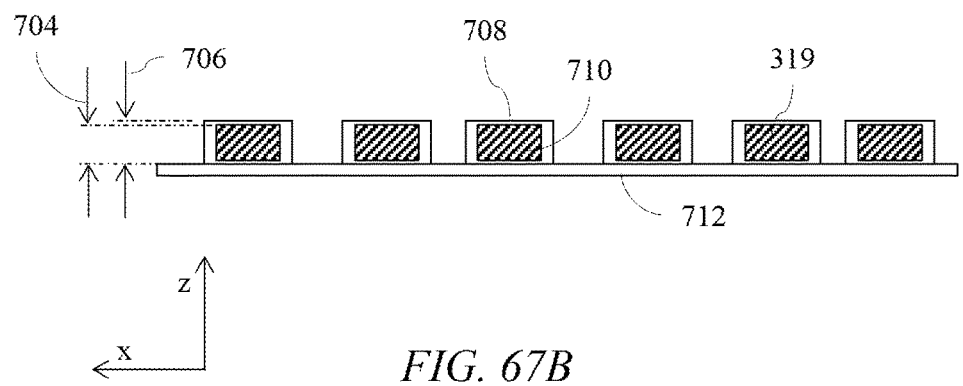
FIG. 67B is a schematic diagram illustrating in side view, an LED array input into the waveguide of FIG. 66, in accordance with the present disclosure.

FIG. 67B is a schematic diagram illustrating in side view, an LED array input into the waveguide of FIG. 66. Light source array 319a-n, may be provided by an LED array comprising LEDs with package 708 with height 706 and light emitting region 710 with height 704. Light emitting region 710 may for example comprise a blue light emitting semiconductor device such as a gallium nitride chip and may further comprise a phosphor arranged to cooperate with the semiconductor device to provide white light. Alternatively, separate color devices may be provided such as red, green and blue emitting devices. The LED array may be arranged on a printed circuit board 712.

Figure 67C:
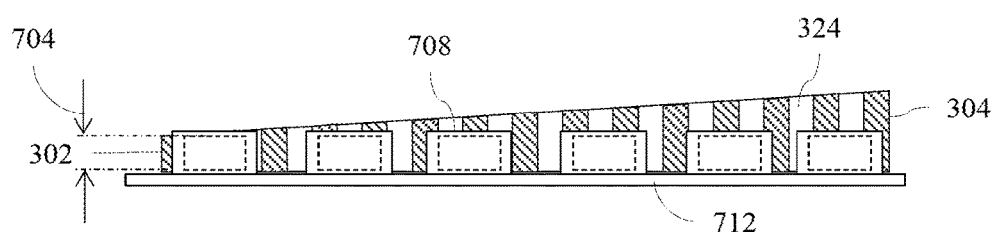
FIG. 67C is a schematic diagram illustrating in side view, alignment of the LED array of FIG. 67B with the input side of FIG. 67A, in accordance with the present disclosure.

FIG. 67C is a schematic diagram illustrating in side view, alignment of the LED array of FIG. 67B with the input side 324 of FIG. 67A. The thickness of a backlight comprising waveguide 301 is typically determined by the thickness 700 of the Fresnel reflector 304 at the reflective end. To minimize stray light it is desirable to provide height 704 of the LED emitting aperture 710 to be less than the height 702 of the side 302. Thus, the LED height 704 is constrained in a thin package. Such thin LEDs have limited luminous flux, and thus the display luminance may be lower than may be desired.

The height 702 of the side 302 may be increased by changes to extraction feature 12 step height and pitch. However, increasing height 702 reduces waveguide efficiency.

It would be desirable to increase the LED emitting aperture height 704 while providing a thin waveguide with high efficiency.

Figure 67D:
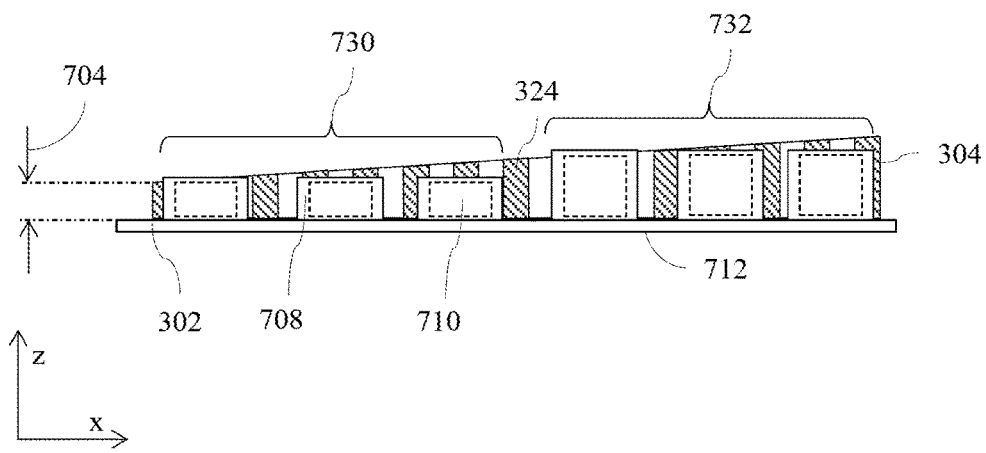
FIG. 67D is a schematic diagram illustrating in side view, alignment of an LED array comprising at least two LED heights with the input side of FIG. 67A, in accordance with the present disclosure.

FIG. 67D is a schematic diagram illustrating in side view, alignment of an LED array comprising at least two LED heights with the input side of FIG. 67A. In first region 730 of the LED array LEDs with low height may be provided, whereas in the second region 732 LEDs with a greater height may be provided. The LEDs in region 732 may be arranged to provide on-axis illumination with high luminance, whereas the LEDs in region 730 may be arranged to provide off-axis illumination with lower illuminance.

Advantageously, on-axis luminance may be increased in comparison to the arrangement of FIG. 67C.

It would be desirable to provide a single type of LED in the LED array while achieving high luminance and high waveguide efficiency.

FIG. 68A is a schematic diagram illustrating in perspective view, a directional waveguide 301 comprising a Fresnel reflector with first and second inclined optical axes 287, 289, and input tapered regions 722, 724 with LEDs arranged on a short side of a constant height 720. Tapered regions 722, 724 may be planar and may be arranged with a shape that is for example substantially triangular so that the height 702 of the input side 302 at the edge of the region of extraction features 12 of the surface 8. In operation, light from sources of array 319 is coupled between the input side 324 and region of extraction surfaces by guiding. Stray light may be provided by the tapered regions 722, 724 that may be hidden by shielding layers (not shown).

Thus a directional waveguide 301 includes at least one tapered region 722, 724 adjacent the side surface 322, 324 within which the height 720 of the waveguide 301 between the first and second guide surfaces 6,8 increases along a direction from the remainder of the waveguide 301 towards the side surface 322, 324. The width of the tapered regions 722, 724 in the lateral direction (y-axis) increases in the direction away from the reflective end 304.

FIG. 68B is a schematic diagram illustrating in rear view, a directional waveguide comprising a Fresnel reflector with first and second inclined optical axes, and taper regions 722, 724 arranged on a side of the waveguide 301 comprising light extraction features. The tapered regions may thus be provided on the side of the waveguide 301 with the second guide surface 8. Advantageously the tapered regions 722, 724 and surface 8 may be provided on the same tool surface, providing a single tool for cutting and a single substantially planar surface for tooling, thus reducing complexity of the tooling system and further increasing yield of molding.

FIG. 68C is a schematic diagram illustrating in rear view, a directional waveguide comprising a Fresnel reflector at the reflective end 304 with first and second inclined optical axes 287, 289, and taper regions 722, 724 arranged on a first (output) side 6 of the waveguide.

Advantageously the tool for the light extraction surface 8 may be less complex than the tool used in FIG. 68B. In other embodiments, taper regions 722, 724 may be arranged on both sides of surfaces 6, 8.

Figure 69A:
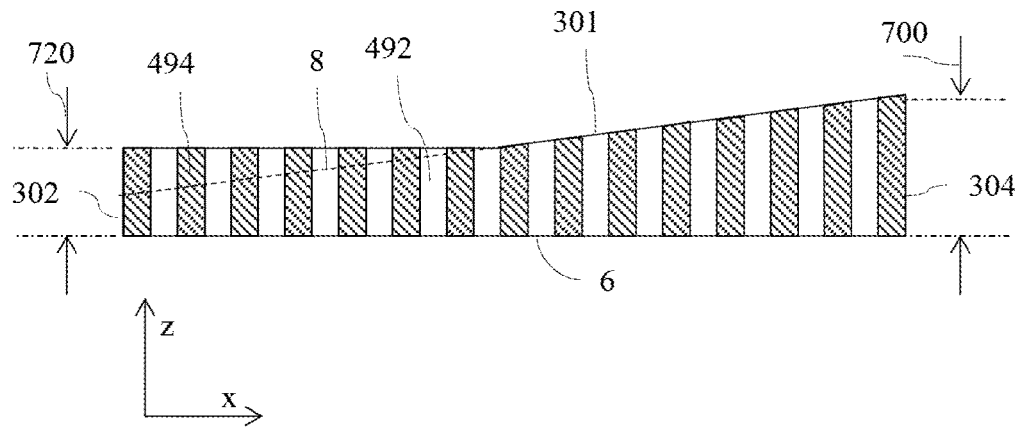
FIG. 69A is a schematic diagram illustrating in side view, a side of a directional waveguide that comprises an input taper and comprises input and reflective facets, in accordance with the present disclosure.

FIG. 69A is a schematic diagram illustrating in side view, a side of a directional waveguide that comprises an input taper and comprises input and reflective facets. Thus the input side 324 may be rectangular such that heights 700, 720 are substantially the same.

Figure 69B:
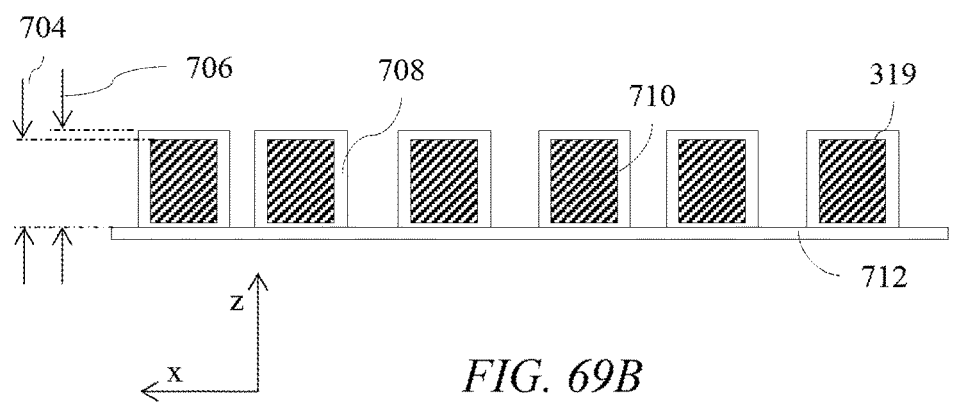
FIG. 69B is a schematic diagram illustrating in side view, an LED array input into the waveguide of FIG. 68A, in accordance with the present disclosure.
Figure 69C:
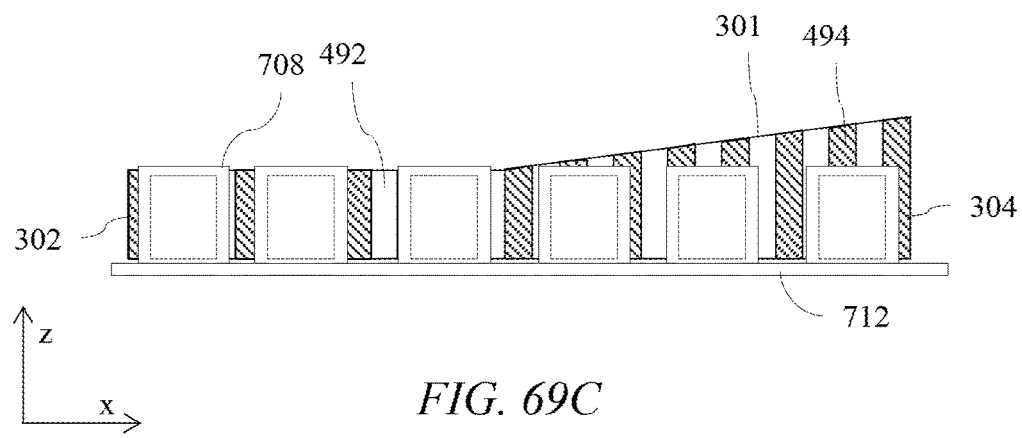
FIG. 69C is a schematic diagram illustrating in side view, alignment of the LED array of FIG. 69B with the input side of FIG. 69A, in accordance with the present disclosure.

FIG. 69B is a schematic diagram illustrating in side view, an LED array input into the waveguide of FIG. 68A. The height 704 of the emitting aperture 710 may thus be increased with respect to the LEDs of the array of FIG. 67B. FIG. 69C is a schematic diagram illustrating in side view, further illustrating alignment of the LED array of FIG. 69B with the input side 302 of FIG. 69A.

Figure 70A:
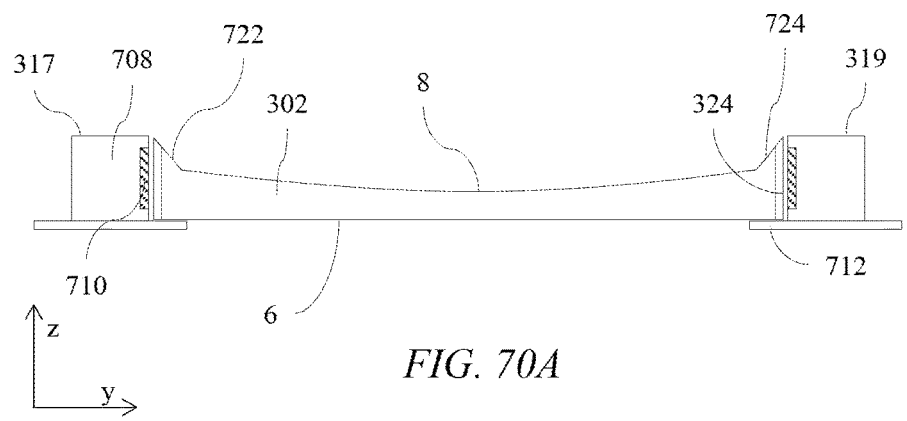
FIG. 70A is a schematic diagram illustrating in end view of the end opposite the reflective end, alignment of an LED array with the sides of a directional waveguide of FIG. 68A, in accordance with the present disclosure.
Figure 70B:
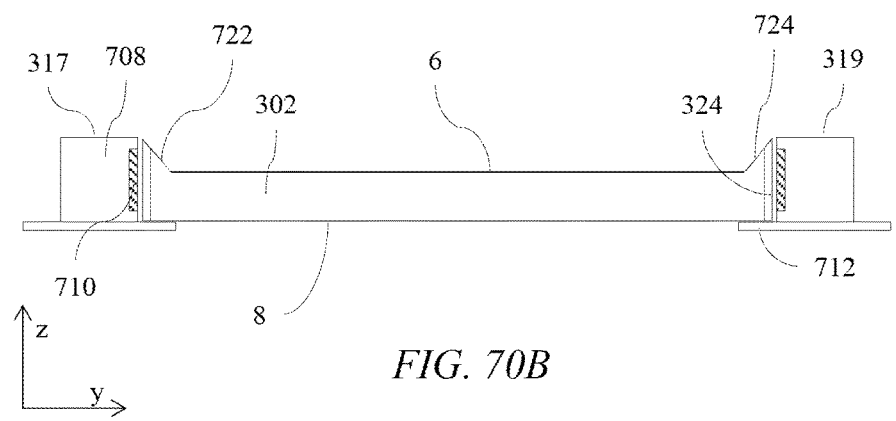
FIG. 70B is a schematic diagram illustrating in end view of the end opposite the reflective end, alignment of an LED array with the sides of a directional waveguide of FIG. 68C, in accordance with the present disclosure.

FIGS. 70A-70B are schematic diagram illustrating in end view of the end opposite the reflective end, alignment of an LED array with the sides of a directional waveguide of FIG. 68B-C respectively. Thus the printed circuit boards 712 may be conveniently aligned with the waveguide 301 to achieve (i) attachment to the substantially planar surface 6 or and light shielding properties that may cover the taper regions 722, 724 as shown in FIG. 70A or (ii) more convenient manufacture of the waveguide 301 as also illustrated in FIG. 68C. FIG. 70B also illustrates that the side 302 may have a constant height that is less than the height of the LEDs 708 of the light source arrays 317, 319. Advantageously, convenient manufacturing and assembly arrangements may be achieved.

Figure 71:
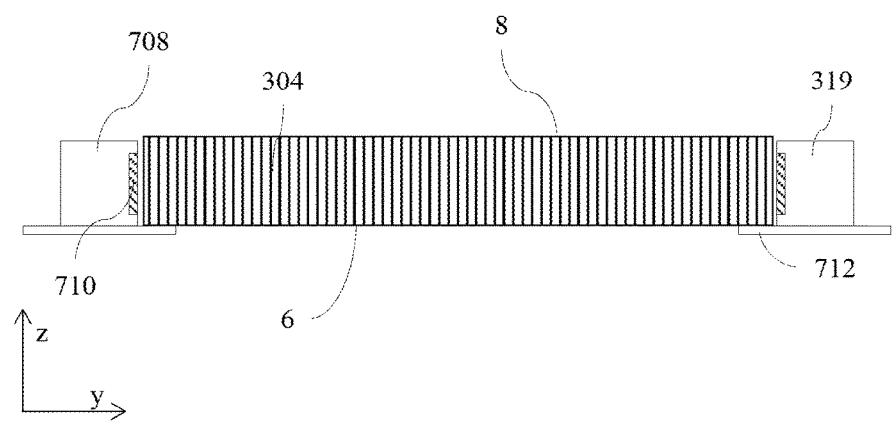
FIG. 71 is a schematic diagram illustrating in end view of the reflective end, alignment of an LED array with the sides of a directional waveguide of FIG. 68A, in accordance with the present disclosure.

FIG. 71 is a schematic diagram illustrating in end view of the reflective end, alignment of an LED array with the sides of a directional waveguide 301 of FIG. 68A.

Advantageously LEDs with high luminous flux can be provided for on-axis illumination while minimizing stray light from leakage from misalignment of LED emitting aperture 310 with input side 324. LED emitting aperture 710 height 704 may be increased and coupling efficiency of the LED into the waveguide may be controlled. Further a low thickness 702 of side 302 may be provided, achieving high efficiency. The same LEDs may be used, reducing complexity and cost while achieving high on-axis luminance.

The embodiments related to stepped waveguide directional backlights may be applied with changes as necessary to the wedge directional backlight as described herein.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Also incorporated by reference herein in their entireties are U.S. Patent Publ. Nos. 2013/0307831, 2013/0335821, 2013/0307946, and 2014/0009508, U.S. patent application Ser. No. 15/097,750 entitled "Wide angle imaging directional backlights" filed Apr. 13, 2016, U.S. patent application Ser. No. 15/098,084 entitled "Wide angle imaging directional backlights" filed Apr. 13, 2016, and U.S. patent application Ser. No. 14/751,878 entitled "Directional privacy display" filed Jun. 26, 2015.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A directional backlight comprising a directional waveguide and light sources,
the directional waveguide comprising:
a reflective end that is elongated in a lateral direction;
first and second opposed guide surfaces extending from laterally extending edges of the reflective end for guiding input light along the waveguide towards the reflective end and for guiding light reflected by the reflected end away from the reflective end, the second guide surface being arranged to deflect light reflected from the reflective end through the first guide surface as output light; and
side surfaces extending between the first and second guide surfaces, wherein
the light sources include an array of light sources arranged along a side surface to provide said input light through that side surface, and
the reflective end comprises first and second facets alternating with each other in the lateral direction, the first facets being reflective and forming reflective facets of a Fresnel reflector having positive optical power in the lateral direction, the second facets forming draft facets of the Fresnel reflector, the Fresnel reflector having an optical axis that is inclined towards the side surface in a direction in which the Fresnel reflector deflects input light from the array of light sources into the waveguide, the waveguide being arranged to direct the output light from the light sources into respective optical windows in output directions that are distributed laterally in dependence on the positions of the light sources.

2. A directional backlight according to claim 1, wherein the light sources include two arrays of light sources each arranged along one of the side surfaces, and
the first facets and the second facets are reflective, the first and second facets forming, respectively, reflective facets of first and second Fresnel reflectors each having positive optical power in the lateral direction, the second and first facets forming, respectively, draft facets of the first and second Fresnel reflectors, the first and second Fresnel reflectors having optical axes inclined towards respective side surfaces in directions in which the Fresnel reflectors deflect input light from the array of light sources arranged along the respective side surface into the waveguide.

3. A directional backlight according to claim 2, wherein the first and second facets have mirror symmetry about a plane of symmetry extending from the reflective end, the optical axes of the first and second Fresnel reflectors being inclined from the plane of symmetry towards the respective side surfaces.

4. A directional backlight according to claim 1, wherein the light sources are arranged with mirror symmetry about the plane of symmetry.

5. A directional backlight according to claim 1, wherein the first guide surface is arranged to guide light by total internal reflection and the second guide surface comprises a plurality of light extraction features oriented to direct light reflected by the reflected end in directions allowing exit through the first guide surface as the output light and intermediate regions between the light extraction features that are arranged to guide light along the waveguide.

6. A directional backlight according to claim 5, wherein the light extraction features have positive optical power in the lateral direction.

7. A directional backlight according to claim 6, wherein the light extraction features have an optical axis to which the optical axis of the Fresnel reflector is inclined.

8. A directional backlight according to claim 5, wherein the light extraction features and the intermediate regions alternate with one another in a stepped shape.

9. A directional backlight according to claim 1, further comprising a rear end facing the reflective end.

10. A directional backlight according to claim 9, further comprising input sources arranged along at least part of the rear end adjacent the side surface.

11. A directional backlight according to claim 9, wherein at least part of the rear end is reflective.

12. A directional backlight according to claim 9, wherein at least part of the rear end is non-reflective.

13. A directional backlight according to claim 1, wherein the ratio between (a) height of the rear end between the first and second guide surfaces and (b) the height of the reflective end between the first and second guide surfaces has a profile across the lateral direction that is greatest at the side on which the light source array is arranged and reduces in the lateral direction.

14. A directional backlight according to claim 13, wherein the height of the rear end between the first and second guide surfaces has a profile across the lateral direction that is greatest at the side on which the light source array is arranged and reduces in the lateral direction.

15. A directional backlight according to claim 6, wherein the ratio between (a) height of the rear end between the first and second guide surfaces and (b) the height of the reflective end between the first and second guide surfaces has a profile across the lateral direction that is least at the optical axis of the light extraction features and increases towards each side of the optical axis.

16. A directional backlight according to claim 15, wherein the height of the rear end between the first and second guide surfaces has a profile across the lateral direction that is lowest at the optical axis of the light extraction features and reduces towards each side of the optical axis.

17. A directional backlight according to claim 16, wherein the edge of the rear end at the first guide surface is curved and the edge of the rear end at the second guide surface is straight to provide said profile.

18. A directional backlight according to claim 1, wherein the waveguide includes a tapered region adjacent the side surface within which the height of the waveguide between the first and second guide surfaces increases along a direction from the remainder of the waveguide towards the side surface.

19. A directional backlight according to claim 18, wherein the width of the tapered region in the lateral direction increases in the direction away from the reflective end.

20. A directional backlight according to claim 1, wherein the optical axis of the Fresnel reflector is inclined towards the side surface in a direction such that the output light from a light source of the array of light sources arranged along a side surface is directed into the central optical window of the distribution of optical windows.

21. A directional backlight according to claim 1, wherein the side surface along which the array of sources is arranged comprises recesses including input facets facing the reflective end, the light sources being arranged to provide said input light through the input facets.

22. A directional backlight according to claim 1, wherein the side surface opposite the surface along which the array of sources is arranged comprises side reflective facets wherein said side reflective facets provide a side Fresnel reflector with substantially the same positive optical power in the lateral direction and optical axis direction as the Fresnel reflector arranged at the reflective end.

23. A directional backlight according to claim 1, further comprising a rear reflector comprising a linear array of reflective facets arranged to reflect light from the light sources, that is transmitted through the plurality of facets of the waveguide, back through the waveguide to exit through the first guide surface into said optical windows.

24. A directional backlight according to claim 23 wherein the facets of the waveguide and the reflective facets of the rear reflector are inclined in the same sense in a common plane orthogonal to said lateral direction.

25. A directional backlight according to claim 23 wherein the facets of the waveguide are inclined at an angle $(\pi/2-\alpha)$ to the normal to the first guide surface and the reflective facets of the rear reflector are inclined at an angle $\beta$ to the normal to the first guide surface, and $2\beta > \pi/2 - \sin^{-1}(n \cdot \sin(\alpha - \theta_c))$, $\theta_c$ being the critical angle of the facets of the waveguide and n being the refractive index of the material of the waveguide.

26. A directional backlight according to claim 23, wherein the rear reflector is spaced from the waveguide such that the light from an individual facet of the waveguide is incident on plural reflective facets of the rear reflector, the rear reflector further comprising intermediate facets extending between the reflective facets of the rear reflector, the intermediate facets being inclined in an opposite sense from the reflective facets of the rear reflector at an angle such that said light from the light sources that is transmitted through the plurality of facets of the waveguide is not incident on the intermediate facets.

27. A directional backlight according to claim 23, wherein the reflective facets of the rear reflector have an irregular pitch.

28. A directional backlight according to claim 23, wherein the reflective facets of the rear reflector have an irregular, randomized pitch.

29. A directional backlight according to claim 23, wherein the reflective facets of the rear reflector have an inclination that varies across the array of reflective facets.

30. A directional backlight according to claim 23, wherein the reflective facets of the rear reflector are linear.

31. A directional backlight according to claim 23, wherein the reflective facets of the rear reflector are curved.

32. A directional display device comprising:
a directional backlight according to claim 1; and
a transmissive spatial light modulator arranged to receive the output light from the waveguide and to modulate it to display an image.

33. A directional display device comprising:
a directional backlight according to claim 1;
a transmissive spatial light modulator arranged to receive the light output through the first guide surface and arranged to modulate a first polarization component of that light having a first polarization; and
a reflective polarizer disposed between the first guide surface of the waveguide and the spatial light modulator and arranged to transmit the first polarization component and to reflect a second polarization component of the output light having a polarization orthogonal to the first polarization as rejected light,
the rear reflector further comprising intermediate facets extending between the reflective facets of the rear reflector and inclined in opposite senses from the reflective facets of the rear reflector in a common plane, so that pairs of a reflective facet and an intermediate facet together form corner facets arranged to reflect rejected light for supply back to the spatial light modulator, the pairs of a reflective facet and an intermediate facet being inclined in a plane that is oriented around the normal to the spatial light modulator so that the rear reflector converts the polarization of rejected light supplied back to spatial light modulator into the first polarization on reflection.

34. A directional display device according to claim 33, further comprising a polarization rotator disposed between the reflective polarizer and the spatial light modulator and arranged to rotate the first polarization component.

35. A directional display device according to claim 32, wherein the spatial light modulator has a rectangular shape having a first side aligned with the reflective end of the directional waveguide, the optical axis of the Fresnel reflector being inclined with respect to an axis of the rectangular shape of the spatial light modulator that is perpendicular to its first side.

36. A directional display apparatus comprising:
a directional display device according to claim 32; and
a control system arranged to control the light sources.

* * * * *